(12) United States Patent
Ellis et al.

(10) Patent No.: US 10,547,511 B2
(45) Date of Patent: Jan. 28, 2020

(54) INFRASTRUCTURE RESOURCE STATES

(71) Applicants: Don R. Ellis, Ottawa (CA); Sylvain Chenard, Gatineau (CA); Walter Carpini, Stittsville (CA)

(72) Inventors: Don R. Ellis, Ottawa (CA); Sylvain Chenard, Gatineau (CA); Walter Carpini, Stittsville (CA)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/146,425

(22) Filed: May 4, 2016

(65) Prior Publication Data

US 2017/0324620 A1 Nov. 9, 2017

(51) Int. Cl.
*H04L 12/24* (2006.01)
*H04L 12/46* (2006.01)
*H04L 12/911* (2013.01)

(52) U.S. Cl.
CPC .......... *H04L 41/12* (2013.01); *H04L 12/4641* (2013.01); *H04L 47/821* (2013.01)

(58) Field of Classification Search
CPC ... H04L 41/12; H04L 47/821; H04L 12/4641; G06F 9/5077
See application file for complete search history.

(56) References Cited

U.S. PATENT DOCUMENTS 4,949,254 A * 8/1990 Shorter ................. G06F 9/5077
709/226
6,111,673 A  8/2000 Chang
(Continued)

FOREIGN PATENT DOCUMENTS

WO  WO2016/048430 A1  3/2016
WO  WO 2016/050270 A1  4/2016

OTHER PUBLICATIONS

Gill, Bob, "The Edge Manifesto: Digital Business, Rich Media. Latency Sensitivity and the Use of Distributed Data Centers," ID:G00290109, Jul. 31, 2015, downloaded from http://www.equinix.com/resources/analyst-reports/gartner-the-edge-manifesto/, 8 pages.

(Continued)

*Primary Examiner* — Scott B Christensen
(74) *Attorney, Agent, or Firm* — Tong, Rea, Bentley & Kim, LLC

(57) ABSTRACT

The present disclosure discloses infrastructure resource states which may be configured for use in managing both infrastructure resources (IRs) and virtualized infrastructure resources (VIRs). The new resources states may include a Network Unequipped (NU) state, a Network Equipped (NE) state, a Network Ready (NR) state, a Service Ready (SR) state, an Out-of-Service (OOS) state, and an In-Service (IS) state. The infrastructure resource states may be configured to enable resource transfers in a programmable virtual infrastructure having one or more tenants (e.g., Owners, BUs, Partners, Customers, or the like) at one or more hierarchical layers. The infrastructure resource states may be configured to support VIR management for multi-owner virtualization such that multiple owners may manage resource allocation of the network infrastructure of the communication network and multi-tenant virtualization such that multiple tenants, at one or more hierarchical layers, may share portions of the network infrastructure of the communication network.

23 Claims, 37 Drawing Sheets

(56) References Cited

U.S. PATENT DOCUMENTS

| | | | |
|---|---|---|---|
| 7,839,766 | B1 | 11/2010 | Gardner |
| 8,400,355 | B1 | 3/2013 | Gaeta |
| 8,484,353 | B1 | 7/2013 | Johnson et al. |
| 9,392,471 | B1 | 7/2016 | Thomas et al. |
| 9,780,909 | B2 | 10/2017 | Wood |
| 2005/0053375 | A1 | 3/2005 | Yoo |
| 2005/0132367 | A1* | 6/2005 | Tewari ............... G06F 9/5077 718/1 |
| 2007/0016904 | A1* | 1/2007 | Adlung ............... G06F 9/5016 718/1 |
| 2008/0244579 | A1* | 10/2008 | Muller ............... G06F 9/5027 718/100 |
| 2008/0244595 | A1* | 10/2008 | Eilam ..................... G06F 8/10 718/104 |
| 2011/0106802 | A1* | 5/2011 | Pinkney ............ G06F 17/30085 707/737 |
| 2011/0170860 | A1 | 7/2011 | Smith |
| 2011/0318004 | A1 | 12/2011 | Bruno |
| 2012/0110055 | A1 | 5/2012 | Van Biljon et al. |
| 2012/0158938 | A1 | 6/2012 | Shimonishi et al. |
| 2012/0281979 | A1 | 11/2012 | Xia |
| 2013/0046906 | A1* | 2/2013 | Ripberger ............. G06F 3/0629 710/12 |
| 2013/0055261 | A1 | 2/2013 | Han et al. |
| 2014/0052877 | A1 | 2/2014 | Mao |
| 2014/0086576 | A1 | 3/2014 | Campbell |
| 2014/0330869 | A1 | 11/2014 | Factor et al. |
| 2014/0334817 | A1 | 11/2014 | Miedema |
| 2015/0082301 | A1 | 3/2015 | Garg et al. |
| 2015/0237421 | A1 | 8/2015 | Morgan |
| 2015/0324182 | A1 | 11/2015 | Barros et al. |
| 2016/0134364 | A1 | 5/2016 | Grobe |
| 2016/0335113 | A1 | 11/2016 | Gorst et al. |
| 2016/0364226 | A1 | 12/2016 | Takano et al. |
| 2017/0019345 | A1 | 1/2017 | Yamasaki et al. |
| 2017/0060628 | A1 | 3/2017 | Tarasuk-Levin et al. |
| 2017/0132744 | A1 | 5/2017 | Wilt et al. |
| 2017/0134089 | A1 | 5/2017 | Mansouri Rad |
| 2017/0161044 | A1 | 6/2017 | Singh et al. |
| 2017/0230257 | A1* | 8/2017 | Bruun ................ H04L 41/5054 |
| 2017/0295066 | A1 | 10/2017 | Ellis et al. |
| 2018/0006931 | A1 | 1/2018 | Ellis et al. |
| 2018/0041914 | A1 | 2/2018 | Zhang et al. |
| 2018/0234308 | A1 | 8/2018 | Bruun et al. |

OTHER PUBLICATIONS cellmapper.net, "Cellular Coverage and Tower Map," downloaded on Feb. 9, 2017 from https://www.cellmapper.net/map, 1 page.
datacentermap.com, "Data Center Map," downloaded on Feb. 9, 2017 from http://www.datacentermap.com/france/paris/, 16 pages.
Interoute, "Dark Fibre Network Provider, DWDM Network," downloaded on Feb. 9, 2017 from http://www.interoute.com/product/dark-fibre-network, 8 pages.
Vodofone, "Vodofone Ethernet Product overview," downloaded on Feb. 9, 2017 from http://www.vodafone.com/business/carrier-services, 2 pages.
Dix, John, "Inside AT&T's grand plans for SDN", Jan. 8, 2015, downloaded from http://www.networkworld.com/article/2866439/sdn/inside-atts-grand-plans-for-sdn.html, 8 pages.
Ovum, "Telecoms, Media & Entertainment Outlook 2015," downloaded from http://info.ovum.com./uploads/files/Ovum_Telecoms_Media_and_Entertainment_Outlook_2 015.pdf on Feb. 9, 2017, 7 pages.
Data Center Knowledge, "Equinix CEO Unveils Aggressive Plan to Court Enterprises", downloaded from http://www.datacenterknowledge.com/archives/2016/01/08/equinix-ceo-unveils-aggressive-plan-to-court-enterprises/ on Feb 9, 2017, 4 pages.
Crown Castle, "Outdoor Small Cell Solutions," downloaded from http://www.crowncastle.com/ on Mar. 21, 2017, 3 pages.
Zayo Group, "Mobile Infrastructure, Scalable bandwidth for wireless providers," downloaded from http://www.zayo.com/services/mobile-infrastructure on Feb. 9, 2017, 7 pages.
Verizon, "Verizon Enterprise Solutions," downloaded from http://www.verizonenterprise.com/about/ Feb. 9, 2017, 3 pages.
Equinix, "Syniverse Success Story", downloaded from http://www.equinix.com/industries/mobile/ on Feb. 9, 2017, 5 pages.
NGMN Alliance, "RAN Evolution Project—Backhaul and Fronthaul Evolution," v1.01 Mar. 31, 2015, 28 pages.
NGMN Alliance, "Fronthaul Requirements for C-RAN," v1.0 Mar. 31, 2015, 11 pages.
NGMN Alliance, "Suggestions on Potential Solutions to C-RAN," v4.0 Jan. 3, 2013.
International Search Report and Written Opinion, mailed in corresponding PCT Application No. PCT/IB2017/000712, dated Jul. 18, 2017, 9 pages.
Munoz, et al., "An experimental switching-aware GMPLS-based lightpath provisioning protocol in wavelength-routed networks," Photonic Network Communications, Kluwer Academic Publishers, BO, vol. 14, No. 3, Jul. 13, 2017, pp. 253-264, XP019532832.
Jukan, et al., "Constraint-based path selection methods for on-demand provisioning in WDM networks", IEEE INFOCOM 2002, vol. 2, Jan. 1, 2002, pp. 827-836, XP002428368.
Freiberger, et al., "Low Latency Optical Services," Optical Fiber Communication Conference and Exposition (OFC/NFOEC), 2012, and the National Fiber Optic Engineers Conference, IEEE, Mar. 4, 2012, pp. 1-3, XP032340399.
Charbonneau, et al., "A Survey of Advance Reservation Routing and Wavelength Assignment in Wavelength-Routed WDM Networks," IEEE Communications Surveys and Tutorials, Institute of Electrical and Electronics Engineers, US, vol. 14, No. 4, Oct. 1, 2012, pp. 1037-1064, XP011471436.
EP Office Action mailed in corresponding Application No. 17 731 941.5 dated Nov. 7, 2019, 6 pages.

* cited by examiner

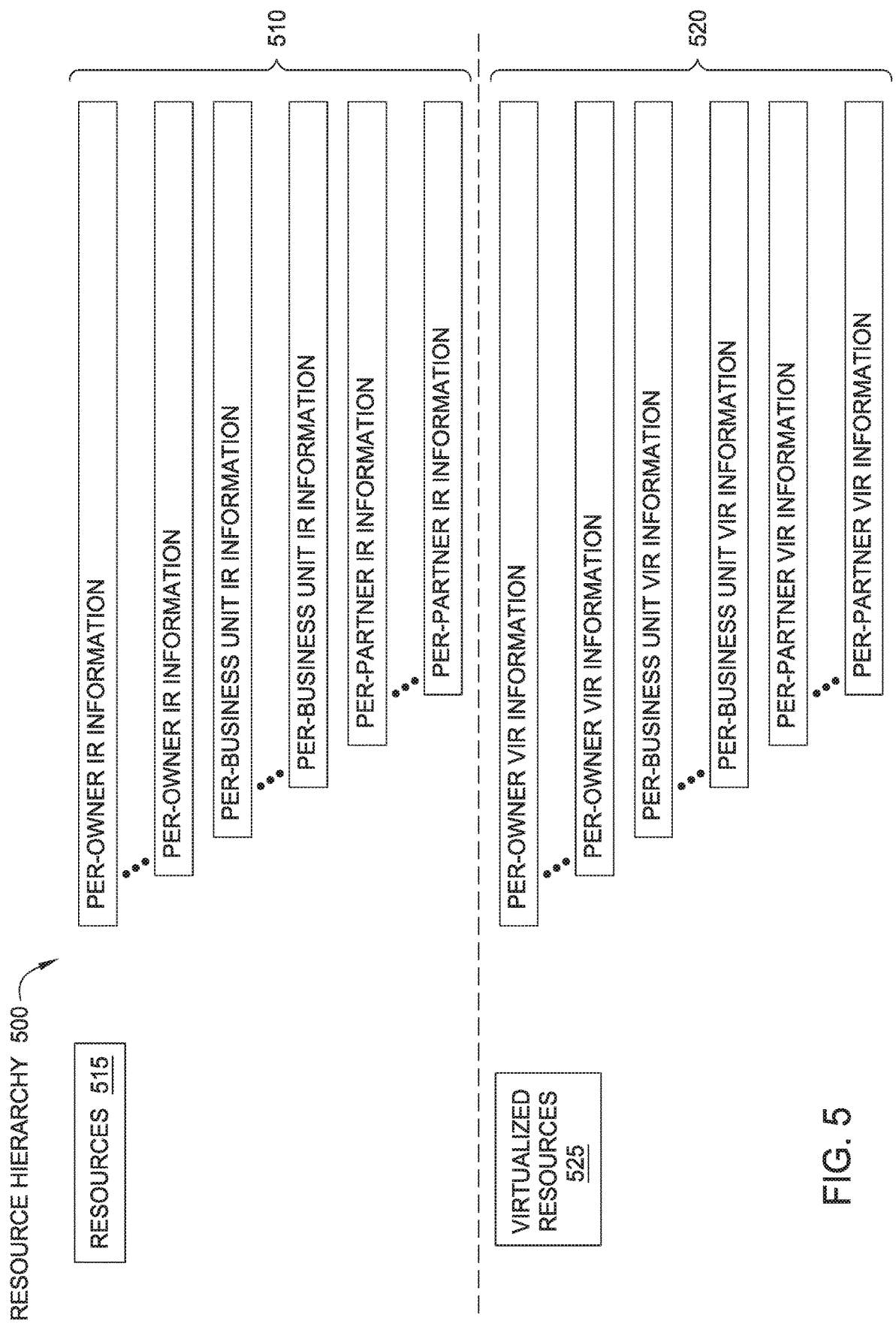

NR DATA STRUCTURE 610

| NE     | TYPE | CARD | TYPE | PORT | TYPE | REACH | REMOTE | NR STATE |
|--------|------|------|------|------|------|-------|--------|----------|
| 128000 | 16   | 64   | 16   | 32   | 16   | 4     | 4      | 4        |

| NE ID | | CARD ID | | PORT ID | | | | |
| ROADM PE | | | ETHERNET | | 100M | SR | NID | IS - IN SERVICE |
| ROADM P | | | MULTI-PROTOCOL | | 1G | IR | SFP | OOS - OUT-OF-SERVICE |
| ILA | | | -Eth, FC, IB, CPRI | | 10G | LR | CLE | -AU (DEGRADE) |
| L1 MUX | | | OTN | | 100G | | CPE | -AU (FAIL) |
| L2 MUX | | | Amp | | | | | |

| LOCATION | GPS | CONTACT & # |
|----------|-----|-------------|
| POSTAL ADDRESS | | |

POSTAL ADDRESS    LAT/LONG    NAMES: NUMBER (S)

| HISTORY | CHANGE | EXPANSION |
|---------|--------|-----------|
| 128     | 16     | 64        |

NETWORK NOTES:    FAULTS
YEAR NE INSTALLED
YEAR IS

| NETWORK | TYPE | EXPANSION |
|---------|------|-----------|
| 128     | 16   | 64        |

NETWORK ID    IN TERRITORY/OOT
CITY / REGION    DEDICATED
             SHARED

FIG. 6A

SR DATA STRUCTURE 710

| SERVICES | UNI/NNI | PROTOCOL TYPE | SERVICE TYPE | EVC | WVC | SOURCE ADDRESS | DESTINATION ADDRESS | SR STATE |
|---|---|---|---|---|---|---|---|---|
| 512000 | 4 | 8 | 4 | 8 | 8 | X | X | 8 |
| SERVICE ID | UNI, UNIm NNI, NNIm | ETHERNET (MEF, RT, W) MULTI-PROTOCOL (WAVE) -Eth, FC, IB, CPRI WAVE, SUB-WAVE SDH | E-LINE E-TREE E-LAN W-LINE | FIXED DYNAMIC UNPROTECTED PROTECTED | | LOCATION A | LOCATION Z | IS - IN SERVICE OOS - OUT-OF-SERVICE -AU (DEGRADE) -AU (FAIL) |

| SLA | RATE | EIR |
|---|---|---|
| 128 | 16 | 16 |
| SLA -AD, DV QOS | 100M 1G 10G 100G | |

| BILLING | CUSTOMER ID | CONTACT & # |
|---|---|---|
| POSTAL ADDRESS | | |
| POSTAL ADDRESS | ACCOUNT# | NAMES: NUMBER(S) |

| SERVICE AREA | TYPE | EXPANSION |
|---|---|---|
| 128 | 16 | 64 |
| AREA CODE ID CITY / REGION | IN TERRITORY/OOT DEDICATED SHARED | |

| HISTORY | CHURN | EXPANSION |
|---|---|---|
| 128 | 16 | 64 |
| SERVICE NOTES: YEAR NE INSTALLED YEAR IS | SR IS OOS TIME (DMY) | |

FIG. 7A

VNR ADMINISTRATION POLICY 1010

VNR OPERATIONS
R=REQUEST
P=PROVISION
TS-IS=TROUBLE SHOOT IN SERVICE
TS-OSS=TROUBLE SHOOT OUT-OF-SERVICE
V=VIEW

| VIRTUAL NETWORK RESOURCE ALLOCATION | VNR MULTI-TENANT HIERARCHY ||||||
| --- | --- | --- | --- | --- | --- | --- |
| | NOC ADMIN L1 | OWNER SP-1 | SP1 WHOLESALE BU | PARTNER | CUSTOMER | END-USER |
| | R  P  T-IS  T-OSS  V | R  P  T-IS  T-OSS  V | R  P  T-IS  T-OSS  V | R  P  T-IS  T-OSS  V | R  P  T-IS  T-OSS  V | R  P  T-IS  T-OSS  V |
| NOC ADMIN LEVEL 1 | X  X  X  X  X | X  X  X  X  X | X  X  X  X  X | X  X  X  X  X | X  X  X  X  X | X  X  X  X  X |
| OWNER SP-1 | | X  X  X  X  X | X  X  X  X  X | X  X    X  X | X  X    X  X | X  X    X  X |
| BUSINESS UNIT | | | X  X  X  X  X | X  X    X  X | X  X    X  X | X  X    X  X |
| PARTNER | | | | X  X    X  X | X  X    X  X | X  X    X  X |
| CUSTOMER | | | | | X  X    X  X | X  X    X  X |
| END USER | | | | | | X  X    X  X |

CUSTOMER CAN
TS-IS=TROUBLE SHOOT IN SERVICE
V=VIEW

FIG. 10A

VSR ADMINISTRATION POLICY 1020

VSR OPERATIONS
R=REQUEST
P=PROVISION
TS-IS=TROUBLE SHOOT IN SERVICE
TS-OSS=TROUBLE SHOOT OUT-OF-SERVICE
V=VIEW

| VIRTUAL SERVICE RESOURCE ALLOCATION | VSR ADMIN | VSR MULTI-TENANT HIERARCHY | | | | | | | | | | | | | | | | | | | | | | |
|---|---|---|---|---|---|---|---|---|---|---|---|---|---|---|---|---|---|---|---|---|---|---|---|---|
| | | SP NETWORK OPERATIONS | | | | | SP RETAIL BU | | | | | SP WHOLESALE BU | | | | | WHOLESALE PARTNER | | | | | WHOLE PARTNER'S CUST | | | | | WHOLE PART CUST'S USER | | | | |
| | | R | P | T-IS | T-OSS | V | R | P | T-IS | T-OSS | V | R | P | T-IS | T-OSS | V | R | P | T-IS | T-OSS | V | R | P | T-IS | T-OSS | V | R | P | T-IS | T-OSS | V |
| SOC ADMIN LEVEL 1 | X | X | X | X | X | | | | | | | | | | | | | | | | | | | | | | | | | | |
| OWNER SP-1 | | | | | | | X | X | X | X | X | X | X | X | X | X | X | X | X | X | X | X | X | X | X | X | X | X | X | X | X | X |
| BUSINESS UNIT | | | | | | | X | X | X | | X | X | X | X | | X | | X | X | X | | X | X | X | X | | X | X | X | X | | X |
| PARTNER | | | | | | | | | | | | | | | | | | X | X | X | | X | X | X | X | | X | X | X | X | | X |
| CUSTOMER | | | | | | | | | | | | | | | | | | | | | | | X | X | X | X | X | X | X | X | X | X |
| END USER | | | | | | | | | | | | | | | | | | | | | | | | | | | | X | X | X | | X |

CUSTOMER CAN
R=REQUEST
TS-IS=TROUBLE SHOOT IN SERVICE
V=VIEW

FIG. 10B

SR DATA STRUCTURE 1510

| SERVICES | UNI/NNI | PROTOCOL TYPE | SERVICE TYPE | EVC | WVC | SOURCE ADDRESS | DESTINATION ADDRESS | SR STATE |
|---|---|---|---|---|---|---|---|---|
| 512000 | 4 | 8 | 4 | 8 | 8 | X | X | 8 |
| SERVICE ID | UNI, UNIm NNI, NNIm | ETHERNET (MEF) ETHERNET (RT) ETHERNET (WAVE) MULTI-PROTOCOL (WAVE) -ETH, FC, IB, CPRI WAVE SUB-WAVE SDH | E-LINE E-TREE E-LAN W-LINE | FIXED DYNAMIC UNPROTECTED PROTECTED | | LOCATION A | LOCATION Z | IS - IN SERVICE OOS - OUT-OF-SERVICE -AU (DEGRADE) -AU (FAIL) SR-SERVICE READY NR - NETWORK READY NE - NETWORK EQUIPPED NU - NETWORK UNEQUIPPED |

VSR DATA STRUCTURE 1520

| vSERVICES | vUNI/NNI | PROTOCOL TYPE | SERVICE TYPE | EVC | WVC | SOURCE ADD | DESTINATION ADD | VSR STATE |
|---|---|---|---|---|---|---|---|---|
| 512000 | 4 | 8 | 4 | 8 | 8 | X | X | 8 |
| SERVICE ID | UNI, UNIm NNI, NNIm | ETHERNET (MEF) ETHERNET (RT) ETHERNET (WAVE) MULTI-PROTOCOL (WAVE) -ETH, FC, IB, CPRI WAVE SUB-WAVE SDH | E-LINE E-TREE E-LAN W-LINE | FIXED DYNAMIC UNPROTECTED PROTECTED | | LOCATION A | LOCATION Z | IS - IN SERVICE OOS - OUT-OF-SERVICE -AU (DEGRADE) -AU (FAIL) SR-SERVICE READY NR - NETWORK READY NE - NETWORK EQUIPPED NU - NETWORK UNEQUIPPED |

PMO - BSS SERVICE STATES
IS - IN SERVICE
OOS - OUT-OF-SERVICE
 -AU (DEGRADE)
 -AU (FAIL)

VI SR STATES (UNI, NNI, EVC, WVC)
IS - IN SERVICE
OOS - OUT-OF-SERVICE
SR-SERVICE READY
NR - NETWORK READY

VSR STATES
IS - IN SERVICE
OOS - OUT-OF-SERVICE
SR-SERVICE READY
NR - NETWORK READY

VSR REPORT:
PER END CUSTOMER (MONTHLY SLA)
PER CUSTOMER/VERTICAL/PROJECT
PER OWNER, BU, PARTNER
PER LOCATION (CLE, COLO, DC)
PER TIME (QUARTER, TEND YEARLY)
CHURN, GROWTH - WHO IS GROWING $

IMPROVING SERVICE VALUE
SERVICES PER OWNER, BU, PARTNER, CUSTOMER

VI VALUE
VIRTUAL RESOURCE MANAGEMENT

BUSINESS VALUE
SERVICES PER BUSINESS
NEW ANALYTICS

FIG. 15

TABLE 2800

| EQUIPMENT | | CONFIGURATION | NE - NETWORK EQUIPPED | NU - NETWORK UNEQUIPPED | NR - NETWORK READY | SR - SERVICE READY | IS - IN-SERVICE | NOTES |
|---|---|---|---|---|---|---|---|---|
| NR DEDICATED BLADE: 4 X 100G CLIENT + LINE | | 2 x XFP CLIENT EQUIPPED<br>2 x XFP LINE EQUIPPED<br>4 x XFP UNEQUIPPED | BLADE = 800G<br>CLIENT - 400G<br>LINE - 400G<br>XFP - 400G | XFP - 400G | 200G<br>LINE - 200G | 200G<br>CLIENT - 200G | 200G<br>LINE - 200G | % UNEQUIPPED = 50%<br>% ASSIGNED = 50%<br>BW ASSIGNED = 400G<br>% UNASSIGNED = 50%<br>BW UNASSIGNED = 400G |
| NR EDGE NODE: 8 BLADES / NE | | 8 x BLADES EQUIPPED<br>16 XFPs LINE EQUIPPED<br>16 XFPs CLIENT EQUIPPED<br>32 XFPs UNEQUIPPED | SHELF = 6.4T<br>BLADES = 6.4T<br>LINE - 1.6T<br>CLIENT - 1.6T | 3.2T<br>CLIENT - 1.6T<br>LINE - 1.6T | 1.6T<br>LINE - 1.6T | 1.6T<br>CLIENT - 1.6T | 1.2T<br>LINE - 1.2T | % ASSIGNED = 25%<br>BW ASSIGNED = 1.2T<br>% UNASSIGNED = 75%<br>BW UNASSIGNED = 4.8T |
| VNR [OWNER] | VNR | NODE + 8 BLADES<br>2 IN SHARED POOL | 6.4T | XFP - 3.2T | 1.6T<br>LINE - 1.6T | 1.6T<br>CLIENT - 1.6T | 1.2T | % ASSIGNED = 75%<br>BW ASSIGNED = 1.2T |
| VNR [RETAIL] | VNR | 2 - IS RBU<br>2 - SR RBU (SHARED POOL) | 3.2T | XFP - 1.6T | 800G<br>LINE - 800G | 800G<br>CLIENT - 800G | 400G<br>CLIENT - 400G | % ASSIGNED = 50%<br>BW ASSIGNED = 400G |
| VNR [WHOLESALE] | VNR | 4 - IS WBU<br>2 - SR WBU (SHARED POOL) | 4.8T | XFP - 2.4T | 1.2T<br>LINE - 1.2T | 1.2T<br>CLIENT - 1.2T | 800G<br>CLIENT - 800G | % ASSIGNED = 66%<br>BW ASSIGNED = 600G |
| VNR [BANK] | VNR | 2 - WBU.SI [BANK]<br>2 - SHARED POOL | 3.2T | XFP - 1.6T | 800G<br>LINE - 800G | 800G<br>CLIENT - 800G | 400G<br>CLIENT - 400G | % ASSIGNED = 25%<br>BW ASSIGNED = 400G |
| VNR [CLOUD] | VNR | 2 - WBU. ICP. [CLOUD]<br>2 - SHARED POOL | 3.2T | XFP - 1.6T | 800G<br>LINE - 800G | 800G<br>CLIENT - 200G | 400G<br>CLIENT - 400G | % ASSIGNED = 25%<br>BW ASSIGNED = 400G |
| VNR [ENTERPRISE] | VNR | 1-WBU.ICP. [ENTERPRISE] | 800G | | 400G<br>LINE - 400G | 200G<br>CLIENT - 200G | 200G<br>CLIENT - 200G | % ASSIGNED = 50%<br>BW ASSIGNED = 200G |

FIG. 28

VI OWNER / WHOLESALE BU / PARTNER / CUSTOMER STATE TABLE

| | NETWORK BUILD | SINGLE OWNER ADMIN 1 (OSS) | BU ADMIN L3 | PARTNER ADMIN L4 | OWNER ADMIN 1 (BSS) | CUSTOMER ADMIN L5 | VNR NE | VNR NU | VNR NR | VNR SR | VSR IS | VSR OOS |
|---|---|---|---|---|---|---|---|---|---|---|---|---|
| 1 | | NETWORK UNEQUIPPED | | | | | 20T | | | | | |
| 1 | INSTALL NE ROADM | NETWORK EQUIPPED | | | | | 20T | 18T | 0T | | | |
| 2 | PROVISION NE LINE | NETWORK READY | | | | | | 18T | 2T | | | |
| 3 | PROVISION NE CLIENT | SERVICE READY | | | | | | 18T | 2T | 0T | | |
| 4 | TRANSFER VNR OWNER | IN-SERVICE (EQMT) | SERVICE READY | | | | | | 2T | 0T | | |
| 5 | TRANSFER VNR WHOLESALE BU | IN-SERVICE | IN-SERVICE | SERVICE READY | | | | | 2T | 0T | | |
| 6 | TRANSFER VNR PARTNER | IN-SERVICE | IN-SERVICE | IN-SERVICE | SERVICE READY | | | | 2T | 0T | | |
| 7 | OSS TO BSS VNR STATE | | | | VNR SERVICE READY | | | | | | | |
| 8 | OSS/BSS VSR STATE | SR/VSR IN-SERVICE (UNI) | | | | | | 18T | 2Tλ | 400G | | |
| 9 | BU, PARTNER CUSTOMER | IN-SERVICE | IN-SERVICE | IN-SERVICE | IN-SERVICE | IN-SERVICE | | 18T | 2T | 300G | | |
| 10 | NE | 20T | 20T | | | | | | | | | |
| 11 | VNR - NU | 18T | 18T | | | | | | | | | |
| 12 | VNR - NR | 2T | 2T | 2T | | | | | | | | |
| 13 | VNR - SR | 300G | 300G | 300G | 300G | | | | | | | |
| 14 | VNR - IS | 100G | 100G | 100G | 100G | | | | | | 100G | |
| 15 | VSR - IS | 100G | 100G | 100G | 100G | | | | | | | |
| 16 | VSR - OOS | 0 | 0 | 0 | 0 | 0 | | | | | | 0G |

RESOURCE STATES & VNR TRANSFERS
RESOURCE STATES & VSR BILLING
NR/VNR DATA: TOTAL NR/VNR CAPACITY; TOTAL VNR UNEQUIPPED CAPACITY; TOTAL VNR EQUIPPED CAPACITY; TOTAL VNR SR TENANT CAPACITY; TOTAL VNR IS TENANT USED CAPACITY
SR/VSR DATA: TOTAL VSR IS TENANT CAPACITY; TOTAL VSR OOS TENANT USED CAPACITY

INFRASTRUCTURE RESOURCE STATES

TECHNICAL FIELD

The disclosure relates generally to the field of communication networks and, more particularly but not exclusively, to infrastructure resource states within the context of communication networks.

BACKGROUND

Various techniques are being applied for improving various aspects of communication networks. For example, Software Defined Networking (SDN) is being employed to provide separation of the control and data planes of communication networks, Network Function Virtualization (NFV) is being applied for virtualizing various functions of communication networks, and so forth. However, while such techniques may provide various benefits for communication networks, such techniques may not be able to provide certain type of features for communication networks.

SUMMARY

The present disclosure generally discloses mechanisms related to infrastructure resource states for network infrastructure of a communication network.

In at least some embodiments, a network element is provided. The network element includes a processor and a memory communicatively connected to the processor. The processor is configured to receive a first message including an indication of transitioning of a state of a virtualized network resource (VNR), hosted by the network element, from a Network Ready (NR) VNR state to a Service Ready (SR) VNR state. The processor is configured to configure the network element based on the indication of transitioning of the state of the VNR from the NR VNR state to the SR VNR state. The processor is configured to receive a second message including an indication of transitioning of a state of a virtualized service resource (VSR), hosted by the network element and associated with the VNR, from a Service Ready (SR) VSR state to an In Service (IS) VSR state. The processor is configured to configure the network element based on the indication of transitioning of the state of the VSR from the SR VSR state to the IS VSR state.

In at least some embodiments, a support system is provided. The support system includes a processor and a memory communicatively connected to the processor. The processor is configured to transition a virtualized network resource (VNR) from a Network Ready (NR) VNR state to a Service Ready (SR) VNR state. The processor is configured to send, toward a second support system, an indication that the VNR is in the SR VNR state. The processor is configured to receive, from the second support system, an indication that a virtualized service resource (VSR) associated with the VNR has been transitioned from a Service Ready (SR) VSR state to an In Service (IS) VSR state. The processor is configured to transition the VNR from the SR VNR state to an In Service (IS) VNR state.

In at least some embodiments, an apparatus is provided. The apparatus includes a processor and a memory communicatively connected to the processor. The processor is configured to support a hierarchical multi-owner and multi-tenant system for a communication network based on a set of virtualized infrastructure resources associated with a set of infrastructure resources of the communication network. The processor is configured to support a resource state model for the hierarchical multi-owner and multi-tenant system, the resource state model including a set of infrastructure resource states and a set of state transitions associated with the set of infrastructure resource states, where the set of infrastructure resource states includes a Network Unequipped (NU) state, a Network Equipped (NE) state, a Network Ready (NR) state, a Service Ready (SR) state, and an In-Service (IS) state. The processor is configured to initiate a management action for the hierarchical multi-owner and multi-tenant system based on the resource state model for the hierarchical multi-owner and multi-tenant system.

BRIEF DESCRIPTION OF THE DRAWINGS

The teachings herein can be readily understood by considering the following detailed description in conjunction with the accompanying drawings, in which:

FIG. 5 depicts an exemplary resource hierarchy associated with the infrastructure virtualization method of FIG. 4;

FIGS. 6A and 6B depict a network resource data structure and an associated virtualized network resource data structure;

FIGS. 7A and 7B depict a service resource data structure and an associated virtualized service resource data structure;

FIGS. 10A and 10B depict exemplary administration policies for virtualized infrastructure resources;

FIG. 15 depicts portions of the service resource and virtualized network resource data structures of FIGS. 7A and 7B, illustrating use of infrastructure resource states;

FIG. 28 depicts an exemplary report illustrating use of infrastructure resource states for tracking network resources and virtualized network resources for an optical device;

FIG. 29 depicts an exemplary state table illustrating use of infrastructure resource states for controlling transfers of virtualized network and service resources for an optical device;

To facilitate understanding, identical reference numerals have been used, where possible, to designate identical elements that are common to the figures.

DETAILED DESCRIPTION

Figure 1:
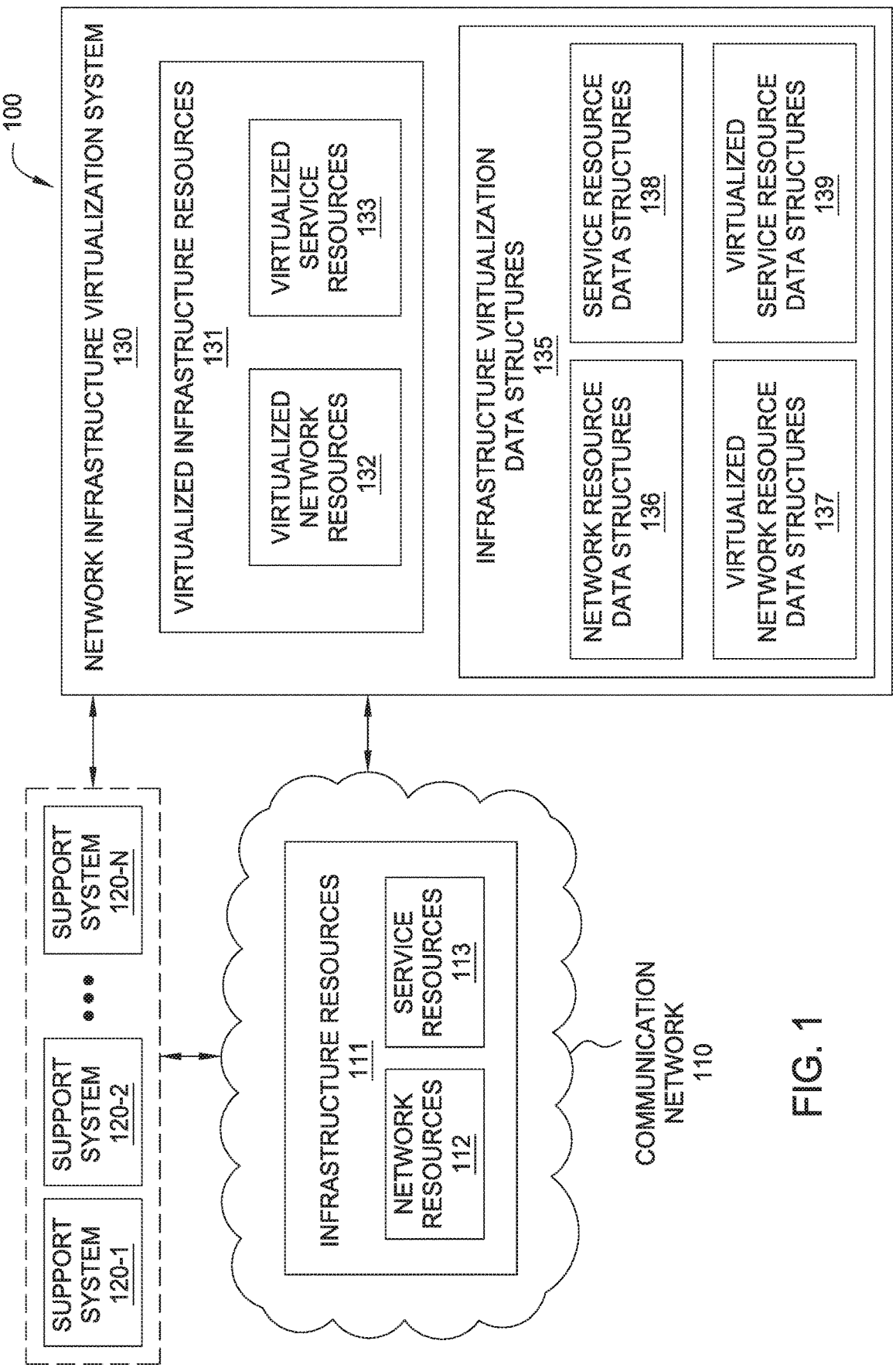
FIG. 1 depicts a system configured to support network infrastructure virtualization to provide a virtualized infrastructure for a communication network.

The present disclosure generally discloses a network infrastructure virtualization mechanism configured to support virtualization of the network infrastructure (NI) of a communication network (CN) to provide thereby a virtualized network infrastructure (VNI) for the CN. The network infrastructure virtualization mechanism may be configured to support virtualization of infrastructure resources (IRs) of the NI to provide thereby virtualized infrastructure resources (VIRs) of the NI. The IRs of the CN may include network resources (NRs) which may be virtualized to provide virtualized NRs (VNRs), service resources (SRs) which may be virtualized to provide virtualized SRs (VSRs), or the like, as well as various combinations thereof. The virtualization of IRs of the NI to provide VIRs may be considered to provide infrastructure slices of VIRs which may be managed in various ways. The virtualization of IRs of the NI to provide VIRs may be performed using various types of virtualization, such as resource management based virtualization, resource ownership based virtualization, resource allocation based virtualization, resource administration based virtualization, resource analytics based virtualization, or the like, as well as various combinations thereof. The network infrastructure virtualization mechanism may be configured to support multi-owner virtualization such that multiple owners may share portions of the NI of the CN (e.g., different owners may be provided ownership of respective sets of VNRs or VSRs which share portions of the NI of the CN). The network infrastructure virtualization mechanism may be configured to support multi-tenant virtualization such that multiple tenants, at multiple hierarchical levels, may share portions of the NI of the CN (e.g., tenants are allocated respective sets of VNRs or VSRs, which may overlap across hierarchal levels, which share portions of the NI of the CN). The network infrastructure virtualization mechanism may be configured to support virtualization of IRs of the NI of the CN by receiving IR information describing the IRs of the NI and processing the IR information, based on infrastructure virtualization data structures, to provide virtualized IR information describing the VIRs of the VNI (e.g., indicating hierarchical management of IRs by owners and tenants, indicating ownership of IRs by owners, indicating hierarchical allocation of IRs to tenants, indicating hierarchical administration of IRs by tenants, or the like, as well as various combinations thereof). The network infrastructure virtualization mechanism may be configured to support resource management, ownership, allocation, and administration. The network infrastructure virtualization mechanism may be configured to support applications that enable virtualized network and service functions and features per tenant (e.g., the tenants may have customized resource applications configured to enable the respective tenants to manage and monetize virtualized infrastructure). The network infrastructure virtualization mechanism may be configured to support various types of data analytics, which may be used for various purposes, based on the hierarchical management, ownership, allocation, and administration of resources. In this sense, as noted above, virtualization of NI to provide VNI may include virtualization of IRs of the NI in terms of management, ownership, allocation, administration, and so forth, thereby allowing secure sharing of IRs in various ways and for various purposes. The network infrastructure virtualization mechanism may be configured to support virtualization of IRs of the NI from ownership through administration (and encompassing various other operations, administration, maintenance (OAM) functions, as well as various other types of functions, in between). These and various other embodiments and potential advantages of network infrastructure virtualization mechanism may be further understood by way of reference to FIG. 1.

FIG. 1 depicts a system configured to support network infrastructure virtualization to provide a virtualized infrastructure for a communication network.

The system 100 includes a communication network (CN) 110, a set of support systems (SSs) 120-1-120-N (collectively, SSs 120), and a network infrastructure virtualization system (NIVS) 130.

The CN 110 may be any type of communication network for which network infrastructure virtualization may be supported. For example, CN 110 may be an optical network supporting Ethernet-based services, an optical network supporting IP-based services, a wireless network supporting various communication services, or the like. Accordingly, it will be appreciated that, although primarily depicted and described herein, for purposes of clarity, within the context of embodiments in which CN 110 is a dense wavelength divisional multiplexing (DWDM) optical network supporting Ethernet-based services, infrastructure virtualization may be provided for various other types of communication networks.

The CN 110 includes various resources which may be virtualized using network infrastructure virtualization. The CN 110 includes infrastructure resources (IRs) 111. The IRs 111 include various network resources (NRs) 112 configured to support various service resources (SRs) 113.

The NRs 112 may include various types of network resources, which may vary for different types of communication networks. For example, the NRs 112 may include packet network resources (e.g., routers, switches, hubs, interfaces, connections, sessions, or the like, as well as various combinations thereof). For example, the NRs 112 may include circuit network resources (e.g., telephone network resources, switches, ports, connections, or the like, as well as various combinations thereof). For example, the NRs 112 may include optical network resources (e.g., switches, ports, wavelengths (λs), transponders, muxponders, reconfigurable optical add-drop multiplexers (ROADMs), intermediate line amplifiers (ILAs), or the like, as well as various combinations thereof). The NRs 112 may include OSS management functions and features (e.g., which may be referred to as Fault, Configuration, Accounting, Performance, and Security (FCAPS), which generally includes network inventory, network OAM including KPIs, or the like). The NRs 112 may include various other types of network resources.

The SRs 113 may include various types of service resources, which may vary for different types of communication networks. For example, the SRs 113 may include client ports (e.g., user-network interfaces (UNIs)), line ports (e.g., network-network interfaces (NNIs)), Ethernet services (e.g., point-to-point Ethernet services, point-to-multipoint Ethernet services, or the like), Ethernet virtual connections (EVCs), wavelength virtual connections (WVCs), or the like, as well as various combinations thereof. The SRs 113 may include BSS management functions and features (e.g., which may be referred to as Fulfillment, Assurance, and Billing (FAB), which generally includes network service inventory, service OAM including SLAs, or the like). The SRs 113 may include various other types of service resources.

The CN 110 may include various devices and elements (omitted for purposes of clarity) configured to provide the IRs 111. These devices and elements maintain various types of information related to CN 110, including various types of information describing NRs 112 of CN 110 (e.g., equipment identifiers of nodes, port identifiers of ports, interface identifiers, wavelength identifiers of wavelengths, communication link identifiers of communication links, network topology information describing interconnection of communication elements such as nodes and links, or the like, as well as various combinations thereof), various types of information describing SRs 113 of CN 110 (e.g., service identifiers of services, service endpoint identifiers of services, service characteristics information describing characteristics of services, or the like, as well as various combinations thereof), or the like, as well as various combinations thereof.

The CN 110 may maintain various types of information produced as a result of virtualization of the IRs 111 of CN 110. For example, network elements of CN 110 may be provided with VIR information describing VIRs resulting from virtualization of IRs 111 by NIVS 130, VNR information describing VNRs resulting from virtualization of NRs 112 by NIVS 130, VSR information describing VSRs resulting from virtualization of SRs 113 by NIVS 130, or the like, as well as various combinations thereof. The network elements of CN 110 may maintain various types of information related to management and use of the VIRs produced as a result of virtualization of the IRs 111 of CN 110. The network elements of CN 110 may receive such information from NIVS 130, SSs 120, systems of entities managing and using VIRs produced as a result of virtualization of the IRs 111 of CN 110, or the like, as well as various combinations thereof. As discussed further below, this may involve various communication exchanges between network elements of CN 110 and various other elements of system 100.

It will be appreciated that network infrastructure virtualization may be provided for all or part of CN 110. It will be appreciated that, where network infrastructure virtualization is provided for one or more portions of CN 110, the one or more portions may be defined in various ways (e.g., geographically, based on network element type, based on network elements, based on service type, based on services, based on the communication layer(s) (e.g., portions of CN 110 for which infrastructure virtualization is provided may include portions of CN 110 operating at various communication layers (e.g., one or more of physical layer resources, link layer resources, network layer resources, transport layer resources, or the like, as well as various combinations thereof)), or the like, as well as various combinations thereof).

The SSs 120 include systems configured to provide various support functions for CN 110. For example, the SSs 120 may include operations support systems (OSSs), business support systems (BSSs), or the like, as well as various combinations thereof. For example, the SSs 120 may include network planning systems, network provisioning systems, service provisioning systems, element management systems, network management systems, network monitoring systems, service monitoring systems, network fault management systems, service failure management systems, or the like, as well as various combinations thereof.

The SSs 120 maintain various types of information related to CN 110, including various types of information describing NRs 112 of CN 110 (e.g., equipment identifiers of nodes, port identifiers of ports, interface identifiers, wavelength identifiers of wavelengths, communication link identifiers of communication links, network topology information describing interconnection of communication elements such as nodes and links, or the like, as well as various combinations thereof), various types of information describing SRs 113 of CN 110 (e.g., service identifiers of services, service endpoint identifiers of services, service characteristics information describing characteristics of services, or the like, as well as various combinations thereof), or the like, as well as various combinations thereof.

The SSs 120 may maintain various types of information produced as a result of virtualization of the IRs 111 of CN 110. For example, the SSs 120 may be provided with VIR information describing VIRs resulting from virtualization of IRs 111 by NIVS 130, VNR information describing VNRs resulting from virtualization of NRs 112 by NIVS 130, VSR information describing VSRs resulting from virtualization of SRs 113 by NIVS 130, or the like, as well as various combinations thereof. The SSs 120 may maintain various types of information related to management and use of the VIRs produced as a result of virtualization of the IRs 111 of CN 110. The SSs 120 may receive such information from NIVS 130, systems of entities managing and using VIRs produced as a result of virtualization of the IRs 111 of CN 110, network elements of CN 110 (e.g., NRs 112, from network elements hosting NRs 112, from SRs 113, from network elements hosting SRs 113, from NRs 112 supporting SRs 113, or the like), or the like, as well as various combinations thereof. As discussed further below, this may involve various communication exchanges between SSs 120 and various other elements of system 100.

The NIVS 130 is configured to provide network infrastructure virtualization functions for CN 110.

The NIVS 130 may be configured to provide network infrastructure virtualization functions for CN 110 by virtualizing the NI of CN 110 to provide a VNI for CN 110 (e.g., for multiple owners, as discussed further below) and using the VNI for CN 110 to support communications (e.g., by various tenants, as discussed further below). An exemplary method for providing and using a VNI for a communication network is depicted and described with respect to FIG. 2.

The NIVS 130 may be configured to provide network infrastructure virtualization functions for CN 110 in order to virtualize the NI of CN 110 to provide a VNI for CN 110. The NIVS 130 may be configured to virtualize the NI of CN 110 to provide the VNI for CN 110 by virtualizing the IRs 111 of CN 110 to provide virtualized IRs (VIRs) 131.

The NIVS 130 may be configured to virtualize the NI of CN 110 to provide the VNI for CN 110 by virtualizing the NRs 112 to provide virtualized NRs (VNRs) 132. The VNRs 132 may include virtual ports (v-ports), virtual ROADMs (v-ROADMs), virtual ILAs (v-ILAs), virtual wavelengths (v-λs), or the like, as well as various combinations thereof.

The NIVS 130 may be configured to virtualize the NI of CN 110 to provide the VNI for CN 110 by virtualizing the SRs 113 to provide virtualized SRs (VSRs) 133. The VSRs 133 may include Ethernet virtual connections (EVCs), wavelength virtual connections (WVCs), virtual Ethernet services (e.g., virtualized point-to-point Ethernet services, virtualized point-to-multipoint Ethernet services, or the like), or the like.

The NIVS 130 may be configured to virtualize the NI of CN 110 to provide the VNI for CN 110 by obtaining IR information for the IRs 111 and processing the IR information for the IRs 111 to provide virtualized IR information describing the VIRs 131 to provide thereby the VNI for CN 110. The NIVS 130 may be configured to process the IR information for the IRs 111 to provide the virtualized IR information describing the VIRs 131 of the VNI based on a set of infrastructure virtualization data structures 135. The infrastructure virtualization data structures 135 enable the IRs 111 to be managed as VIRs 131, respectively, thereby providing virtualization of the NI of CN 110 to provide the VNI for CN 110. The infrastructure virtualization data structures 135 may be configured to enable or support various types of virtualization which may be provided by NIVS 130 for the IRs 111 using VIRs 131 (e.g., resource management based virtualization, resource ownership based virtualization, resource allocation based virtualization, resource administration based virtualization, or the like, as well as various combinations thereof). The infrastructure virtualization data structures 135 may provide a hierarchical object model that can enable allocation, pooling, sharing, nesting, chaining, and dedicating of various resources (e.g., VNRs 132 and VSRs 133) in various types of ecosystems (e.g., mobile ecosystems, emerging cloud ecosystems, or the like, as well as various combinations thereof). It is noted that an exemplary method for virtualizing the network infrastructure of a communication network to provide a virtualized network infrastructure for the communication network is depicted and described with respect to FIG. 4. It is noted that exemplary infrastructure virtualization data structures for use in virtualizing IRs 111 to provide VIRs 131 are depicted and described with respect to FIGS. 6A and 6B and FIGS. 7A and 7B.

The NIVS 130 may be configured to virtualize the NI of CN 110 to provide the VNI for CN 110 by obtaining NR information for the NRs 112 and processing the NR information for the NRs 112 to provide virtualized NR information describing the VNRs 132. The NIVS 130 may be configured to obtain NR information for the NRs 112 from elements of CN 110 (e.g., from the network elements themselves), from one or more of the SSs 120 (e.g., from one or more OSSs), or the like, as well as various combinations thereof. The NIVS 130 may be configured to process the NR information for the NRs 112 to provide the virtualized NR information describing the VNRs 132 based on a set of NR data structures 136 and a corresponding set of VNR data structures 137. The NIVS 130 may be configured to organize the NR information for the NRs 112 using the NR data structures 136 (e.g., by populating NR data structures 136 for the NRs 112 using the NR information for the NRs 112 that is obtained by the NIVS 130). The NIVS 130 may have access to one or more templates for the NR data structures 136 (e.g., a single template for use with all NRs 112, different templates for use with different types of NRs 112, or the like, as well as various combinations thereof). The NIVS 130 may be configured to process the NR information for the NRs 112 to provide the virtualized NR information describing the VNRs 132 by populating the VNR data structures 137 based on the NR data structures 136 (e.g., the VNR data structures 137 are configured to maintain the VNR information for the VNRs 132 that is determined by the NIVS 130 based on processing of the NR information for the NRs 112 that is maintained in the NR data structures 136). The NIVS 130 may be configured to populate the VNR data structures 137 based on the NR data structures 136 by extracting portions of the NR information for the NRs 112 from the NR data structures 136 and storing the extracted portions of the NR information within the VNR data structures 137 to provide VNR information for the VNRs 132 which correspond to the NRs 112. The NIVS 130 may have access to one or more templates for the VNR data structures 137 (e.g., a single template for use with all VNRs 132, different templates for use with different types of VNRs 132, or the like, as well as various combinations thereof). The VNR data structures 137 enable the NRs 112 to be managed as respective VNRs 132. It is noted that exemplary NR and VNR data structures for use in virtualizing NRs 112 to provide VNRs 132 are depicted and described with respect to FIGS. 6A and 6B.

The NIVS 130 may be configured to virtualize the NI of CN 110 to provide the VNI for CN 110 by obtaining SR information for the SRs 113 and processing the SR information for the SRs 113 to provide virtualized SR information describing the VSRs 133. The NIVS 130 may be configured to obtain SR information for the SRs 113 from elements of CN 110 (e.g., from the network elements themselves), from one or more of the SSs 120 (e.g., from one or more BSSs), or the like, as well as various combinations thereof. The NIVS 130 may be configured to process the SR information for the SRs 113 to provide the virtualized SR information describing the VSRs 133 based on a set of SR data structures 138 and a corresponding set of VSR data structures 139. The NIVS 130 may be configured to organize the SR information for the SRs 113 using the SR data structures 138 (e.g., by populating SR data structures 138 for the SRs 113 using the SR information for the SRs 113 that is obtained by the NIVS 130). The NIVS 130 may have access to one or more templates for the SR data structures 138 (e.g., a single template for use with all SRs 113, different templates for use with different types of SRs 113, or the like, as well as various combinations thereof). The NIVS 130 may be configured to process the SR information for the SRs 113 to provide the virtualized SR information describing the VSRs 133 by populating the VSR data structures 139 based on the SR data structures 138 (e.g., the VSR data structures 139 are configured to maintain the VSR information for the VSRs 133 that is determined by the NIVS 130 based on processing of the SR information for the SRs 113 that is maintained in the SR data structures 138). The NIVS 130 may be configured to populate the VSR data structures 139 based on the SR data structures 138 by extracting portions of the SR information for the SRs 113 from the SR data structures 138 and storing the extracted portions of the SR information within the VSR data structures 139 to provide VSR information for the VSRs 133 which correspond to the SRs 113. The NIVS 130 may have access to one or more templates for the VSR data structures 139 (e.g., a single template for use with all VSRs 133, different templates for use with different types of VSRs 133, or the like, as well as various combinations thereof). The VSR data structures 139 enable the SRs 113 to be managed as respective VSRs 133. It is noted that exemplary SR and VSR data structures for use in virtualizing SRs 113 to provide VSRs 133 are depicted and described with respect to FIGS. 7A and 7B.

The NIVS 130, as discussed above, is configured to virtualize the IRs 111 to provide the VIRs 131. The virtualization of the IRs 111 to provide the VIRs 131 may be used to provide various types of virtualization, such as resource management based virtualization, resource ownership based virtualization, resource allocation based virtualization, resource administration based virtualization, or the like, as well as various combinations thereof. The virtualization of the IRs 111 to provide the VIRs 131 may be used to support multi-owner virtualization such that multiple owners may share portions of the NI of the CN 110 (e.g., VIRs 131 may be used to provide different owners ownership of respective sets of VIRs 131 which share portions of the NI of the CN 110). The virtualization of the IRs 111 to provide the VIRs 131 may be used to support multi-tenant virtualization such that multiple tenants, at multiple hierarchical levels, may share portions of the NI of the CN 110 (e.g., VIRs 131 may be used to allocated respective sets of IRs 111 to tenants, where the allocations of VIs 131 may overlap across hierarchal levels, such that various tenants may share various portions of the NI of the CN 110). The virtualization of IRs 111 to VIRs 131 may be used to provide virtualization for various types of entities which may operate as owners and tenants of VIRs 131 and, thus, the underlying IRs 111 upon which the VIRs 131 are based.

The NIVS 130 may be configured to provide various other functions for use in virtualizing the IRs 111 to provide the VIRs 131.

The NIVS 130 may be configured to provide network infrastructure virtualization functions for CN 110 in order to use the VNI for CN 110. The NIVS 130 may be configured to control allocation of VIRs 131 to owners. The NIVS 130 may be configured to control administration of VIRs 131 by owners (e.g., using various applications, tools, or the like). The NIVS 130 may be configured to control allocation of VIRs 131 by owners to tenants, to control allocation of VIRs 131 by tenants to other tenants, or the like, as well as various combinations thereof. The NIVS 130 may be configured to control administration of VIRs 131 by tenants (e.g., using various applications, tools, or the like). The NIVS 130 may be configured to provide various other functions for supporting use of the VNI for CN 110 by owners and tenants. Various capabilities which may be supported by the NIVS 130 to support use the VNI for CN 110 by owners and tenants may be further understood by way of reference to FIGS. 2-12.

The NIVS 130, as discussed above, is configured to provide various network infrastructure virtualization functions for virtualizing the NI of CN 110 to provide the VNI for CN 110 and for using the VNI for CN 110 to support communications by various entities (e.g., owners and tenants).

The owners and tenants may be organized hierarchically, with each owner being able to allocate portions of the VNI of CN 110 (e.g., in the form of VIRs 131) to tenants at one or more of the hierarchical levels of tenants (e.g., the owners may allocate to certain types of tenants, which may in turn allocate to other types of tenants, and so forth).

The owners and tenants may fall into multiple categories of entities which may be involved in various aspects of providing communication networks and associated services and utilizing communication networks and associated services. For example, such entities may include communications service providers (CPSs), which may primarily include network operators that own central offices, data centers, and the interconnecting networks. CSPs may include local providers (incumbent cable and alternate operators, long haul providers, mobile network operators, or the like). For example, such entities may include carrier-neutral providers (CNPs), which may include data center operators (e.g., with multi-site, terabit-scale requirements primarily focused on providing co-location, power, rack-space, servers, storage, and interconnections to various types of entities such as CSPs, Internet cloud providers, Internet content providers, Information Technology (IT) service providers, Enterprises, or the like). The entities may include Internet content-cloud providers (ICPs), which may include webscale Internet companies, technical large enterprises, and global Systems Integrators (SIs) providing content, cloud services, social media services, IT services, or the like, as well as various combinations thereof. ICPs may include ICPs for consumers (e.g., for which the primary focus is on consumer markets), ICPs for enterprises (e.g., for which the primary focus is on delivering IT solutions to enterprises and small and medium businesses which do not have an IT department). For example, such entities may include TI/SI providers, for which the primary focus may be on providing IT/SI solutions for large enterprises (e.g., IT providers providing IT solutions for DCs (e.g., servers, storage, virtualization, or the like), SI/IT providers providing private cloud solutions, or the like, as well as various combinations thereof). For example, such entities may include enterprises (e.g., banks, finance and stock exchanges, healthcare companies, manufacturing companies, media companies, oil and gas companies, transportation companies, utility companies, or the like), governments, public sector agencies, research organizations, education institutions, or the like, as well various combinations thereof.

The multiple owners may include one or more of local CPSs, long-haul CSPs, CNPs, enterprise ICPs, or the like, as well as various combinations thereof. The owners may own respective VIRs 131 such that the owners share portions of the NI of CN 110 (which typically would be owned by a single owner that would be responsible for all of the ownership functions).

The multiple tenants may include one or more types of tenants at one or more hierarchical levels. The hierarchical levels may include various numbers of hierarchical levels which may be defined in various ways, organized with respect to each other in various ways, or the like, as well as various combinations thereof. For example, the hierarchical levels of the tenants may include Business Units, Partners, Customers, and End Users (although it will be appreciated that fewer or more hierarchical levels may be provided, one or more of the hierarchical levels may be defined in different ways, or the like, as well as various combinations thereof). The hierarchical levels may be internally organized in various ways (e.g., one or more of the hierarchical levels may include multiple tenant types, one or more of the hierarchical levels may organize multiple tenant types hierarchically, or the like, as well as various combinations thereof). For example, the Business Units level may include Infrastructure Business Units, Wholesale Business Units, Retail Business Units, or the like, as well as various combinations thereof. For example, the Partners level may include SI/IT Partners, Cloud Partners, Industrial IOT Partners, or the like, as well as various combinations thereof. For example, the Customers level may include Enterprise Customers, Mobile Customers, Cloud Customers, Industrial IOT Customers, or the like, as well as various combinations thereof. The multiple tenants may include one or more types of tenants which may operate at one or more of the hierarchical levels. For example, Business Unit tenant types may include consumer ICPs, mobile CSPs, SI/IT providers, or the like, as well as various combinations thereof. For example, Partner tenant types may include enterprise ICPs, consumer ICPs, SI/IT providers, enterprises, governments, or the like, as well as various combinations thereof.

The NIVS 130, as depicted in FIG. 1, maintains various types of information produced as a result of virtualization of the IRs 111 of CN 110. For example, NIVS 130 maintains VIRs 131 including VNRs 132 and VSRs 133. The NIVS 130 may be configured to maintain such information in various ways (omitted from FIG. 1 for purposes of clarity), such as using one or more data storage devices, one or more databases, or the like, as well as various combinations thereof. The NIVS 130, as discussed above, may be configured to provide various types of information produced as a result of virtualization of the IRs 111 of CN 110 to various other elements of system 100 (e.g., SSs 120, IRs 111 of CN 110 (e.g., network elements or the like), or the like, as well as various combinations thereof). As discussed further below, this may involve various communication exchanges between NIVS 130 and various other elements of system 100.

The NIVS 130 may be configured to provide various other network infrastructure virtualization functions for virtualizing the NI of CN 110 to provide the VNI for CN 110 and for using the VNI for CN 110 to support communications by various entities.

As discussed herein, system 100 is configured to support network infrastructure virtualization in order to provide a virtualized infrastructure for a communication network and to support use of the virtualized infrastructure by various entities. This may include various types of communications between various devices to provide virtualized infrastructure for a communication network and to support use of the virtualized infrastructure by various entities.

For example, virtualization of the NI of CN 110 to provide the VNI for CN 110 may include messaging between NIVS 130 and various elements. The NIVS 130 may obtain infrastructure information describing the IRs 111 of the NI of the communication network 110 and processing the infrastructure information, based on a set of infrastructure virtualization data structures, to provide virtualized infrastructure information describing the VIRs 131 of the VNI of CN 110. The NIVS 130 may obtain the obtain infrastructure information describing the IRs 111 of the NI of the communication network 110 by sending messages to various elements of system 100 (e.g., network elements of CN 110, SSs 120, or the like, as well as various combinations thereof. The NIVS 130 may communicate the virtualized infrastructure information describing the VIRs 131 of the VNI of the CN 110 to various elements of system 100. For example, NIVS 130 may communicate the virtualized infrastructure information describing the VIRs 131 of the VNI of the CN 110 to various SSs 120 (e.g., to make the information available on the SSs 120 for use in performing various support system functions related to the VIRs 131, for use in controlling establishment of ownership of VIRs on network elements of CN 110 (e.g., to one or more provisioning systems, one or more management systems, or the like), to support allocation of VIRs on network elements of CN 110 (e.g., to one or more provisioning systems, to one or more resource allocation systems, or the like), to support management of VIRs allocated on network elements of CN 110 (e.g., to one or more provisioning systems, to one or more monitoring systems, to one or more fault detection systems, to one or more reconfiguration systems, or the like), to support administration of VIRs allocated on network elements of CN 110 (e.g., to one or more status tracking systems, to one or more monitoring systems, or the like), or the like, as well as various combinations thereof). For example, NIVS 130 may communicate the virtualized infrastructure information describing the VIRs 131 of the VNI of the CN 110 to various network elements of CN 110 (e.g., to make the information available on the network elements, to establish ownership of VIRs on the network elements, to allocate VIRs on the network elements, to manage VIRs allocated on the network elements, to support administration of VIRs on the network elements, or the like, as well as various combinations thereof). For example, NIVS 130 may communicate the virtualized infrastructure information describing the VIRs 131 of the VNI of the CN 110 to various other elements (e.g., systems, devices, or the like) which may form part of CN 110, be associated with CN 110, or the like, as well as various combinations thereof. It will be appreciated that such messaging may include various types of messages (e.g., queries, instructions, commands, or the like). It will be appreciated that such messaging may incorporate various aspects of network infrastructure virtualization as presented herein.

For example, ownership of VIRs 131 of the VNI of the CN 110 by multiple owners may include messaging between various elements. This may include assignment of ownership of VIRs 131, modification of ownership of VIRs 131, or the like, as well as various combinations thereof. This may include messaging between NIVS 130 and SSs 120 of the owners which own the VIRs 131 (e.g., from NIVS 130 to SSs 120 to inform the SSs 120 of ownership of VIRs 131 by respective owners, from SSs 120 to NIVS 130 to request ownership of VIRs 131, from SSs 120 to NIVS 130 to request ownership information for one or more VIRs 131, or the like, as well as various combinations thereof). This may include messaging between NIVS 130 and network elements of CN 110 (e.g., from NIVS 130 to network elements to inform the network elements of ownership of VIRs 131 by respective owners, from network elements to NIVS 130 to request ownership information for one or more VIRs 131, or the like, as well as various combinations thereof). This may include messaging between SS 120 and network elements of CN 110 (e.g., from SSs 120 to network elements to inform the network elements of ownership of VIRs 131 by respective owners, from network elements to SSs 120 to request ownership information for one or more VIRs 131, or the like, as well as various combinations thereof). It will be appreciated that such messaging may include various types of messages (e.g., queries, instructions, commands, or the like). It will be appreciated that such messaging may incorporate various aspects of network infrastructure virtualization as presented herein.

For example, allocation of VIRs 131 of the VNI of the CN 110 to various tenants may include messaging between various elements. This may include initial allocation of VIRs 131, modification of allocation of VIRs 131, or the like, as well as various combinations thereof. The allocation of VIRs 131 may be performed at various hierarchical levels (e.g., from owners to tenants, between tenants, or the like). This may include messaging between NIVS 130 and SSs 120 of owners of the VIRs 131 (e.g., from NIVS 130 to SSs 120 of owners to inform the SSs 120 of VIRs 131 available for allocation to tenants, from SSs 120 of owners to NIVS 130 to inform the NIVS 130 of allocation of VIRs 131 to tenants, from NIVS 130 to SSs 120 of owners to request information regarding allocation of VIRs 131 to tenants, or the like). This may include messaging between NIVS 130 and SSs 120 of tenants to which the VIRs 131 are allocated (e.g., from NIVS 130 to SSs 120 of tenants to inform the SSs 120 that allocation of VIRs 131 to the tenants is complete such that the VIRs 131 are available for use by the tenants, from SSs 120 of tenants to NIVS 130 to inform the NIVS 130 of allocation of VIRs 131 to tenants, from NIVS 130 to SSs 120 of tenants to request information regarding allocation of VIRs 131 to tenants, or the like). This may include messaging between NIVS 130 and network elements of CN 110 (e.g., from NIVS 130 to network elements to configure the network elements to support the allocations of VIRs 131 to the tenants, from the network elements to the NIVS 130 to provide information regarding configuration of the network elements to support the allocations of VIRs to the tenants, or the like). This may include messaging between SSs 120 (e.g., SSs 120 of owners, SSs 120 of tenants, or the like) and network elements of CN 110 (e.g., from SSs 120 to network elements to configure the network elements to support the allocations of VIRs 131 to the tenants, from the network elements to the SSs 120 to provide information regarding configuration of the network elements to support the allocations of VIRs to the tenants, or the like). It will be appreciated that such messaging may include various types of messages (e.g., queries, instructions, commands, or the like). It will be appreciated that such messaging may incorporate various aspects of allocation of virtualized infrastructure resources as presented herein.

For example, administration of VIRs 131 of the VNI of the CN 110 by various entities (e.g., owners, tenants, or the like) may include messaging between various elements. This may include various types of administration which may be performed. The administration of VIRs 131 may be performed at various hierarchical levels. This may include messaging between NIVS 130 and SSs 120 of owners of the VIRs 131 (e.g., from NIVS 130 to SSs 120 of owners to perform administration of VIRs 131 allocation to tenants, from SSs 120 of owners to NIVS 130 to inform the NIVS 130 regarding administration of VIRs 131 allocated to tenants, from NIVS 130 to SSs 120 of owners to request information regarding administration of VIRs 131 allocated to tenants, or the like). This may include messaging between NIVS 130 and SSs 120 of tenants to which the VIRs 131 are allocated (e.g., from NIVS 130 to SSs 120 of tenants to for administration of VIRs 131 allocated to the tenants, from SSs 120 of tenants to NIVS 130 to inform the NIVS 130 regarding administration of VIRs 131 allocated to tenants, from NIVS 130 to SSs 120 of tenants to request information regarding administration of VIRs 131 allocated to tenants, or the like). This may include messaging between NIVS 130 and network elements of CN 110 (e.g., from NIVS 130 to network elements to perform administration of VIRs 131 hosted on the network elements, from the network elements to the NIVS 130 to provide information regarding administration of VIRs 131 hosted on the network elements, or the like). This may include messaging between SSs 120 (e.g., SSs 120 of owners, SSs 120 of tenants, or the like) and network elements of CN 110. (e.g., from SSs 120 to network elements to perform administration of VIRs 131 hosted on the network elements, from the network elements to the SSs 120 to provide information regarding administration of VIRs 131 hosted on the network elements, or the like). It will be appreciated that such messaging may include various types of messages (e.g., queries, instructions, commands, or the like). It will be appreciated that such messaging may incorporate various aspects of administration of virtualized infrastructure resources as presented herein.

It will be appreciated that various other types of messaging may be supported within system 100 to support network infrastructure virtualization in order to provide a virtualized infrastructure for a communication network.

It will be appreciated that, although primarily presented in FIG. 1 with respect to specific arrangements of elements and functions of the network infrastructure virtualization mechanism, various elements and functions of the network infrastructure virtualization mechanism may be arranged in various other ways.

Figure 2:
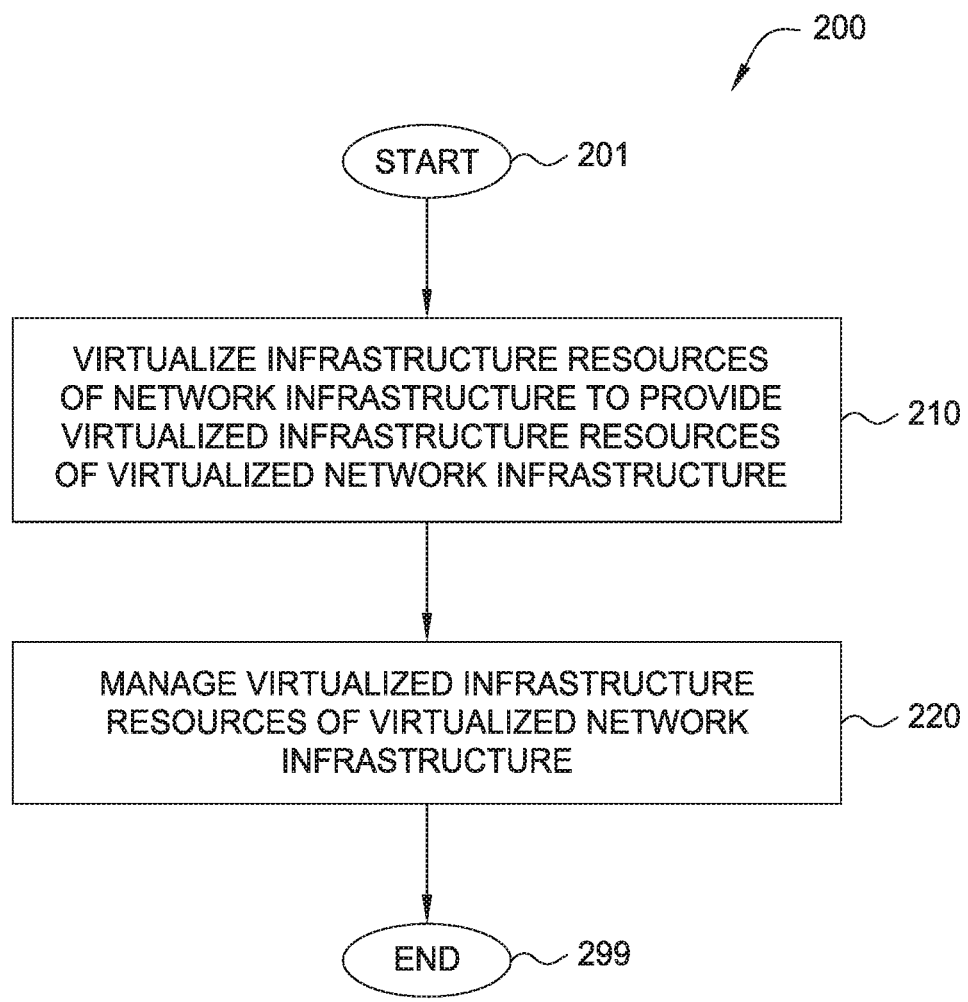
FIG. 2 depicts an embodiment of a method for using network infrastructure virtualization to provide and use a virtualized infrastructure for a communication network.

FIG. 2 depicts an embodiment of a method for using network infrastructure virtualization to provide and use a virtualized infrastructure for a communication network. It will be appreciated that, although depicted and described as being performed serially, at least a portion of the functions of method 200 may be performed contemporaneously or in a different order than as presented in FIG. 2.

At block 201, method 200 begins.

At block 210, IRs of an NI of a communication network are virtualized to provide VIRs of a VNI for the communication network. The virtualization of the IRs of an NI of a communication network to provide VIRs of a VNI for the communication network may include receiving infrastructure information describing the IRs of the NI of the communication network and processing the infrastructure information, based on a set of infrastructure virtualization data structures, to provide virtualized infrastructure information describing the VIRs of the VNI of the communication network. An exemplary embodiment of a method for virtualizing IRs of an NI to provide VIRs of a VI is depicted and described with respect to FIG. 4.

At block 220, the VIRs of the VNR are managed to support use of the VIRs by various entities. The management of VIRs may include allocation of VIRs to various entities, administration of VIRs by various entities, or the like, as well as various combinations thereof. The management of VIRs may include communication with one or more of the IRs based on the virtualized infrastructure information describing the VIRs of the VNI of the communication network. For example, the communication may include one or more of queries for information, a configuration command for configuring an infrastructure resource to support a virtualized infrastructure resource, a configuration command for configuring a network resource to support a virtualized network resource, a configuration command for configuring a service resource to support a virtualized service resource, or the like, as well as various combinations thereof.

At block 299, method 200 ends.

Figure 3:
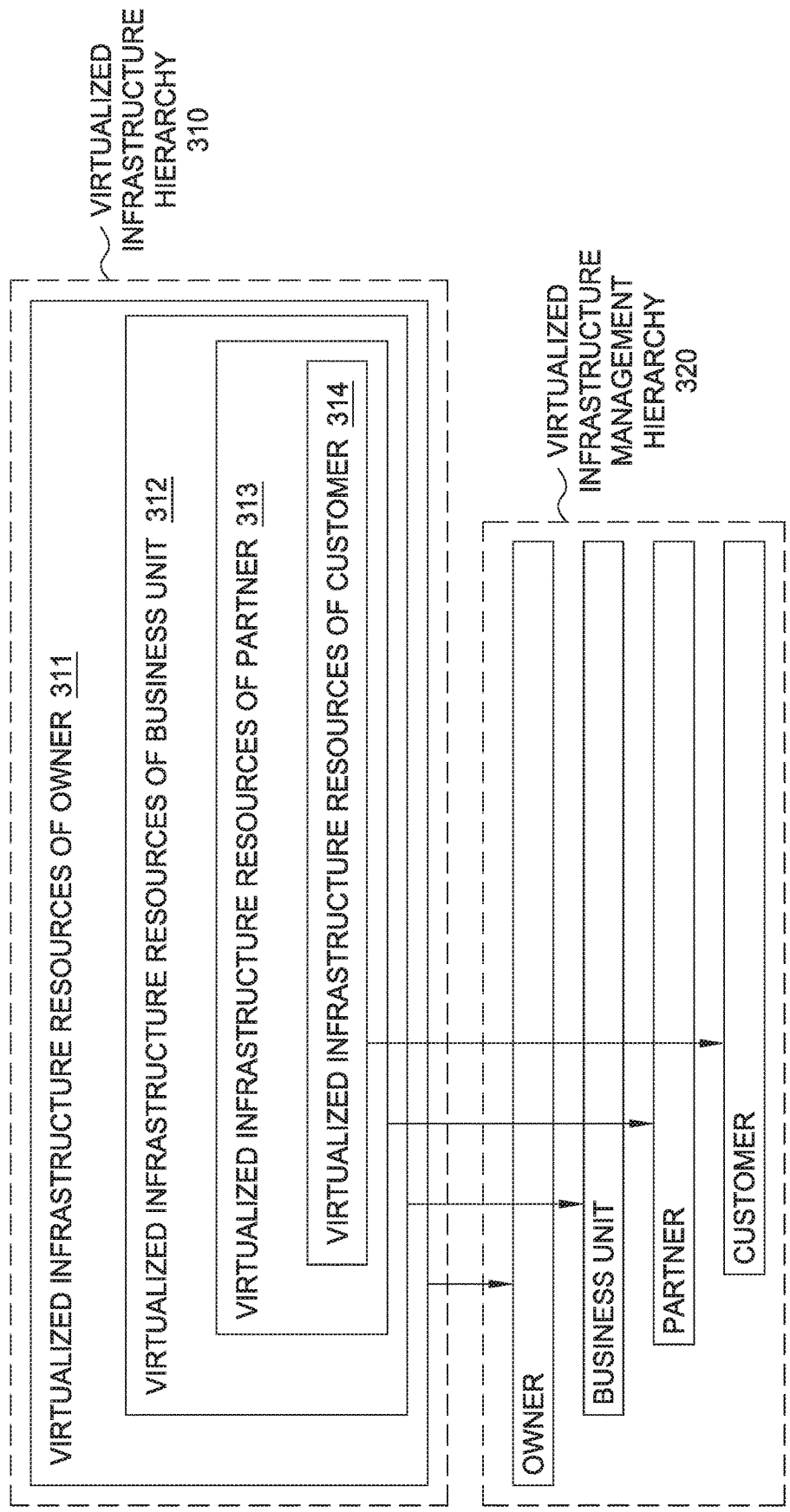
FIG. 3 depicts an exemplary resource virtualization and management hierarchy associated with the infrastructure virtualization method of FIG. 2.

FIG. 3 depicts an exemplary resource virtualization and management hierarchy associated with the infrastructure virtualization method of FIG. 2.

As depicted in FIG. 3, the resource virtualization and management hierarchy 300 of FIG. 3 generally corresponds to the blocks of method 200 of FIG. 2.

For example, virtualized infrastructure hierarchy 310 of FIG. 3 corresponds to the infrastructure resource virtualization performed in block 210 of FIG. 2 (e.g., virtualized infrastructure hierarchy 310 may be an output of block 210 of FIG. 2). As depicted in FIG. 3, virtualized infrastructure hierarchy 310 illustrates that virtualized infrastructure resources of a network may be owned by an owner as virtualized infrastructure resources of an owner 311, virtualized infrastructure resources of an owner 311 may be allocated to a business unit as virtualized infrastructure resources of a business unit 312, virtualized infrastructure resources of a business unit 312 may be allocated to a partner as virtualized infrastructure resources of a partner 313, and virtualized infrastructure resources of a partner 313 may be allocated to a customer as virtualized infrastructure resources of a customer 314.

For example, virtualized infrastructure management hierarchy 320 of FIG. 3 corresponds to the virtualized infrastructure resource management performed in block 220 of FIG. 2 (e.g., virtualized infrastructure management hierarchy 320 may be supported by block 220 of FIG. 2). As depicted in FIG. 3, virtualized infrastructure management hierarchy 320 illustrates that virtualized infrastructure resources of an owner 311 may be managed by the owner, virtualized infrastructure resources of a business unit 312 may be managed by the business unit, virtualized infrastructure resources of a partner 313 may be managed by the partner, and virtualized infrastructure resources of a customer 314 may be managed by the customer.

Figure 4:
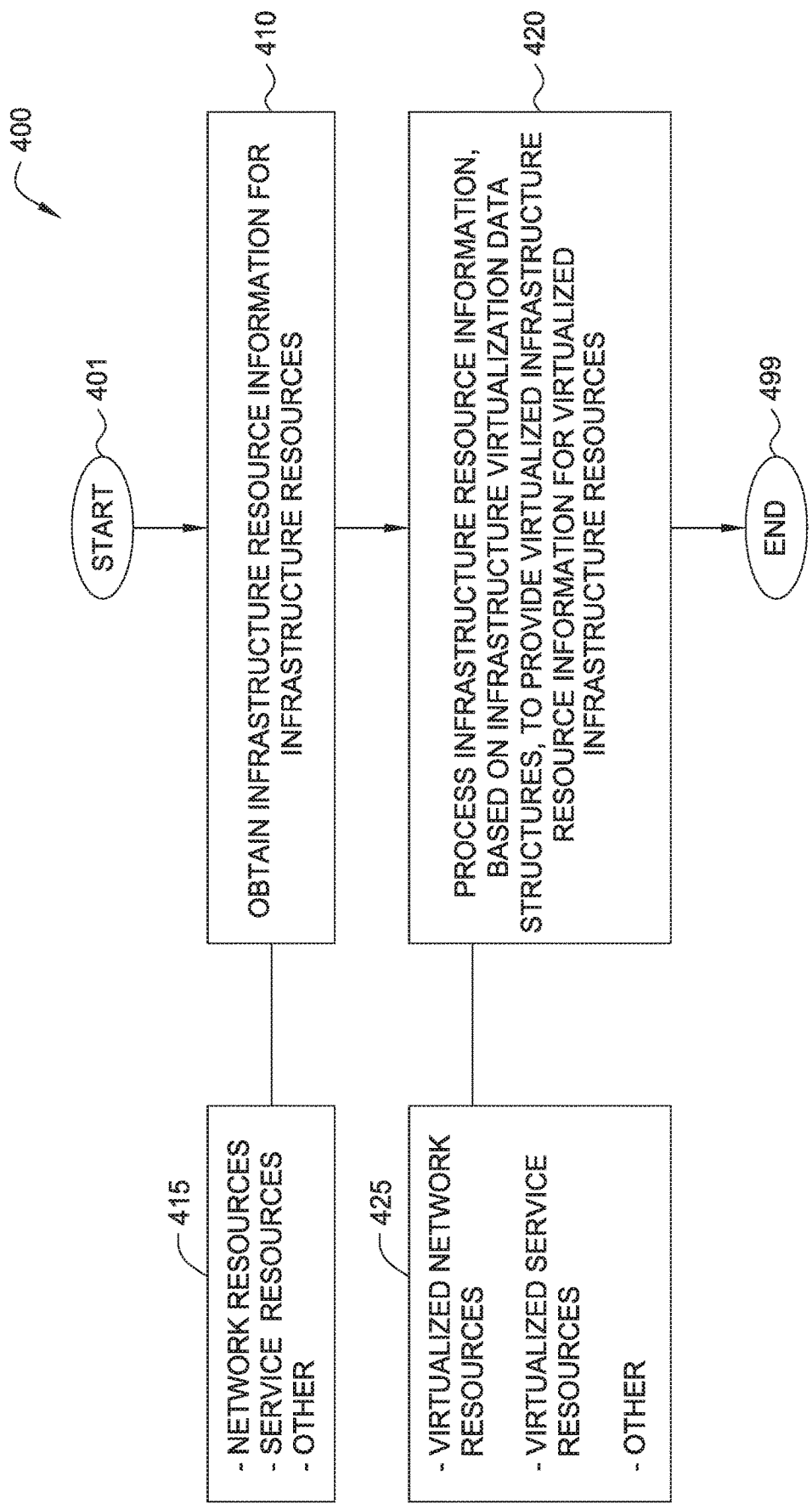
FIG. 4 depicts an exemplary method for using infrastructure virtualization to provide a virtualized infrastructure for a communication network.

FIG. 4 depicts an exemplary method for using infrastructure virtualization to provide a virtualized infrastructure for a communication network. It will be appreciated that, although depicted and described as being performed serially, at least a portion of the functions of method 400 may be performed contemporaneously or in a different order than as presented in FIG. 4.

At block 401, method 400 begins.

At block 410, IR information for IRs is obtained. As indicated by block 415, the IRs may include NRs, SRs, or the like.

At block 420, the IR information is processed, based on infrastructure virtualization data structures, to provide VIR information for VIRs. In general, for IRs, the infrastructure virtualization data structures may include IR data structures and VIR data structures, and the processing of the IR information of the IRs to provide VIR information for corresponding VIRs may include (1) populating IR data structures with the IR information for the IRs and then (2) populating VIR data structures, based on the IR information for the IRs in the IR data structures, to provide the corresponding VIRs. The population of IR data structures with the IR information for the IRs may include identification of the IR data structures to be used for the respective IRs (e.g., based on one or more of resource type, virtualization type, or the like, as well as various combinations thereof). The population of VIR data structures with the VIR information for the IRs may include identification of the VIR data structures to be used for the respective VIRs (e.g., based on one or more of resource type, virtualization type, or the like, as well as various combinations thereof). As indicated by block 425, the processing of IR information for IRs to provide VIR information for VIRs may be performed for NRs, SRs, or the like, as well as various combinations thereof.

For NRs, for example, the infrastructure virtualization data structures may include NR data structures and VNR data structures, and the processing of the NR information of the NRs to provide VNR information for corresponding VNRs may include (1) populating NR data structures with the NR information for the NRs and then (2) populating VNR data structures, based on the NR information for the NRs in the NR data structures, to provide the corresponding VNRs. As discussed herein, exemplary NR and VNR data structures for use in virtualizing NRs to provide VNRs are depicted and described with respect to FIGS. 6A and 6B.

For SRs, for example, the infrastructure virtualization data structures may include SR data structures and VSR data structures, and the processing of the SR information of the SRs to provide VSR information for corresponding VSRs may include (1) populating SR data structures with the SR information for the SRs and then (2) populating VSR data structures, based on the SR information for the SRs in the SR data structures, to provide the corresponding VSRs. As discussed herein, exemplary SR and VSR data structures for use in virtualizing SRs to provide VSRs are depicted and described with respect to FIGS. 7A and 7B.

At block 499, method 400 ends.

FIG. 5 depicts an exemplary resource hierarchy associated with the infrastructure virtualization method of FIG. 4.

As depicted in FIG. 5, the resource hierarchy 500 of FIG. 5 generally corresponds to the blocks of method 400 of FIG. 4.

For example, resources 515 of FIG. 5 correspond to the infrastructure resource information of block 415 of FIG. 4 (e.g., network resources, service resources, or the like) and the hierarchical arrangement of such infrastructure resource information is illustrated in FIG. 5 (e.g., one or more sets of per-owner IR information, one or more sets of per business unit IR information, one or more sets of per partner IR information, or the like, which are grouped together as hierarchical information 510).

For example, virtualized resources 525 of FIG. 5 correspond to the virtualized infrastructure resource information of block 425 of FIG. 4 (e.g., virtualized network resources, virtualized service resources, or the like) and the hierarchical arrangement of such virtualized infrastructure resource information is illustrated in FIG. 5 (e.g., one or more sets of per-owner VIR information, one or more sets of per business unit VIR information, one or more sets of per partner VIR information, or the like, which are grouped together as hierarchical information 520).

Figure 6B:
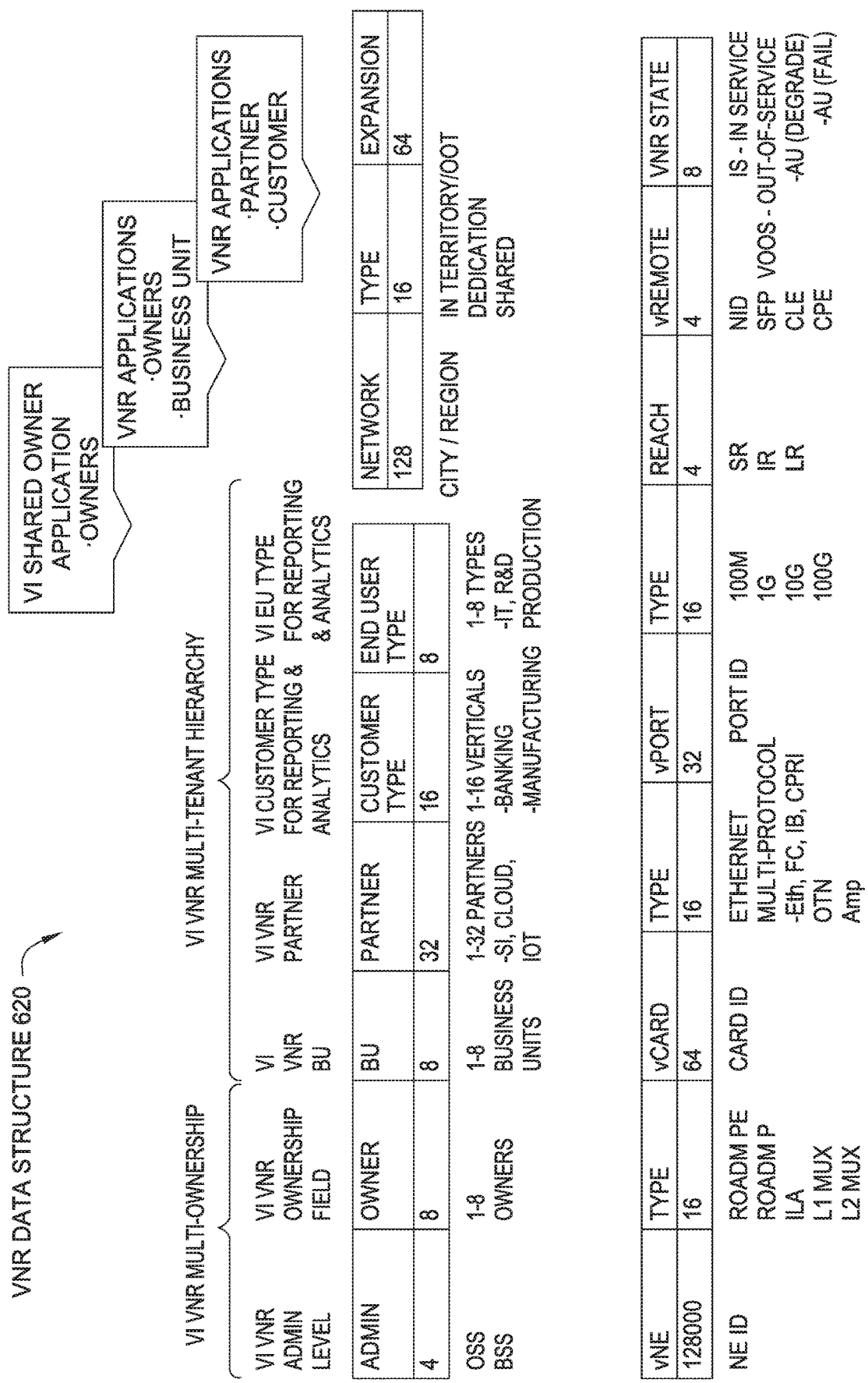

FIGS. 6A and 6B depict a network resource data structure and an associated virtualized network resource data structure.

As depicted in FIG. 6A, the NR data structure 610 includes a number of fields populated with corresponding NR information for the NR (as well as associated explanations and examples associated with at least some of the fields). The NR data structure 610 may be populated with a combination of OSS data and VI data. In this example, the NR is a port of a network element and the NR data structure 610 includes port information describing the port of the network element. Namely, the NR data structure 610 includes an NE field including a network element identifier of the network element with which the port is associated (illustratively, 128000), a TYPE field associated with the NE field that includes a network element type of the network element (illustratively, 16), a CARD field including a card identifier of the line card on which the port is disposed (illustratively, 64), a TYPE field associated with the CARD field that includes a card type of the line card (illustratively, 16), a PORT field including a port identifier of the port (illustratively, 32), a TYPE field associated with the PORT field that includes a port type of the port (illustratively, 16), a REACH field including an indication of the extent of reach of the port (illustratively, 4), a REMOTE field including an indication of the type of remote device with which the port communicates (illustratively, 4), an NR STATE field including an indication of the state of the port (illustratively, 4), a LOCATION field that includes a postal location of the network element (e.g., a postal address), a GPS field that indicates a GPS location of the network element (e.g., latitude and longitude information), a CONTACT information field that includes contact information for a person responsible for maintaining the network element, a NETWORK field including a network identifier of the network to which the network element belongs (illustratively, 128), a TYPE field associated with the NETWORK field that includes a network type of the network (illustratively, 16), an EXPANSION field that includes additional network attributes (e.g., packet, circuit, KPI metrics, which, illustratively, has a value of 64), a HISTORY field that includes historical information regarding the network element (e.g., a year in which it was deployed, a date on which it was last serviced, or the like), a FAULTS field for fault types (e.g., facility, fiber, power, network, card, service, port, or the like), and an EXPANSION field for additional failure attributes. It will be appreciated that the above-described fields of NR data structure 610 may be defined in different ways, include other types of information, or the like. It will be appreciated the NR data structure 610 may include fewer or more fields of information. It will be appreciated that NR data structure 610 is an exemplary data structure for a particular type of network resource (namely, a port) and that other data structures may be used for other types of network resources (e.g., including less or more, as well as different, information or the like).

As depicted in FIG. 6B, the VNR data structure 620 includes a number of fields populated with corresponding VNR information for the VNR (as well as associated explanations and examples associated with at least some of the fields). In this example, the VNR is a virtual port (v-port) representing virtualization of the port described by NR data structure 610 of FIG. 6A and, thus, that the VNR data structure 620 includes port information describing the v-port. As depicted in FIG. 6B, the VNR data structure 620 includes some of the fields from the NR data structure 610 of FIG. 6A, as well as additional fields, which operate to provide a v-port for the port described by NR data structure 610 of FIG. 6A. The VNR data structure 620 includes an ADMIN field that includes an indication as to a type of administration which may be used for the v-port (illustratively, 4), an OWNER field including an identifier of the owner of the v-port (illustratively, 8), a BU field including an identifier of the business unit to which the v-port has been allocated by the owner indicated in the OWNER field (illustratively, 8), a PARTNER field including an identifier of the Partner to which the v-port has been allocated by the business unit indicated in the BU field (illustratively, 32), a CUSTOMER TYPE field including an identifier of the customer to which the v-port has been allocated by the partner indicated in the PARTNER field (illustratively, 8), an END USER TYPE field including an indication of the type of end user to which the v-port has been allocated by the customer indicated in the CUSTOMER TYPE field, a NETWORK field including a network identifier of the network to which the network element belongs (illustratively, 128), a TYPE field associated with the NETWORK field that includes a network type of the network (illustratively, 16), an EXPANSION field that includes additional network attributes (packet, circuit, KPI metrics), a vNE field including a network element identifier of the virtual network element with which the v-port is associated (illustratively, 128000), a TYPE field associated with the vNE field that includes a network element type of the virtual network element (illustratively, 16), a vCARD field including a card identifier of the virtual line card on which the v-port is disposed (illustratively, 64), a TYPE field associated with the vCARD field that includes a card type of the virtual line card (illustratively, 16), a vPORT field including a port identifier of the v-port (illustratively, 32), a TYPE field associated with the vPORT field that includes a port type of the v-port (illustratively, 16), a REACH field including an indication of the extent of reach of the v-port (illustratively, 4), a vREMOTE field including an indication of the type of remote device with which the v-port communicates (illustratively, 4), and a VNR STATE field including an indication of the state of the v-port (e.g., In Service (IS), Out-of-Service (OOS), AU (degrade), AU (fail), or the like, which, illustratively, has a value of, illustratively, 8). It will be appreciated that the above-described fields of VNR data structure 620 may be defined in different ways, include other types of information, or the like. It will be appreciated the VNR data structure 620 may include fewer or more fields of information. It will be appreciated that VNR data structure 620 is an exemplary data structure for a particular type of virtualized network resource (namely, a v-port) and that other data structures may be used for other types of virtualized network resources (e.g., including less or more, as well as different, information or the like).

Figure 7B:
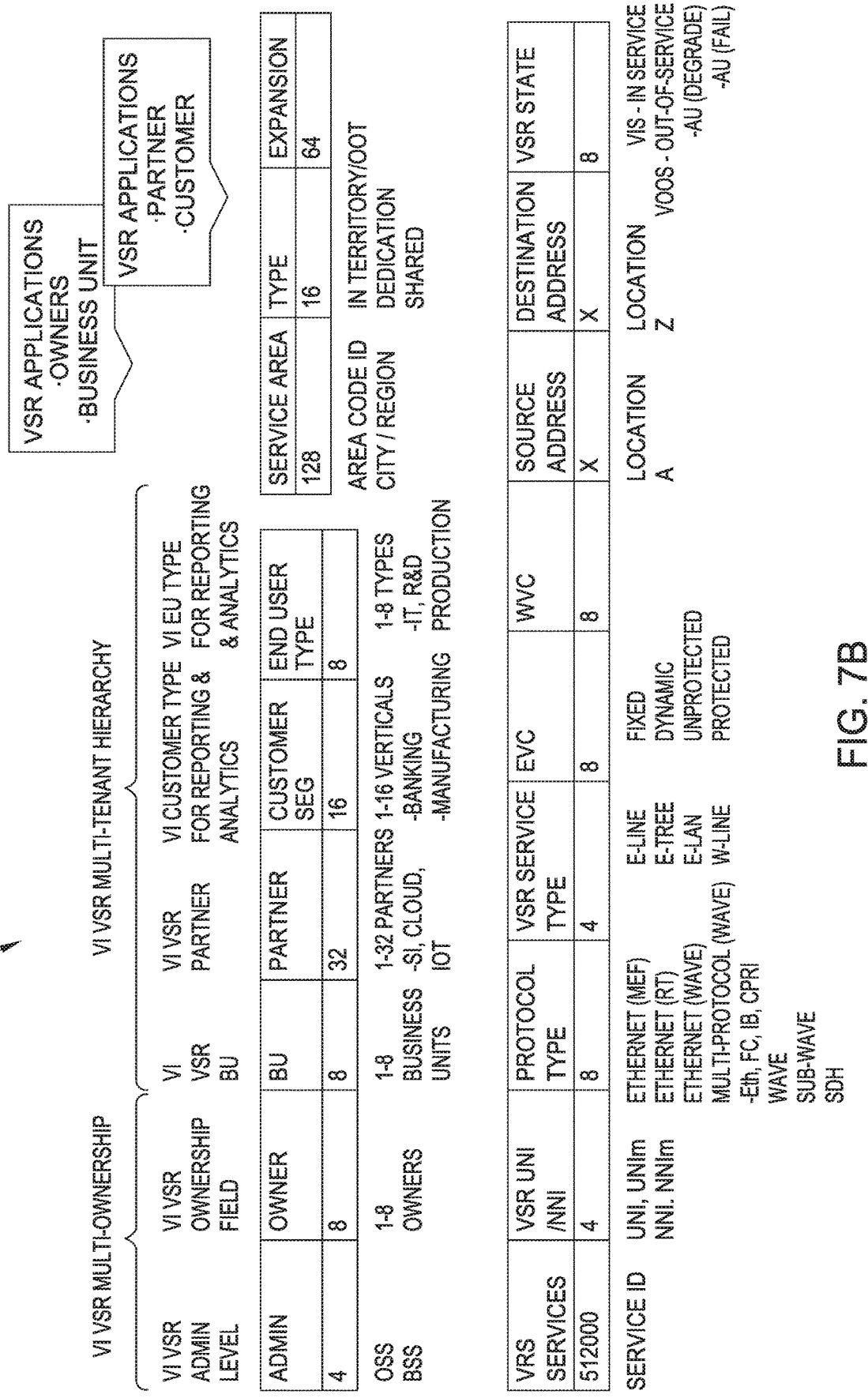

FIGS. 7A and 7B depict a service resource data structure and an associated virtualized service resource data structure.

As depicted in FIG. 7A, the SR data structure 710 includes a number of fields populated with corresponding SR information for the SR (as well as associated explanations and examples associated with at least some of the fields). The SR data structure 710 may be populated with a combination of BSS data and VI data. In this example, the SR is an Ethernet service and the SR data structure 710 includes Ethernet service information describing the Ethernet service. Namely, the SR data structure 710 includes a SERVICES field including a service identifier of the Ethernet service (illustratively, 512000), a UNI/NNI field including an indication of the type of interface of the Ethernet service (illustratively, 4), a PROTOCOL TYPE field including an indication of the protocol type of the Ethernet service (illustratively, 8), a SERVICE TYPE field including an indication of the service type of the Ethernet service (illustratively, 4), an EVC field including an identifier of the Ethernet Virtual Connection of the Ethernet service (illustratively, 8), a WVC field including an identifier of a wavelength virtual connection of the Ethernet service (illustratively, 8), a SOURCE ADDRESS field including a source address of the Ethernet service, a DESTINATION ADDRESS field including a destination address of the Ethernet service, an SR STATE field including an indication of the state of the Ethernet service (illustratively, 8), an SLA field including an identifier of a service level agreement to be supported for the Ethernet service (illustratively, 128), a RATE field including an indication of a data rate to be supported for the Ethernet service (illustratively, 128), a CIR field including an indication of a committed information rate to be supported for the Ethernet service (illustratively, 16), an EIR field including an indication of an excess information rate (burst rate) to be supported for the Ethernet service (illustratively, 16), a BILLING field including a postal address associated with the Ethernet service, a CUSTOMER ID field including a customer identifier of the customer of the Ethernet service (e.g., an account number or other suitable identifier), a CONTACT information field that includes contact information for a person responsible for the Ethernet service, a HISTORY field that includes historical information regarding the Ethernet service (e.g., a date on which the Ethernet service was first activated, a date on which the Ethernet service was last modified, or the like), a CHURN field (e.g., service date changes, administrative level, time intervals, or the like), an EXPANSION field that includes additional service attributes (availability, performance, latency, or the like), a SERVICE AREA field including an indication of a location in which the Ethernet service is provided (illustratively, 128), a TYPE field including an indication of a service area type of the service area indicated in the SERVICE AREA field (illustratively, 16), and an EXPANSION field that includes additional service attributes (availability, performance, latency, or the like). It will be appreciated that the above-described fields of SR data structure 710 may be defined in different ways, include other types of information, or the like. It will be appreciated the SR data structure 710 may include fewer or more fields of information. It will be appreciated that SR data structure 710 is an exemplary data structure for a particular type of service resource (namely, an Ethernet service) and that other data structures may be used for other types of service resources (e.g., including less or more, as well as different, information or the like).

As depicted in FIG. 7B, the VSR data structure 720 includes a number of fields populated with corresponding VSR information for the VSR (as well as associated explanations and examples associated with at least some of the fields). In this example, the VSR is a virtual Ethernet service representing virtualization of the Ethernet service described by SR data structure 710 of FIG. 7A and, thus, that the VSR data structure 720 includes Ethernet service information describing the virtual Ethernet service. As depicted in FIG. 7B, the VSR data structure 720 includes some of the fields from the SR data structure 710 of FIG. 7A, as well as additional fields, which operate to provide a virtual Ethernet service for the Ethernet service described by SR data structure 710 of FIG. 7A. The VSR data structure 720 includes an ADMIN field that includes an indication as to a type of administration which may be used for the virtual Ethernet service (illustratively, 4), an OWNER field including an identifier of the owner of the virtual Ethernet service (illustratively, 8), a BU field including an identifier of the business unit to which the virtual Ethernet service has been allocated by the owner indicated in the OWNER field (illustratively, 8), a PARTNER field including an identifier of the Partner to which the virtual Ethernet service has been allocated by the business unit indicated in the BU field (illustratively, 32), a CUSTOMER TYPE field including an identifier of the customer to which the virtual Ethernet service has been allocated by the partner indicated in the PARTNER field (illustratively, 8), an END USER TYPE field including an indication of the type of end user to which the virtual Ethernet service has been allocated by the customer indicated in the CUSTOMER TYPE field, a SERVICE AREA field including an indication of a location in which the virtual Ethernet service is provided (illustratively, 128), a TYPE field including an indication of a service area type of the service area indicated in the SERVICE AREA field (illustratively, 16), an EXPANSION field including additional service attributes (packet, circuit, SLA metrics), a VSR SERVICES field including a service identifier of the virtual Ethernet service (illustratively, 512000), a VSR UNI/NNI field including an indication of the type of interface of the virtual Ethernet service (illustratively, 4), a PROTOCOL TYPE field including an indication of the protocol type of the virtual Ethernet service (illustratively, 8), a VSR SERVICE TYPE field including an indication of the service type of the virtual Ethernet service (illustratively, 4), an EVC field including an identifier of the Ethernet Virtual Connection of the virtual Ethernet service (illustratively, 8), a WVC field including an identifier of a wavelength virtual connection of the virtual Ethernet service (illustratively, 8), a SOURCE ADDRESS field including a source address of the virtual Ethernet service, a DESTINATION ADDRESS field including a destination address of the virtual Ethernet service, and a VSR STATE field including an indication of the state of the virtual Ethernet service (e.g., In Service (IS), Out-of-Service (OOS), AU (degrade), AU (fail), or the like, which, illustratively, has a value of 8). It will be appreciated that the above-described fields of VSR data structure 720 may be defined in different ways, include other types of information, or the like. It will be appreciated the VSR data structure 720 may include fewer or more fields of information. It will be appreciated that VSR data structure 720 is an exemplary data structure for a particular type of virtualized service resource (namely, a virtual Ethernet service) and that other data structures may be used for other types of virtualized service resources (e.g., including less or more, as well as different, information or the like).

As discussed herein, virtualization of IRs of an NI of a CN provides a VNI including VIRs which may be used by various entities. The VIRs of the VNI of the CN may be managed in various ways, which may include allocation of VIRs to entities (e.g., based on hierarchical arrangements of entities), administration of VIRs by entities (e.g., based on hierarchical arrangements of entities and VIR administration policies), use of various applications to support management of VIRs (e.g. allocation, administration, reporting, or the like), or the like, as well as various combinations thereof.

Figure 8:
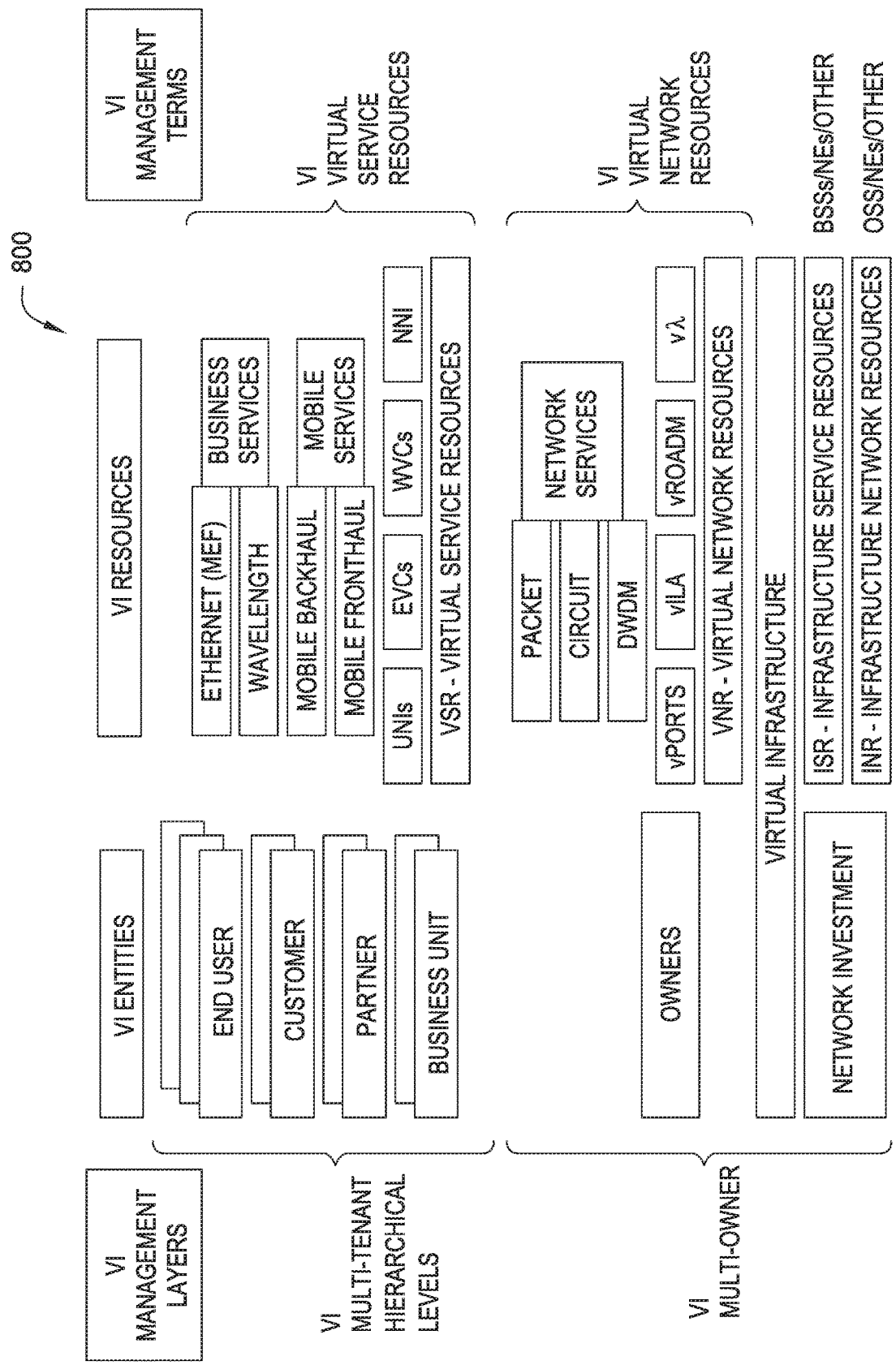
FIG. 8 depicts an exemplary representation of use of infrastructure virtualization, including allocation of virtualized infrastructure resources, to provide a virtualized infrastructure for a communication network.

The allocation of VIRs to and by owners and tenants may be performed hierarchically based on the hierarchical arrangement of the owners and tenants. The VIRs may be allocated to multiple owners, such that the NI of the CN may be shared by multiple owners. The VIRs allocated to an owner may be further allocated by that owner to one or more business unit tenants (e.g., wholesale business units, retail business units, or the like). The VIRs allocated to a business unit tenant may be further allocated by that business unit tenant to one or more partner tenants. The VIRs allocated to a partner tenant may be further allocated by that partner tenant to one or more customer tenants. The VIRs allocated to a customer tenant may be further allocated by that customer tenant to one or more end user tenants. The allocation of VIRs to and by owners and tenants may be performed responsive to requests, based on resource allocation schedules, based on resource allocation predictions, or the like, as well as various combinations thereof. The allocation of VIRs to and by owners and tenants may be performed by updating VIR data structures of the VIRs being allocated to reflect the allocation of the VIRs. For example, infrastructure virtualization may support multi-business unit (e.g., Infrastructure, Retail, or Wholesale BUs), multi-partner (e.g., Mobile, System Integrator, Cloud, Enterprise, or the like), multi-customer (e.g., various enterprise industry segments), and multi-end user (enterprise group IT, R&D, Production, S&M, or the like) virtualized resource allocation functions. The hierarchical allocation of VIRs to entities may be further understood by way of reference to FIG. 8, which depicts an exemplary representation of use of infrastructure virtualization to provide a virtualized infrastructure for a communication network (illustratively, an Ethernet over fiber network). The representation 800 of FIG. 8 illustrates various VIRs which may be allocated to various VI entities (including owners and tenants, which are arranged hierarchically).

Figure 9:
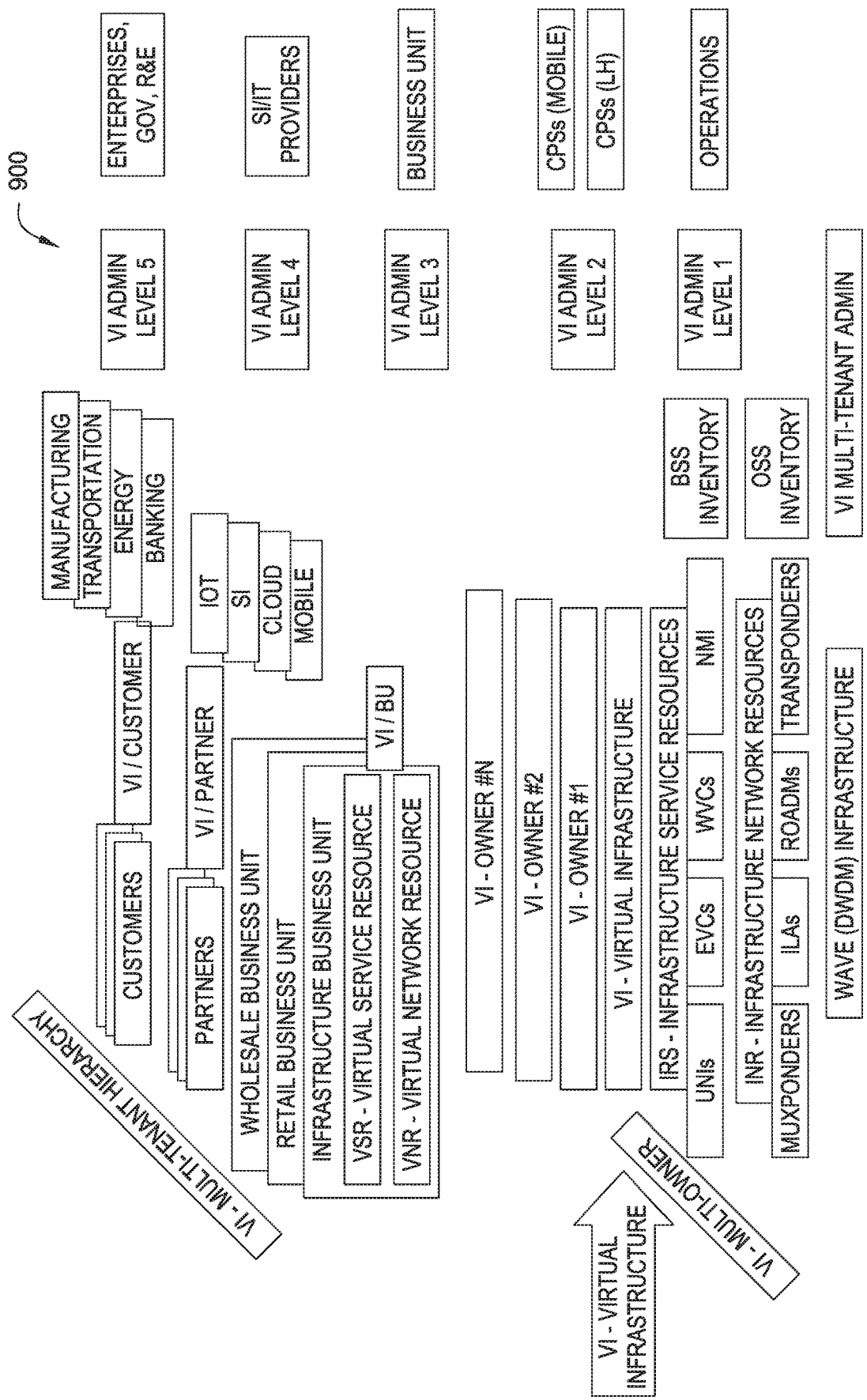
FIG. 9 depicts an exemplary representation of use of infrastructure virtualization, including administration of virtualized infrastructure resources, to provide a virtualized infrastructure for a communication network.

The administration of VIRs by owners and tenants may be performed hierarchically based on the hierarchical arrangement of the owners and tenants. An end user tenant may be responsible for administration of VIRs allocated to that end user tenant. A customer tenant may be responsible for administration of VIRs allocated to that customer tenant, including any VIRs allocated by that customer tenant to end user tenants. A partner tenant may be responsible for administration of VIRs allocated to that partner tenant, including any VIRs allocated by that partner tenant to customer tenants. A business unit tenant may be responsible for administration of VIRs allocated to that business unit tenant, including any VIRs allocated by that business unit tenant to partner tenants. An owner may be responsible for administration of VIRs allocated to that owner, including any VIRs allocated by that owner to business unit tenants. The administration of VIRs may include monitoring, reporting, notification, metrics, or the like, as well as various combinations thereof. For example, infrastructure virtualization may support multi-business unit (e.g., Infrastructure, Retail, or Wholesale BUs), multi-partner (e.g., Mobile, System Integrator, Cloud, Enterprise, or the like), multi-customer (e.g., various enterprise industry segments), and multi-end user (enterprise group IT, R&D, Production, S&M, or the like) virtual resource operations (vOAM) from allocation to reporting. The hierarchical administration of VIRs by entities may be further understood by way of reference to FIG. 9, which depicts an exemplary representation of use of infrastructure virtualization to provide a virtualized infrastructure, including administration of VIRs, for a communication network (illustratively, an Ethernet over fiber network). The representation 900 of FIG. 9 illustrates various VI entities (including owners and tenants, which are arranged hierarchically) and associated administration levels for the VI entities.

The administration of VIRs by owners and tenants may be performed based on VIR administration policies. The administration policies may dictate the types of administration operations which may be performed by different entities. For example, administration operations may include requests for information, provisioning operations, operations for in-service trouble shooting (TS-IS), operations for out-of-service troubleshooting (TS-OOS), viewing privileges, or the like, as well as various combinations thereof. It is noted that a single type of administration policy may be used for managing VIRs (e.g., a common type of policy for both VNRs and VSRs), different types of administration policies may be used for managing different types of VIRs (e.g., different types of policies for VNRs and VSRs), or the like. It is noted that exemplary administration policies for VIRs are depicted and described with respect to FIGS. 10A (for VNRs) and 10B (for VSRs).

FIGS. 10A and 10B depict exemplary administration policies for virtualized infrastructure resources.

FIG. 10A depicts an exemplary administration policy for VNRs. The VNR administration policy 1010 depicts administration privileges for different types of administration operations (illustratively, requests for information (R), provisioning operations (P), operations for TS-IS (T-IS), operations for TS-OOS (T-OOS), and viewing privileges (V)) which may be performed for VNRs. The VNR administration policy 1010 indicates the VNR hierarchical levels at which VNR administration may be performed (indicated horizontally by the columns) and the VNR administration levels (indicated vertically in the column to the left). The VNR hierarchical levels at which VNR administration may be performed may include a Level 1 NOC Administrator level (denoted as NOC Admin Level 1), an Owner level for the Service Provider SP-1 that owns the VNRs (denoted as Owner SP-1), a Wholesale Business Unit level for a Wholesale Business Unit of SP-1 (denoted as SP-1 Wholesale BU), a Partner level for Partners of the Wholesale Business Unit of SP-1 (denoted as Partner), a Customer level for Customers of Partners of the Wholesale Business Unit of SP-1 (denoted as Customer), and an End User level for End Users of Customers of Partners of the Wholesale Business Unit of SP-1 (denoted as End User). The VNR administration levels are indicated using NOC Admin Level 1, Owner SP-1, Business Unit, Partner, Customer, and End User. It is noted that an X at the intersection of one of the VNR hierarchical levels and one of the VNR administration levels, for a particular type of administration operation, indicates that the administration operation may be performed by that VNR administration level for VNRs of that VNR hierarchical level. For example, considering the row associated with the NOC Admin Level 1 administration level, it may be seen that an administrator at the NOC Admin Level 1 level is permitted to perform all administration operations for VNRs allocated to NOC Admin Level 1, VNRs allocated to Owner SP-1, VNRs allocated to SP-1 Wholesale BU, VNRs allocated to Customers, and VNRs allocated to End Users, and is permitted to perform only a subset of the administration operations for VNRs assigned to Partners (illustratively, T-OOS is not permitted). Similarly, for example, considering the row associated with the Business Unit administration level, it may be seen that an administrator at the Business Unit level may not perform any administration operations for VNRs allocated to NOC Admin Level 1 or Owner SP-1, may perform all administration operations with the exception of P operations for VNRs allocated to SP-1 Wholesale BU, and may only perform T-IS and V operations for VNRs allocated to Partners, Customers, and End Users. Similarly, for example, considering the row associated with the End Users administration level, it may be seen that an administrator at the End User level may only perform administration operations (and only a subset of the administration operations that includes T-IS and V operations) for VNRs allocated to that End User. It will be appreciated that various aspects of VNR administration policy 1010 may be modified while still supporting administration functions within the context of infrastructure virtualization (e.g., supporting fewer or more (as well as different) administration operations, supporting fewer or more (as well as different) VNR hierarchical levels, supporting fewer or more (as well as different) VNR administration levels, supporting different combinations of administrative privileges for the administrative operations for different hierarchical levels or types of entities, or the like, as well as various combinations thereof).

FIG. 10B depicts an exemplary administration policy for VSRs. The VSR administration policy 1020 depicts administration privileges for different types of administration operations (illustratively, requests for information (R), provisioning operations (P), operations for TS-IS (T-IS), operations for TS-OOS (T-OOS), and viewing privileges (V)) which may be performed for VSRs. The VSR administration policy 1020 indicates the VSR hierarchical levels at which VSR administration may be performed (indicated horizontally by the columns) and the VSR administration levels (indicated vertically in the column to the left). The VSR hierarchical levels at which VSR administration may be performed may include an SP Network Operations level (denoted as SP Network Operations), an Retail Business Unit level for the Service Provider SP that owns the VSRs (denoted as SP Retail BU), a Wholesale Business Unit level for a Wholesale Business Unit of the Service Provider SP that owns the VSRs (denoted as SP Wholesale BU), a Partner level for Partners of the Wholesale Business Unit of the SP (denoted as Wholesale Partner), a Wholesale Partner's Customer level for Customers of Partners of the Wholesale Business Unit of the SP (denoted as Whole Partner's Cust), and a Wholesale Partner's Customer's End User level for End Users of Customers of Partners of the Wholesale Business Unit of the SP (denoted as Whole Part Cust's User). The VSR administration levels are indicated using SOC Admin Level 1, Owner SP-1, Business Unit, Partner, Customer, and End User. It is noted that an X at the intersection of one of the VSR hierarchical levels and one of the VSR administration levels, for a particular type of administration operation, indicates that the administration operation may be performed by that VSR administration level for VSRs of that VSR hierarchical level. For example, considering the row associated with the SOC Admin Level 1 administration level, it may be seen that an administrator at the SOC Admin Level 1 level is permitted to perform all administration operations for VSRs allocated to SP Network Operations, VSRs allocated to the Retail Business Unit of the Service Provider SP, VSRs allocated to the Wholesale Business Unit of the Service Provider SP, VSRs allocated to Partners of the Wholesale Business Unit of the Service Provider SP, VSRs allocated to Customers of Partners of the Wholesale Business Unit of the Service Provider SP, and VSRs allocated to End Users of Customers of Partners of the Wholesale Business Unit of the Service Provider SP. Similarly, for example, considering the associated with the Business Unit administration level, it may be seen that an administrator at the Business Unit level may not perform any administration operations for VSRs allocated to the SOC Admin Level 1 or the Retail Business Unit of the Service Provider SP, and may perform all administration operations with the exception of P operations for VSRs allocated to tenants at each of the other hierarchical levels (illustratively, VSRs allocated to the Wholesale Business Unit of the Service Provider SP, VSRs allocated to Partners of the Wholesale Business Unit of the Service Provider SP, VSRs allocated to Customers of Partners of the Wholesale Business Unit of the Service Provider SP, and VSRs allocated to End Users of Customers of Partners of the Wholesale Business Unit of the Service Provider SP). Similarly, for example, considering the row of VSR administration level associated with End Users, it may be seen that an administrator at the End User level may only perform administration operations (and only a subset of the administration operations that includes T-IS and V operations) for VSRs allocated to End Users of Customers of Partners of the Wholesale Business Unit of the Service Provider SP). It will be appreciated that various aspects of VSR administration policy 1020 may be modified while still supporting administration functions within the context of infrastructure virtualization (e.g., supporting fewer or more (as well as different) administration operations, supporting fewer or more (as well as different) VSR hierarchical levels, supporting fewer or more (as well as different) VSR administration levels, supporting different combinations of administrative privileges for the administrative operations for different hierarchical levels or types of entities, or the like, as well as various combinations thereof).

As discussed herein, the hierarchical arrangement of the owners and tenants supports hierarchical management of the VIRs by and for the owners and tenants (e.g., hierarchical allocation of VIRs in a top-down direction from owners toward end users, hierarchical administration in a bottom-up direction from end users toward owners, and so forth).

The management of VIRs (e.g., allocation, administration, or the like) may be supported using various applications (APPs) which may be referred to herein as virtualized infrastructure management applications.

The APPs may include virtualized infrastructure ownership (VIO) APPs. The VIO APPs may enable two or more owners of (or investors in) a network infrastructure to have virtual resource ownership. The VIO APPs may be configured to move NRs to VNRs at the infrastructure level. The VIO APPs may be made available at various levels of granularity (e.g., per owner, per network element, or the like, as well as various combinations thereof). The VIO APPs may be configured to lower costs (e.g., lower total TCO at the metro, regional, national, or global level).

The APPs may include virtualized infrastructure multi-tenant (VIMT) APPs. The VIMT APPs may leverage the fact that many service providers which build and operate networks may have business units that offer some mixture of retail, wholesale, and infrastructure services to both internal and external groups. For example, as well as selling direct services, service providers could offer virtual infrastructure slices to partners, those partners could in-turn market and sell services to their partners and customers, and so forth. The VIMT APPs may include VI business unit (VIBU) APPs which may be configured to support hierarchical inventory, KPIs, and SLA reports per BU (e.g., where VNR per BU may refer to VNRi (infrastructure BU)+VNRr (Retail BU)+VNRw (Wholesale BU)). The VIMT APPs may include VI partner (VIP) APPs which may be configured to support hierarchical inventory, KPIs, and SLA reports per partner (e.g., where VNR per partner refers to VNRwp (Wholesale Partner #1, Partner #2, and so forth). The VIMT APPs may include VI customer (VIC) APPs which may be configured to support inventory, KPIs, and SLA reports per customer as well as offering end user reports to internal groups (e.g., where VNR per Customer refers to VNRwpc (Wholesale Partner #1 Customer #1, Partner #2 Customer #1, and so forth). The VIMT APPs may include VNR APPs, which may include NR and VNR discovery applications (e.g., discovery per tenant), VNR reporting applications (e.g., per entity), VNR provisioning applications, VNR troubleshooting applications, or the like, as well as various combinations thereof. The VIMT APPs may include VSR APPs, which may include SR and VSR discovery applications (e.g., discovery per tenant), VSR reporting applications (e.g., per entity), VSR provisioning applications, VSR troubleshooting applications, or the like, as well as various combinations thereof. The VIMT APPs may include various combinations of the above-described VIMT APPs.

The APPs may include VI operations APPS. The VI operations APPs may include applications providing VI business analytics per tenant. For example, applications providing VI business analytics per tenant may include applications providing VSR analytics per owner or BU, applications providing VNR analytics per owner or BU, applications providing VSR analytics per tenant per customer (which may be provided as a service), or the like, as well as various combinations thereof. The VI operations APPs may include applications providing VI business analytics per metric. For example, applications providing VI business analytics per metric may include applications providing per-metric VI business analytics per location (e.g., building, zone, city, regional, national, global, or the like), for churn over time (e.g., year, quarter, month, or the like), for return on investment (ROI) over time and location, for resource utilization (e.g., in-service, out-of-service, network equipped, network unequipped, or the like), for new revenue opportunity (e.g., report on in-service, assigned and unassigned resources per region, report on resources per metro, report on resources per building), for providing potential sales information to BUs and partners, for resource ready threshold crossing business alerts, or the like, as well as various combinations thereof.

The APPs may include various other types of APPs which may be used to support infrastructure virtualization.

The use of infrastructure virtualization, including various aspects thereof, may support various types of virtualized infrastructure analytics. The virtualized infrastructure analytics may include virtualized infrastructure resource analytics (e.g., for VNRs, VSR, or the like, as well as various combinations thereof). The virtualized infrastructure resource analytics may include one or more of VNR/VSR allocation and churn per time period (e.g., week, month, quarter, year, or the like), VNR/VSR allocation & churn per location (e.g., building, COLO, metro, national, global), VNR/VSR activity reports (e.g., per tenant, per time, per location, or the like), or the like, as well as various combinations thereof. The analytical data generated based on the virtualized infrastructure resource analytics may include various other types of data. The analytical data generated based on the virtualized infrastructure resource analytics may be sold per partner to aid in marketing, sales, and business return on investment (ROI). The analytical data generated based on the virtualized infrastructure resource analytics may be used by network organizations to pre-build or move network resources to meet demand. The analytical data generated based on the virtualized infrastructure resource analytics may be used by service organizations to track hot business areas and look for potential new clients. The analytical data generated based on the virtualized infrastructure resource analytics may be used for various other purposes.

The use of infrastructure virtualization, including various aspects thereof, may provide various values. In at least some cases, values associated with at least some embodiments of a multi-ownership, multi-tenancy, network and service resource hierarchy may be complex. In at least some emerging ecosystems, for example, resource ownership and partnering may be rather complex with CSPs, ICPs, CNPs, and SIs all trying to secure enterprise customers while each segment is exploiting the Internet, IP, and cloud network models. In at least some cases, for example, cloud players may be attempting to build their own solutions and market to other cloud players and end users. For at least some consumers, for example, the Internet model is rather simple and the infrastructure is invisible. For at least some enterprise private clouds, for example, public clouds and hybrid clouds are become more complex over time. The various values associated with the various aspects of infrastructure virtualization may be further understood by way of reference to an exemplary VI value cube as depicted in FIG. 11A and an exemplary VI value index as depicted in FIG. 11B.

Figure 11A:
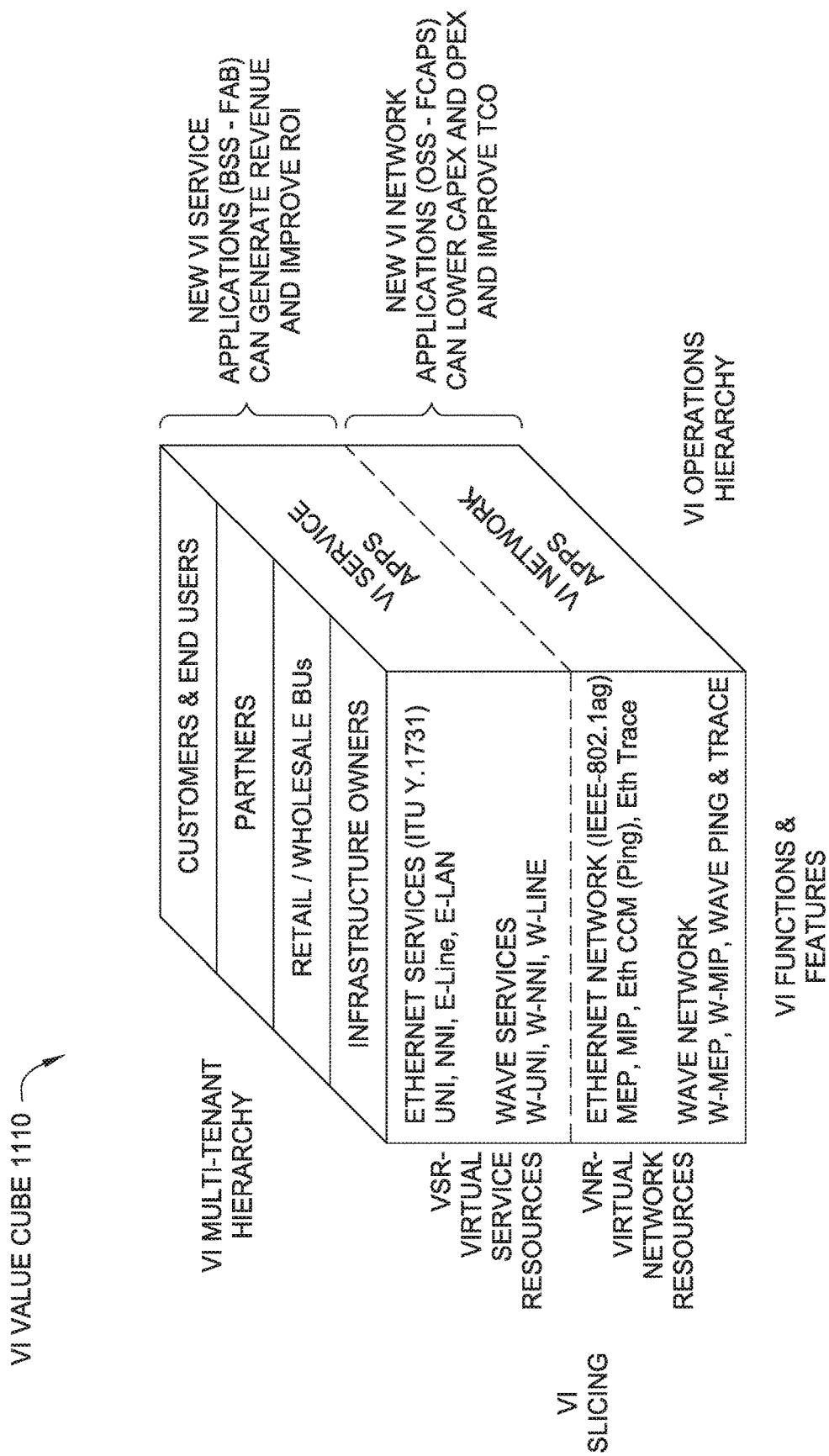
FIGS. 11A and 11B depict an exemplary VI value cube and an exemplary VI value index for embodiments of infrastructure virtualization.
Figure 11B:
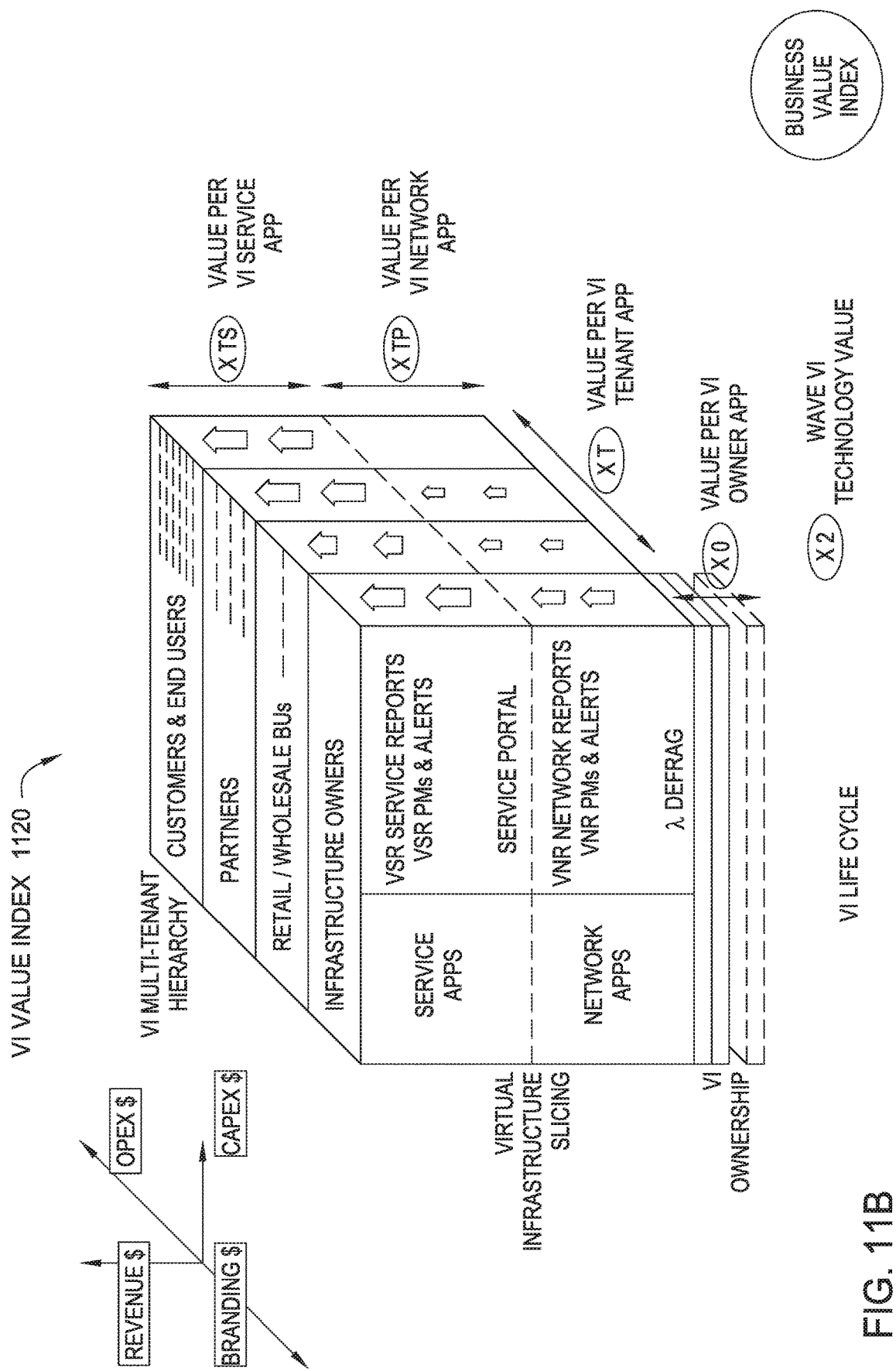

FIGS. 11A and 11B depict an exemplary VI value cube and an exemplary VI value index for embodiments of infrastructure virtualization.

FIG. 11A depicts an exemplary VI value cube for embodiments of infrastructure virtualization. The VI value cube 1110 is configured to represent various aspects of infrastructure virtualization, and may be used to aid in defining various technical and business virtualization goals. The VI value cube 1110 includes a number of dimensions, including a VI slicing dimension indicative as to the manner in which the IRs are virtualized (or sliced) to provide the VIRs, a VI multi-tenancy dimension indicative of the various hierarchical layers of tenants to which the VIRs may be allocated, and a VI applications dimension indicative of network and service applications which may be provided for VIs. The VI slicing dimension of the VI value cube 1110 indicates that, as discussed herein, VIRs may include VNRs (e.g., indicating a separation of infrastructure network resources (NR) and VNR associated at each level of tenancy) and VSRs (e.g., indicating a separation of SR and VSR at each level of tenancy). The VI slicing dimension of the VI value cube 1110 indicates that, as discussed herein, the VIRs may be allocated at various hierarchical levels which may include an infrastructure owner level (e.g., the infrastructure owner usually associated with Communications Service Providers infrastructure Business Unit), a VI Business Units level (e.g., virtual infrastructure business units usually associated with Communications Service Providers which have retail and wholesale BUs), a VI Partners level (e.g., the virtual infrastructure partners are usually large end customers that require major investments in network or service resources, which may include retail and wholesale partner providers such as mobile, cloud, and system integrator partners that may resell managed services to other smaller customers and end users), a VI Customers/End Users Level (e.g., the virtual infrastructure customers and end users include enterprise and business customers, which may sometimes be referred to as commercial customers). The VI applications dimension of the VI value cube 1110 indicates that, as discussed herein, various virtualized infrastructure management applications may be supported (e.g., various VNR APPs, VSR APPs, or the like may be provided to various tenants).

FIG. 11B depicts an exemplary VI value index for embodiments of infrastructure virtualization. The VI value index 1120 is configured to represent various aspects of infrastructure virtualization, and may be used to aid in defining resource models, prioritizing virtualization (e.g., prioritizing IRs to be virtualized to provide corresponding VIRs), determining the manner in which IRs are virtualized, indicating the type of value which will or may be provided by virtualizing particular IRs (e.g., will virtualization offer a network value, a service value, a business value, or some combination thereof), or the like, as well as various combinations thereof). The VI value index 1120 includes a number of indices, including a VI wave technology value index, a VI ownership application value index, a VI multi-tenant application value index, a VI VSR applications value index, and a VNR applications value index. The VI wave technology value index (VI technology lifecycle×2) indicates that the life cycle of wavelength technology versus IP technology is based on typical product life cycle or amortization rate (e.g., IP switching and routing products may have 3-5 year lifetimes whereas optical/DWDM products may have 8-10 year lifetimes). The VI multi-tenant application value index (VI ownership=×2 or more) enables two or more owners to share a virtualized infrastructure DWDM investment, which allows for dedicated, shared, or pooled resources. The VI multi-tenant application value index (VI Multi-Tenant=xT (xBU+yPartners) may be important as it enables more business units and partners to each have more customers than a single provider and may be extended to municipal infrastructure supporting various municipal solutions, public safety, traffic control, security, health, BBA initiatives, municipal/industrial IOT, or the like. It is noted, with respect to the VI multi-tenant application value index, that the VI Network APPs shown in the bottom portion of the VI value cube 1110 may have high value to the Infrastructure BU, and may have less value across the hierarchy of tenants (e.g., end users may not value path computation or wavelength defragmentation applications that recover bandwidth similar to how disk defragmentation may find additional storage in a PC). It also is noted, with respect to the VI multi-tenant application value index, that the VI Service APPs shown in the top portion of the VI value cube 1110 may offer higher value to every level of tenancy. For example, the value of SLA reporting and/or a service portal may offer less value to Infrastructure BU, but be of high value to wholesale and retail BUs, wholesale partners (e.g., SI, Cloud, and Mobile) as well as end customers (e.g., enterprises in banking through manufacturing). For example, end users may value both monthly SLA reports and/or real time SLA metrics via a self-server portal, partners and BUs can customize reports and portal features to offer differentiated features (email or text notifications of faults or threshold (changes in delay or performance)), and so forth. The VI VSR applications value index is associated with VSR APPs which can be provided for a range of service functions and features that may have high value for various levels of the multi-tenant hierarchy. For example, VSR APPs may include VSR reporting applications which may report SLA metrics (e.g., on VSRs, per tenant in the hierarchy, at various levels of granularity and time scales (e.g., real-time, monthly, quarterly, yearly, or the like)), VSP portal applications which may offer a portal to each level of the multi-tenant hierarchy for updates at various levels of granularity and time scales (e.g., real-time, monthly, quarterly, yearly, or the like)), may offer service support escalation per client service level (e.g., end users may escalate to customers, customers may escalate to partners, partners may escalate to BUs, and BUs may escalate to owners). The VNR applications value index is associated with VNR APPs which can be provided for a range of functions and features that may have various levels of value for various levels of the multi-tenant hierarchy. For example, VNR APPs may include VNR discovery applications which may discover VNRs at various levels of granularity (e.g., per tenant per location/geography (e.g., building, metro, regional, and nationally in the hierarchy (e.g., inventory, state, transition notification, or the like)), discovery VNRs per tenant in the hierarchy (e.g., inventory, state, transition notification, or the like), or the like, as well as various combinations thereof. For example, VNR APPs may include VNR reporting applications which may report on VNRs per tenant in the hierarchy at various levels of granularity and time scales (e.g., real-time, monthly, quarterly, yearly, or the like).

Figure 12:
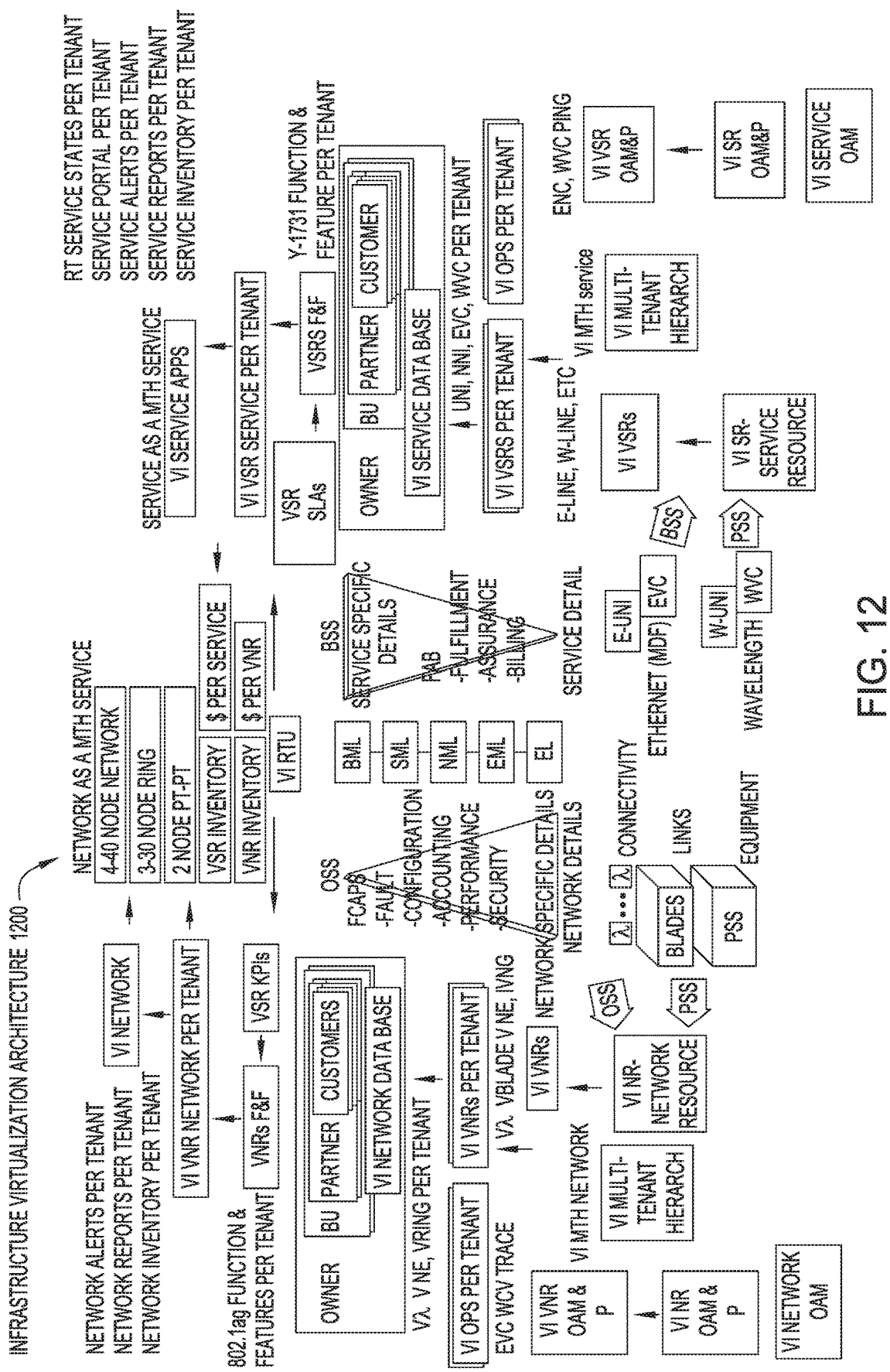
FIG. 12 depicts an exemplary infrastructure virtualization architecture configured to provide a virtualized infrastructure for a communication network.

FIG. 12 depicts an exemplary infrastructure virtualization architecture configured to provide a virtualized infrastructure for a communication network. As depicted in FIG. 12, infrastructure virtualization architecture 1200 includes various elements configured to provide a virtualized infrastructure for a communication network. The infrastructure virtualization architecture 1200 includes various elements associated with virtualization of infrastructure resources of a communication network to provide a virtualized infrastructure for the communication network. For example, infrastructure virtualization architecture 1200 includes network elements supporting network resources which may be virtualized to provide virtualized network resources and service resources which may be virtualized to provide virtualized service resources. For example, infrastructure virtualization architecture 1200 includes support systems (e.g., OSSs, BSSs, and the like), which may provide information which may be processed to provide virtualization of infrastructure resources to provide virtualized infrastructure resources (e.g., information associated with network elements of the communication network), which may support control over configuration of network elements to support the virtualized infrastructure resources (e.g., via messaging with network elements of the communication network), which may support management of the virtualized infrastructure resources (e.g., via messaging with network elements of the communication network, various other management systems, or the like, as well as various combinations thereof), or the like, as well as various combinations thereof. For example, infrastructure virtualization architecture 1200 includes hierarchical arrangements of virtualized infrastructure resources. For example, infrastructure virtualization architecture 1200 supports hierarchical management of virtualized infrastructure resources. These and various other capabilities of infrastructure virtualization architecture 1200 may be further understood by way of reference to other figures provided herein.

Figure 13:
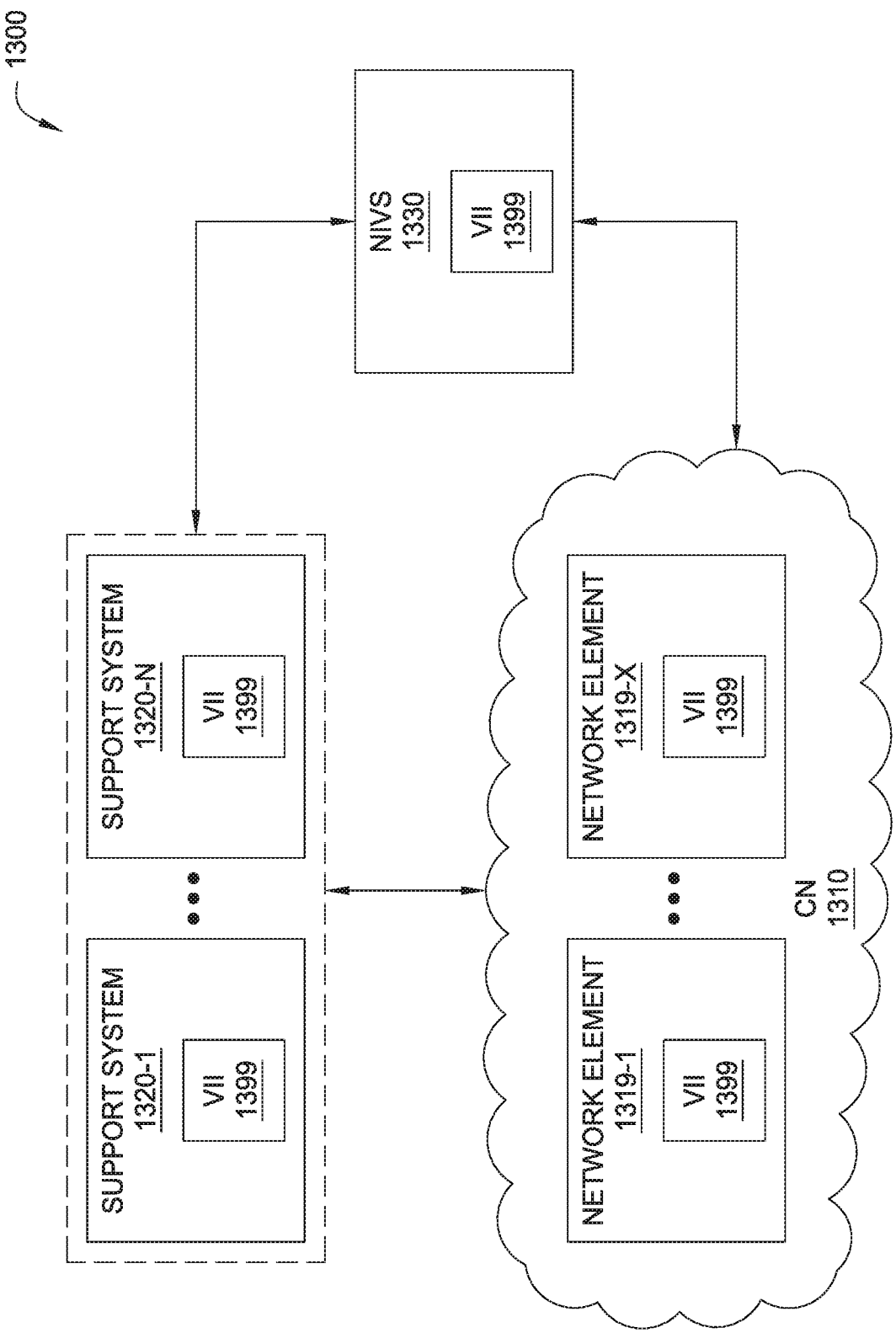
FIG. 13 depicts portions of a system configured to support network infrastructure virtualization to provide a virtualized infrastructure for a communication network.

FIG. 13 depicts portions of a system configured to support network infrastructure virtualization to provide a virtualized infrastructure for a communication network. As depicted in FIG. 13, system 1300 includes a CN 1310 (which may be similar to CN 110 of FIG. 1), a set of SSs 1320-1-1320-N (which may be similar to SSs 120 of FIG. 1) and a NIVS 1330 (which may be similar to NIVS 130 of FIG. 1). As discussed herein, various aspects of network infrastructure virtualization to provide a virtualized infrastructure for a communication network, including both creation and use of a virtualized infrastructure for a communication network, may involve various types of communications (e.g., various types of messages, various types of information, or the like, as well as various combinations thereof) between various elements. The communications may include requests for information, reports of information, requests for resource allocation, reports of resources allocated, configuration instructions or commands, or the like, as well as various combinations thereof. The communications may include various types of information associated network infrastructure virtualization to provide a virtualized infrastructure for a communication network, including creation and use of a virtualized infrastructure for a communication network. The communication of such information is represented as virtualized infrastructure information (VII) 1399, which is depicted as being stored on NEs 1319 of CN 1310, SSs 1320, and NIVS 1330. It will be appreciated that although depicted using a common designator of VII 1399, the types of VII 1399 stored on the different element types (e.g., NEs 1319 versus SSs 1320 versus NIVS 1330) may be different. For examples, NIVS 1330 may store full VIR data structures for VIRs, SSs 1320 may store portions of the full VIR data structures for VIRs that are stored by NIVS 1330, and network elements 1319 may store portions of the VIR data structure portions for VIRs that are stored by SSs 1320). For example, NIVS 1330 may store VII 1399 which may be used to configure SSs 1320 to support VIRs, NIVS 1330 may store VII 1399 which may be used to configure network elements 1319 to support VIRs, SSs 1320 may store VII 1399 which may be used to configure network elements 1319 to support VIRs, network elements 1319 may store VII 1399 which may be used to support use of VIRs, or the like, as well as various combinations thereof.

In at least some embodiments, for example, the NIVS 1330 may be configured to support various types of communications.

In at least some embodiments, for example, NIVS 1330 may be configured to provide, to at least one of an SS 1320 or a network element 1319 of CN 1310, a message including at least a portion of a virtualized infrastructure resource data structure including VII for a VIR associated with the network element 1319. The virtualized infrastructure resource data structure including VII may include all or part of a VNR data structure, such as VNR data structure 620 of FIG. 6B (e.g., identifying ownership, multi-tenant hierarchy, VNR details, or the like, as well as various combinations thereof). The virtualized infrastructure resource data structure including VII may include all or part of a VSR data structure, such as VSR data structure 720 of FIG. 7B (e.g., identifying ownership, multi-tenant hierarchy, VSR details, or the like, as well as various combinations thereof). The message may include various other types of information described herein.

In at least some embodiments, for example, NIVS 1330 may be configured to receive, from at least one of an SS 1320 or a network element 1319 of CN 1310, a message related to virtualization of IRs to provide VIRs or to use of VIRs by various entities. The message may be a query result message provided responsive to a query initiated by NIVS 1330, an assignment result message provided responsive to a resource assignment initiated by the NIVS 1330 and/or an SS 1320, an allocation result message provided responsive to a resource allocation initiated by the NIVS 1330 and/or an SS 1320, an administration result message provided responsive to a resource administration message initiated by the NIVS 1330 and/or an SS 1320, or the like, as well as various combinations thereof.

In at least some embodiments, for example, an SS 1320 (e.g., an OSS, a BSS, or the like) may be configured to support various types of communications.

In at least some embodiments, for example, an SS 1320 may be configured to (a) receive, from a management system (e.g., NIVS 1330), a message including at least a portion of a virtualized infrastructure resource data structure including VII for a VIR associated with a network element 1319 of CN 1310 and (b) store at least a portion of the VII of the message for use by the SS 1320 in performing a support function for the network element 1319 (e.g., for the VIR with which the virtualized infrastructure resource data structure including the VII is associated). In at least some embodiments, for example, an SS 1320 may be configured to (a) receive, from a management system (e.g., NIVS 1330), a message including at least a portion of a virtualized infrastructure resource data structure including VII for a VIR associated with a network element 1319 of CN 1310 and (b) initiate a support function for the network element 1319 (e.g., for the VIR with which the virtualized infrastructure resource data structure including the VII is associated) based on the VII included in the message. In at least some such embodiments, the support function may include a provisioning function (e.g., provisioning the network element 1319 such that a VNR or VSR may be used by an entity), a monitoring function (e.g., performing monitoring on the network element for a VNR or VSR being used by an entity, or the like), an administrative function, or the like, as well as various combinations thereof.

In at least some embodiments, for example, an SS 1320 may be configured to (a) receive, from a network element 1319, a message including information associated with a VIR and (b) store the information associated with the VIR (e.g., for use by the SS 1320 in performing a support function for the network element 1319, for later propagation to a management system (e.g., NIVS 1330), or the like, as well as various combinations thereof). In at least some embodiments, for example, an SS 1320 may be configured to (a) receive, from a network element 1319, a message including information associated with a VIR and (b) propagate at least a portion of the information associated with the VIR toward a management system (e.g., NIVS 1330) for use by the management system in performing a management function for the VIR (e.g., an allocation function, an administrative function, or the like, as well as various combinations thereof).

In at least some embodiments, for example, a network element 1319 (e.g., a router, a switch, an ROADM, or the like) may be configured to support various types of communications.

In at least some embodiments, for example, a network element 1319 may be configured to (a) receive, from a management system (e.g., an SS 1320, NIVS 1330, or the like), a message including at least a portion of a virtualized infrastructure resource data structure including VII for a VIR associated with a network element 1319 of CN 1310 and (b) store at least a portion of the VII of the message for use by the network element 1319 in supporting the VIR with which the virtualized infrastructure resource data structure including the VII is associated (e.g., for assignment of the VIR to an owner, for allocation of the VIR to one or more tenants at one or more hierarchical layers, for enabling use of the VIR by one or more associated entities, for supporting management of the VIR by one or more associated entities, for supporting administration of the VIR by one or more associated entities, or the like, as well as various combinations thereof).

In at least some embodiments, for example, a network element 1319 may be configured to (a) receive, from a management system (e.g., an SS 1320, NIVS 1330, or the like), a message including at least a portion of a virtualized infrastructure resource data structure including VII for a VIR associated with a network element 1319 of CN 1310 and (b) use at least a portion of the VII of the message to support the VIR with which the virtualized infrastructure resource data structure including the VII is associated (e.g., for assignment of the VIR to an owner, for allocation of the VIR to one or more tenants at one or more hierarchical layers, for enabling use of the VIR by one or more associated entities, for supporting management of the VIR by one or more associated entities, for supporting administration of the VIR by one or more associated entities, or the like, as well as various combinations thereof).

It will be appreciated that the VII 1399 may be considered to include any information discussed herein in conjunction with network infrastructure virtualization to provide a virtualized infrastructure for a communication network (including creation and use of virtualized infrastructure for a communication network).

Various embodiments of the network infrastructure virtualization mechanism may support various other network virtualization functions and features. For example, infrastructure virtualization may enable the abstraction of various types of networking and may offer virtualized infrastructure resources to various types of entities (e.g., CSPs, ICPs, CNPs, Enterprises, cloud providers (e.g., system integrators, IT hosting, consumer, commercial, municipalities, governments, or the like), or the like, as well as various combinations thereof. For example, infrastructure virtualization may provide a VNI such that (1) at the database level, the VNI offers new VNRs and VSRs that support the emerging ecosystems of players, partners and products, (2) at the OSS/BSS level, the VNI offers a new hierarchical multi-tenant resources (inventory, policy, resource allocation, and so forth) model, and (3) at the core, metro, and access level, the VNI offers VNR and VSR assets that lower Total Cost of Ownership (TCO) and add accountability for dedicating, sharing, and pooling resources that match business models to solution and service models in use today. For example, where network infrastructure virtualization is applied to a Ethernet-over-fiber metro network at a city level (e.g., where a new infrastructure is required to scale the metro network and support 1G to 100G services over a 10 to 100 Tbps infrastructure network), the Ethernet-over-fiber metro network infrastructure owner could be a CSP, an ICP, or a CNP having both retail and wholesale business units, the BUs can support a range of Partners from top to bottom (e.g., including ICPs, CNPs, SIs, Enterprises, and even Municipalities as they transition to digital cities, and scale IP services supporting e-commerce, cloud computing, industrial IOT, or the like), with per-partner infrastructure slicing options partners could choose their own VNRs and offer a range of VSRs (e.g., wavelength, Ethernet, IP services, or the like), the VI resource allocation can scale up and/or scale down per tenant so that partners can be offered 1G to 10T of dedicated or shared capacity, and each tenant (BU, Partner, Customer, or End User) could be assigned virtualized resources and offered software applications for VNR & VSR ordering, provisioning and reporting per location, per time frame, per project, or the like.

Various embodiments of the network infrastructure virtualization mechanism may provide or tend to provide various other advantages. For example, infrastructure virtualization may support existing, emerging, and future mobile and cloud ecosystem models to scale the Internet, the IOT, or the like. For example, infrastructure virtualization may provide a new hierarchical model for owners and tenants that improves TCO (e.g., lowers CAPEX and OPEX), grows revenues (e.g., improves Return on Investment (ROI)), or the like, as well as various combinations thereof. For example, infrastructure virtualization may obviate the need for building and operating single-operator infrastructure networks and, instead, may offer new solutions for virtualizing infrastructure investments, thereby enabling or potentially enabling lowering of CAPEX since infrastructure investment can be distributed across multiple owners (e.g., enabling CSPs to invest in-territory and out-of-territory, enabling ICPs to invest in global cores and target metros, enabling Mobile ecosystems to invest in shared infrastructure, or the like), lowering of OPEX since network and service operations can be scaled with partners (e.g., enabling CSPs, ICPs, GNPs, SIs, and enterprises to share operations, enabling VNR and VSR resource models per tenant, or the like), improving revenue through new services, new business models, multiple service partners, and so forth (e.g., enabling CSPs, ICPs, GNPs, and retail and wholesale business units, enabling partners for IT, Cloud, Mobile, and industrial IOT, or the like), lowering TCO and building brands for existing and emerging ecosystems (e.g., enabling CSPs, ICPs, and GNPs to co-brand with technology and service partners, such as CSPs plus Cloud, Mobile, and IT Partners, ICPs plus Network & Service Partners, GNPs plus Network, Service, Cloud, and Enterprise Partners, or the like), or the like, as well as various combinations thereof. For example, the VNR asset model may improve bottom line cost allocation and the VSR asset model may improve top line earnings and enable revenue generation (e.g., VSR assets can be offered as services to a hierarchy of tenants, and each tenant, in turn, can offer services and generate revenue on this virtualized infrastructure business model). For example, the multi-tenant hierarchy may build on the shared asset models and offer further reduction of CAPEX and OPEX (e.g., network CAPEX and OPEX can be shared across many tenants (VNRs per tenant) to further lower TCO and each tenant can offer services (VSRs per tenant) to grow revenue and improve ROI). For example, infrastructure virtualization may enable an enhanced infrastructure business model, thereby resulting in an effective way to manage hardware and software assets in the existing, emerging, and future ecosystems. For example, infrastructure virtualization may be configured to lower TCO at various levels (e.g., at one or more of the metro, regional, national or global level), improve ROI, enable additional revenue for both in-territory and out-of-territory businesses, or the like, as well as various combinations thereof. For example, infrastructure virtualization may be used in combination with other types of solutions which may improve communication networks (e.g., SDN solutions, NFV solutions, or the like, as well as various combinations thereof).

It will be appreciated that, although primarily presented herein with respect to embodiments of providing infrastructure virtualization for a particular type of communication network (namely, a DWDM network supporting Ethernet services), infrastructure virtualization may be provided within various other types communication networks.

The present disclosure discloses new infrastructure resource states. The new infrastructure resource states may be configured to aid in managing both infrastructure resources (IRs) and virtualized infrastructure resources (VIRs). The new resources states may include a Network Unequipped (NU) state, a Network Equipped (NE) state, a Network Ready (NR) state, a Service Ready (SR) state, an Out-of-Service (OOS) state, and an In-Service (IS) state. The NU and NE states may be associated with discovery of resources (e.g., IRs and VIRs) and inclusion of resources in inventory. The NR and SR states may be associated with resources that have been discovered and provisioned, but not yet put into service. The new infrastructure resource states may be configured to enable resource transfers in a programmable virtual infrastructure having one or more entities (e.g., Owners, BUs, Partners, Customers, or the like) at one or more hierarchical layers. The new infrastructure resource states may be configured to enable resource transfers in a programmable virtual infrastructure having one or more owners at one or more hierarchical layers and one or more tenants (e.g., BUs, Partners, Customers, or the like) at one or more hierarchical layers. The new infrastructure resource states may complement states such as: (1) Telecom In Service (T-IS), which may indicate that a resource is active without any associated alarm, (2) Telecom Out-Of-Service (T-OSS), which may include T-OSS-D which indicates a service degradation (e.g., minor alarm) and T-OSS-F which indicates a service failure (e.g., major alarm), and (3) Telecom Administrative (T-A) which may include Telecom Administrative Up (T-AU) and Telecom Administrative Down (T-AD).

The new resource states may be configured to support management of IRs. The new resource states may be configured to support virtualization of IRs to provide VIRs. The new resource states may be configured to support management of VIRs. The new resource states may be configured to support VIR management for multi-owner virtualization such that multiple owners may manage resource allocation of the network infrastructure of the communication network and multi-tenant virtualization such that multiple tenants, at one or more hierarchical layers, may share portions of the network infrastructure of the communication network. The new resource states may be configured to support assignment, allocation, and administration of VIRs (including multi-owner and multi-tenant hierarchical network and service resource ownership) which may include supporting assignment, allocation, and administration of VIRs in a manner that is not feasible (or at least more difficult) using existing telecom states for network resources (which typically only include T-IS, T-OOS, T-AU, and T-AD).

The network infrastructure virtualization mechanism, as discussed above, may be configured to support a resource state model including a set of infrastructure resources states and various state transitions between infrastructure resource states. The set of infrastructure resource states, as discussed above, may include the NU state, the NE state, the NR state, the SR state, the IS state, and the OOS state. A description of the infrastructure resources states and associated state transitions follows. In general, the NU state may indicate that the resource is currently in the resource inventory, but is not yet in the network inventory. The NU state may be entered as an initial state or from the NE state. In general, the NE state may indicate that the resource is currently in the network inventory, but is not yet configured or provisioned. The NE state may be entered from the NU state or the NR state. In general, the NR state may indicate that the resource is currently in the network inventory and is configured, but is not yet in the service inventory. The NR state may be entered from the NE state or the SR state. In general, the SR state may indicate that the resource is currently in the network inventory and in the service inventory, but is not yet in service. The SR state may be entered from the NR state, the IS state, or the OOS state. In general, the IS state may indicate that the associated resource is in service. The IS state may be entered from the SR state or from the OOS state. In general, the OOS state may indicate that the associated resource, while service ready, is out of service (e.g., administratively, due to a failure or other alarm state, or the like). The OOS state may be entered from the SR state or the IS state. It is noted that the various infrastructure resource states, and associated various state transitions between the infrastructure resource states, may be used to provide various functions.

In at least some embodiments, NRs (e.g., network elements, cards, wavelengths, or the like) and associated VNRs (e.g., virtual network elements, virtual cards, virtual ports, virtual wavelengths, or the like) may be managed using each of these infrastructure resource states (e.g., the NU state, the NE state, the NR state, the SR state, the OOS state, and the IS state). The infrastructure resource states, when used for VNRs, may be referred to as virtualized infrastructure resource VNR states (e.g., an IS VNR state, an OOS VNR state, an SR VNR state, an NR VNR state, an NE VNR state, and an NU VNR state) so as to distinguish between VNR states and VSR states. The NU state for NRs and VNRs may be used for discovered potential future resources that are not yet included in the physical inventory (e.g., not yet in the OSS or other physical inventory system(s)). The NE state for NRs and VNRs may be used for discovered resources that are included in the physical inventory (e.g., included in the OSS or other physical inventory system(s)). The NR state for NRs and VNRs may be used for resources that are provisioned and ready for VNR transfers. The SR state for NRs and VNRs may be used for resources that are provisioned and allocated as a service resource, but which are not yet in service in the service system (e.g., in the BSS or other service support system(s)).

In at least some embodiments, SRs (e.g., UNIs, NNIs, or the like) and associated VSRs (e.g., UNIs, NNI, EVCs, WVCs, or the like) may be managed using a subset of these infrastructure resource states (e.g., the SR state, the OOS state, and the IS state). The infrastructure resource states, when used for VSRs, may be referred to as virtualized infrastructure resource VSR states (e.g., an IS VSR state, an OOS VSR state, and an SR VSR state) so as to distinguish between VSR states and VNR states. The SR state for SRs and VSRs may be used for resources that are provisioned and allocated as a service resource, but which are not yet in service in the service system (e.g., in the BSS or other service support system(s)).

The infrastructure resource states, as discussed above, may be configured to support virtualization of IRs to provide VIRs, management of IRs and VIRs, or the like, as well as various combinations thereof. The infrastructure resource states may be configured to reflect various hierarchies associated with virtualization of IRs to provide VIRs (e.g., the hierarchy of the NRs/VNRs, the hierarchy of the SRs/VSRs, the hierarchy of entities to which VIRs may be assigned and allocated, or the like, as well as various combinations thereof). The infrastructure resource states may be configured to support new VI states per entity (e.g., VNR and/or VSR analytics per owner or BU, VSR analytics per tenant, per customer (e.g., which may be offered as a VI Analytics per Tenant Service). The infrastructure resource states may be configured to support better tracking of IRs and VIRs (e.g., in terms of availability, assignment, allocation, use, or the like, as well as various combinations thereof). The infrastructure resource states may be configured to support various types of resource transfers between various types of entities including owners and tenants. The infrastructure resource states may be configured to support various types of IR and VIR management functions. The infrastructure resource states may be configured to support various types of IR and VIR assignment functions. The infrastructure resource states may be configured to support various types of IR and VIR allocation functions. The infrastructure resource states may be configured to support various types of IR and VIR administration functions. The infrastructure resource states may be configured to support various types of IR and VIR pooling functions. The infrastructure resource states may be configured to support various types of IR and VIR reporting functions. The infrastructure resource states may be configured to support various other types of functions as discussed further below.

In at least some embodiments, the unassigned resource states may be used to improve allocation of resources. For example, in a DWDM network, the unassigned resources states may be used to improve allocation of ports, cards, shelves, nodes, wavelengths, fibers, or the like. It will be appreciated, that by having a global view of the available resources of a given system, entities can create tools and processes to enable vertical software-defined networks, services, operations, or the like, as well as various combinations thereof.

In at least some embodiments, the unassigned and assigned resource states may be leveraged to provide a holistic view of unassigned and assigned resources which can provide various types of value. The holistic view of unassigned and assigned resources may enable various entities associated with the network to understand various types of metrics (e.g., % Ports used, % Ports not used but available, % Ports not used but not available, % Cards used, % Cards not used but available, % Shelf free slots, % of λ assigned versus unassigned for a given fiber, % of unassigned bandwidth, or the like, as well as various combinations thereof). This may enable various entities to understand which portions of the network have been monetizes and which portions of the network can still be shared and/or used for monetization purposes.

In at least some embodiments, resource values derived from the unassigned and assigned resource states may be leveraged to enable resource usage summary reporting. For example, with knowledge of unassigned and assigned resources it is possible to understand CAPEX versus OPEX, percentage of system churn (e.g., per network type, per location, per type of location, per industry sector, or the like), or the like, as well as various combinations thereof. It is noted that such resource usage summaries can be leveraged to promote and/or reassign underutilized resources to maximize investment. For example, it may be possible for an entity to promote unused or underutilized equipment to entities lower in the hierarchy, support ease of use (e.g., automated fulfillment management, efficient resource and service inventory and order management, or the like), help a customer monetize its infrastructure (e.g., improve OPEX savings, increasing topline revenue, enabling quick time to revenue, or the like), maximize network resources (e.g., optimize CAPEX planning, enabling just-in-time network investment, or the like), permit multichannel integration (e.g., integration of provider/wholesale/retail commerce channel or the like), or the like, as well as various combinations thereof.

Figure 14:
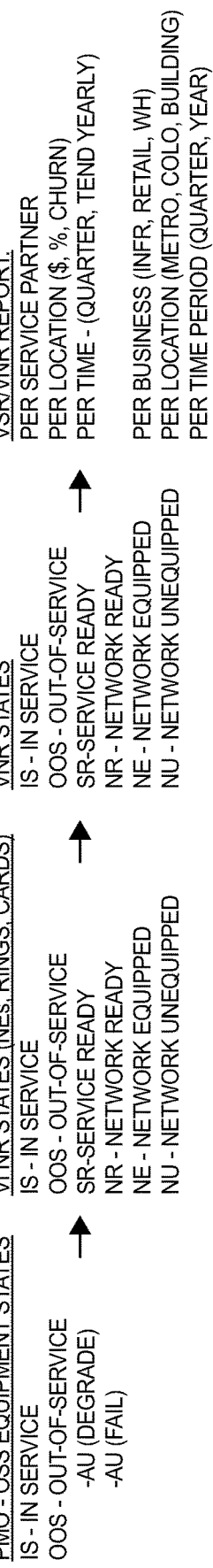
FIG. 14 depicts portions of the network resource and virtualized network resource data structures of FIGS. 6A and 6B, illustrating use of infrastructure resource states.

FIG. 14 depicts portions of the network resource and virtualized network resource data structures of FIGS. 6A and 6B, illustrating use of infrastructure resource states.

As depicted in FIG. 14, the NR data structure 610 of FIG. 6A has been modified to support additional states for the NR State field to provide thereby an NR data structure 1410. The additional states, as discussed above, include the SR state, the NR state, the NE state, and the NU state, which enable finer granularity of management of and control over network resources.

As further depicted in FIG. 14, the VNR data structure 620 of FIG. 6B has been modified to support additional states for the VNR State field to provide thereby a VNR data structure 1420. The additional states, as discussed above, include the SR state, the NR state, the NE state, and the NU state, which enable finer granularity of management of and control over virtualized network resources. As further depicted in FIG. 14, the additional resource states provide additional VI value (e.g., in terms of supporting improved management of VNRs), provide additional business value (e.g., in terms of the improving administration of VNRs and associated VNR reporting), or the like. For example, the additional resource states may support VNR reporting per service partner, per location (e.g., $, %, churn, or the like), per time (e.g., quarterly, yearly, or the like), per business (e.g., infrastructure, retail, wholesale, or the like), per location (e.g., metro, building, or the like), or the like, as well as various combinations thereof.

FIG. 15 depicts portions of the service resource and virtualized network resource data structures of FIGS. 7A and 7B, illustrating use of infrastructure resource states.

As depicted in FIG. 15, the SR data structure 710 of FIG. 7A has been modified to support additional states for the SR State field to provide thereby an SR data structure 1510. The additional states, as discussed above, include the SR state, the NR state, the NE state, and the NU state, which enable finer granularity of management of and control over service resources.

As further depicted in FIG. 15, the VSR data structure 720 of FIG. 7B has been modified to support additional states for the VSR State field to provide thereby a VSR data structure 1520. The additional states, as discussed above, include the SR state, the NR state, the NE state, and the NU state, which enable finer granularity of management of and control over virtualized service resources. As further depicted in FIG. 15, the additional resource states provide additional VI value (e.g., in terms of supporting improved management of VSRs), provide additional business value (e.g., in terms of the improving administration of VSRs and associated VSR reporting), or the like. For example, the additional resource states may support VSR reporting per customer, per vertical, per project, per owner, per BU, per partner, per location (e.g., CLE, COLO, datacenter, or the like), per time (e.g., quarterly, yearly, or the like), or the like, as well as various combinations thereof.

Figure 16:
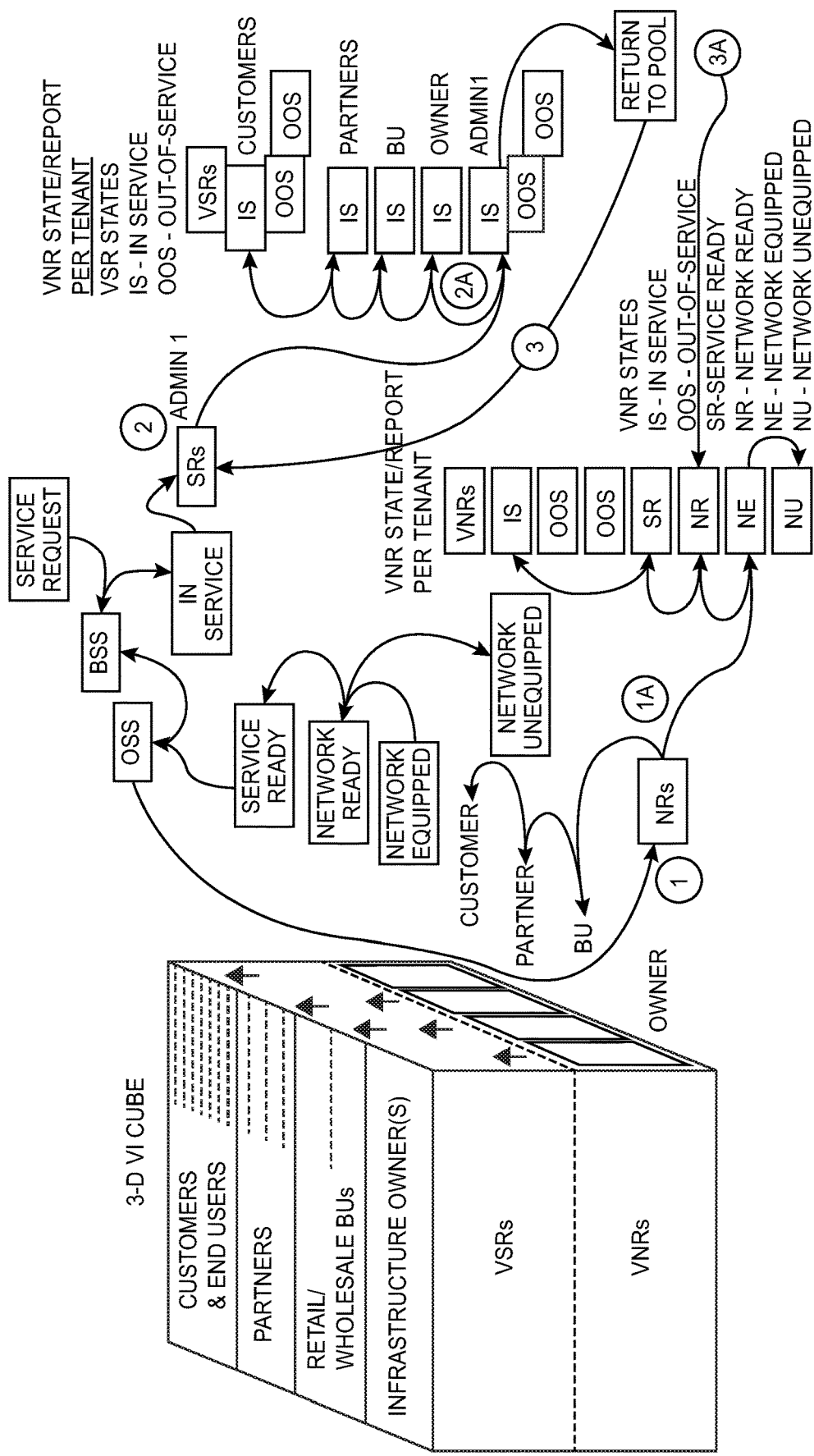
FIG. 16 depicts use of infrastructure resource states to support transfers of virtualized infrastructure resources.

FIG. 16 depicts use of infrastructure resource states to support transfers of virtualized infrastructure resources. As depicted in FIG. 16, the use of infrastructure resource states to support transfers of virtualized infrastructure resources is primarily depicted and described within the context of a VI value cube similar to the VI value cube 1110 of FIG. 11A.

As depicted in FIG. 16, in order to support transfer of a VNR, at each layer of the virtualized infrastructure hierarchy, the VNR may be transitioned through the set of VNR states supported for VNRs. The transitioning of the VNR through the set of VNR states at a particular level of the virtualized infrastructure hierarchy may include transitions from the NR state to the SR state to the IS state (illustrated by the arrows between the set of VNR states). The VNR, after being transitioned to the IS state at a particular level of the hierarchy, is then available for allocation to a tenant at the next level of the virtualized infrastructure hierarchy (illustrated by the arrows between the hierarchical levels. The VNR, when allocated to the tenant at the next level of the virtualized infrastructure hierarchy, is in the NE state at that next level of virtualized infrastructure hierarchy and may then be transitioned through the set of VNR states supported for VNRs at that next level of the virtualized infrastructure hierarchy (again, from the NR state to the SR state to the IS state). As illustrated in FIG. 16, the transitions of the VNR between the various VNR states supported for VNRs at the various hierarchical levels may be performed at the OSS (or other suitable support system) and at the NEs (illustratively, depicted as the NRs, which will be understood to be NRs at the NEs in the communication network). The transitions of the VNR between the various VNR states supported for VNRs at the various hierarchical levels may be performed at the OSS responsive to messaging from a higher layer management system which is omitted for purposes of clarity (e.g., an NIVS, such as NIVS 130 of FIG. 1). The transitions of the VNR between the various VNR states supported for VNRs at the various hierarchical levels may be performed at the NEs responsive to messaging from the OSS to the NEs (which may cause storage of VNR information for the VNR in the NEs, configuration of the NEs to support the VNR (e.g., modification of the states of the VNRs, configuration of the NEs to support allocation of the VNR to various entities, or the like), or the like), as well as various combinations thereof. This is indicated by steps 1 and 1A in FIG. 16.

As depicted in FIG. 16, in order to support transfer of a VSR, at each layer of the virtualized infrastructure hierarchy, the VSR may be transitioned through the set of VSR states supported for VSRs. The transitioning of the VSR through the set of VSR states at a particular level of the virtualized infrastructure hierarchy may include transitioning to the IS state. The VSR, after being transitioned to the IS state at a particular level of the hierarchy, is then available for allocation to a tenant at the next level of the virtualized infrastructure hierarchy (illustrated by the arrows between the hierarchical levels). The VSR, when allocated to the tenant at the next level of the virtualized infrastructure hierarchy, is in the NE state at that next level of virtualized infrastructure hierarchy and may then be transitioned through the set of VSR states supported for VSRs at that next level of the virtualized infrastructure hierarchy (again, to the IS state). As illustrated in FIG. 16, the transitions of the VSR between the various VSR states supported for VSRs at the various hierarchical levels may be performed at the BSS (or other suitable support system) and at the NEs (illustratively, depicted as the SRs, which will be understood to be SRs at the NEs in the communication network). The transitions of the VSR between the various VSR states supported for VSRs at the various hierarchical levels may be performed at the BSS responsive to messaging from the OSS. The transitions of the VSR between the various VSR states supported for VSRs at the various hierarchical levels may be performed at the NEs responsive to messaging from the BSS to the NEs (which may cause storage of VSR information for the VSR in the NEs, configuration of the NEs to support the VSR (e.g., modification of the states of the VSR, configuration of the NEs to support allocation of the VSR to various entities, or the like), or the like), as well as various combinations thereof. This is indicated by steps 2 and 2A in FIG. 16.

As further depicted in FIG. 16, VSRs that were allocated to tenants also may be returned to the pool of available VSRs such that those VSRs are available for further allocation to other tenants. This may include transitioning the VSRs from the IS state to the SR state. As illustrated in FIG. 16, these transitions of the VSR for returning them to the pool of available VSRs may be performed at the BSS (or other suitable type of support system(s)). This is indicated by steps 3 and 3A in FIG. 16.

Figure 17:
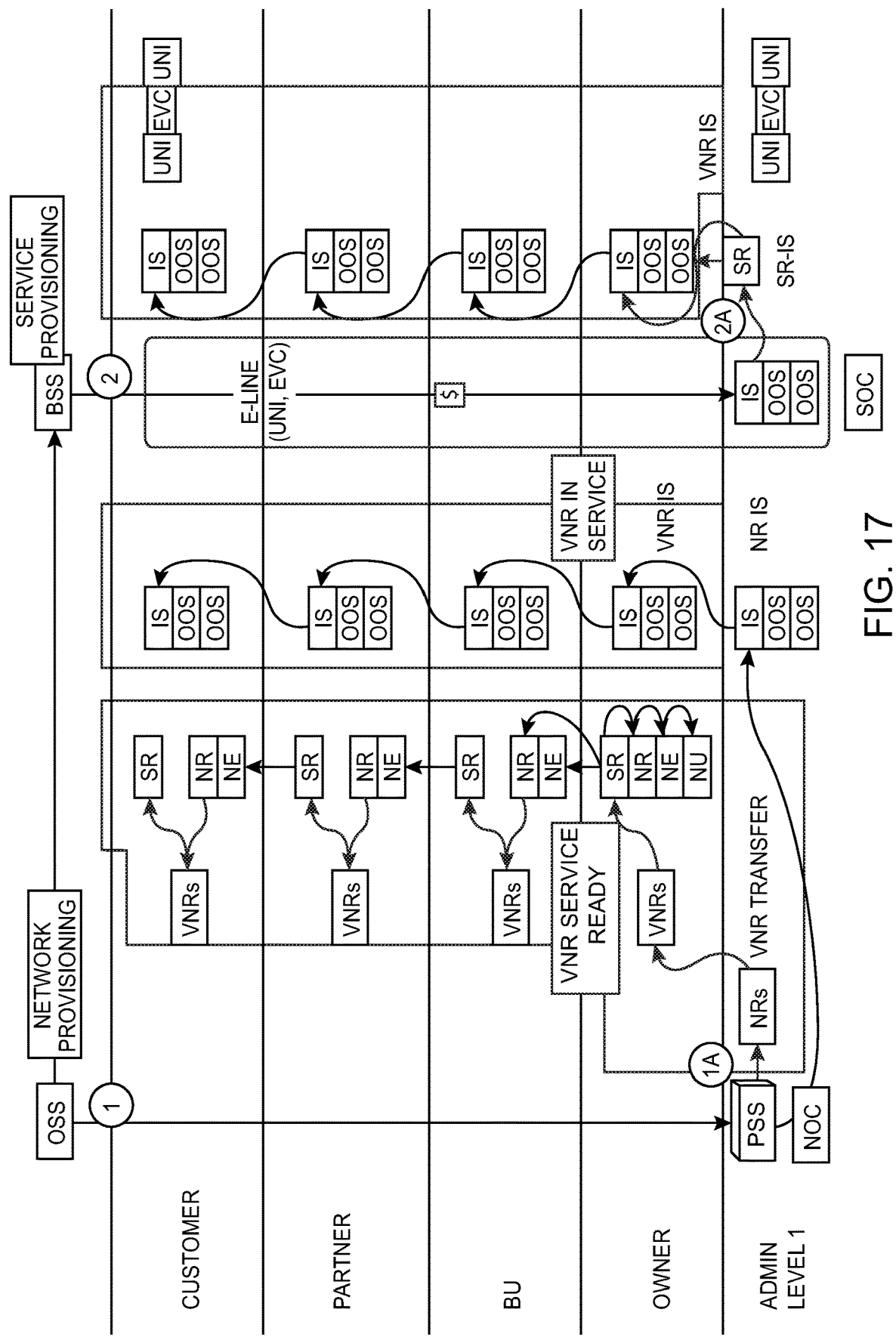
FIG. 17 depicts use of infrastructure resource states to support transfers of virtualized infrastructure resources where virtualized network resources are put into the In Service state before the virtualized service resources are put into the In Service state.

FIG. 17 depicts use of infrastructure resource states to support transfers of virtualized infrastructure resources where virtualized network resources are put into the In Service state before the virtualized service resources are put into the In Service state.

As depicted in FIG. 17, in order to support activation of a VSR for a customer, an OSS puts associated VNRs in the IS state at each layer of the hierarchy before sending a message to the BSS that the BSS can put the VSR into the IS state at each layer of the hierarchy. The VNRs are put into the IS state at each layer of the virtualized infrastructure hierarchy, beginning with the owner layer and proceeding from the owner layer through any intermediate layers to the customer layer. The transfer of the VNRs, at each layer of the virtualized infrastructure hierarchy, may include transitioning of each of the VNRs through the set of VNR states supported for VNRs. The transitioning of the VNRs through the set of VNR states at a particular layer of the virtualized infrastructure hierarchy may include transitions from the NR state to the SR state to the IS state (illustrated by the arrows between the set of VNR states). The VNRs, when allocated to the tenant at the next level of the virtualized infrastructure hierarchy, are in the NE state at that next level of virtualized infrastructure hierarchy and may then be transitioned through the set of VNR states supported for VNRs at that next level of the virtualized infrastructure hierarchy (again, from the NR state to the SR state to the IS state). As illustrated in FIG. 17, the transitions of the VNR between the various VNR states supported for VNRs at the various hierarchical levels may be performed at the OSS (or other suitable support system) and at the NEs (illustratively, depicted as the photonic service switch (PSS) network element). The transitions of the VNR between the various VNR states supported for VNRs at the various hierarchical levels may be performed at the OSS responsive to messaging from a higher layer management system which is omitted for purposes of clarity (e.g., an NIVS, such as NIVS 130 of FIG. 1). The transitions of the VNR between the various VNR states supported for VNRs at the various hierarchical levels may be performed at the NEs (e.g., PSS) responsive to messaging from the OSS to the NEs (which may cause storage of VNR information for the VNR in the NEs, configuration of the NEs to support the VNR (e.g., modification of the states of the VNRs, configuration of the NEs to support allocation of the VNR to various entities, or the like), or the like), as well as various combinations thereof. The OSS, after the VNRs have been transitioned to the IS state at the various layers of the virtualized infrastructure hierarchy (again, including at the OSS as well as at the NEs in the communication network), may send one or more messages to the BSS in order to trigger the BSS to transition the VSR to the IS state at the various layers of the virtualized infrastructure hierarchy as discussed further below. This is indicated by steps 1 and 1A in FIG. 17.

As depicted in FIG. 17, in order to support transfer of a VSR, at each layer of the virtualized infrastructure hierarchy, the VSR may be transitioned through the set of VSR states supported for VSRs. The transitioning of the VSR through the set of VSR states at a particular level of the virtualized infrastructure hierarchy may include transitioning to the IS state. The VSR, after being transitioned to the IS state at a particular level of the hierarchy, is then available for allocation to a tenant at the next level of the virtualized infrastructure hierarchy (illustrated by the arrows between the hierarchical levels). The VSR, when allocated to the tenant at the next level of the virtualized infrastructure hierarchy, is in the NE state at that next level of virtualized infrastructure hierarchy and may then be transitioned through the set of VSR states supported for VSRs at that next level of the virtualized infrastructure hierarchy (again, to the IS state). As illustrated in FIG. 17, the transitions of the VSR between the various VSR states supported for VSRs at the various hierarchical levels may be performed at the BSS (or other suitable support system) and at the NEs (illustratively, depicted as the SRs, which will be understood to be SRs at the NEs in the communication network). The transitions of the VSR between the various VSR states supported for VSRs at the various hierarchical levels may be performed at the BSS responsive to messaging from the OSS. The transitions of the VSR between the various VSR states supported for VSRs at the various hierarchical levels may be performed at the NEs responsive to messaging from the BSS to the NEs (which may cause storage of VSR information for the VSR in the NEs, configuration of the NEs to support the VSR (e.g., modification of the states of the VSR, configuration of the NEs to support allocation of the VSR to various entities, or the like), or the like, as well as various combinations thereof. This is indicated by steps 2 and aA in FIG. 17.

It is noted that, since the VNRs are put into the IS state before the VSRs are put into the IS state, various entities of the virtualized infrastructure hierarchy (e.g., BUs, partners, customers, or the like) may become aware of the availability of VNRs before the associated VSRs are actually in the IS state and ready for use by the customers. This enables the various entities to use the VSRs after the VSRs are put into the IS state without the need for additional processing to put the associated VNRs into the IS state before the entities can use the VSRs.

Figure 18:
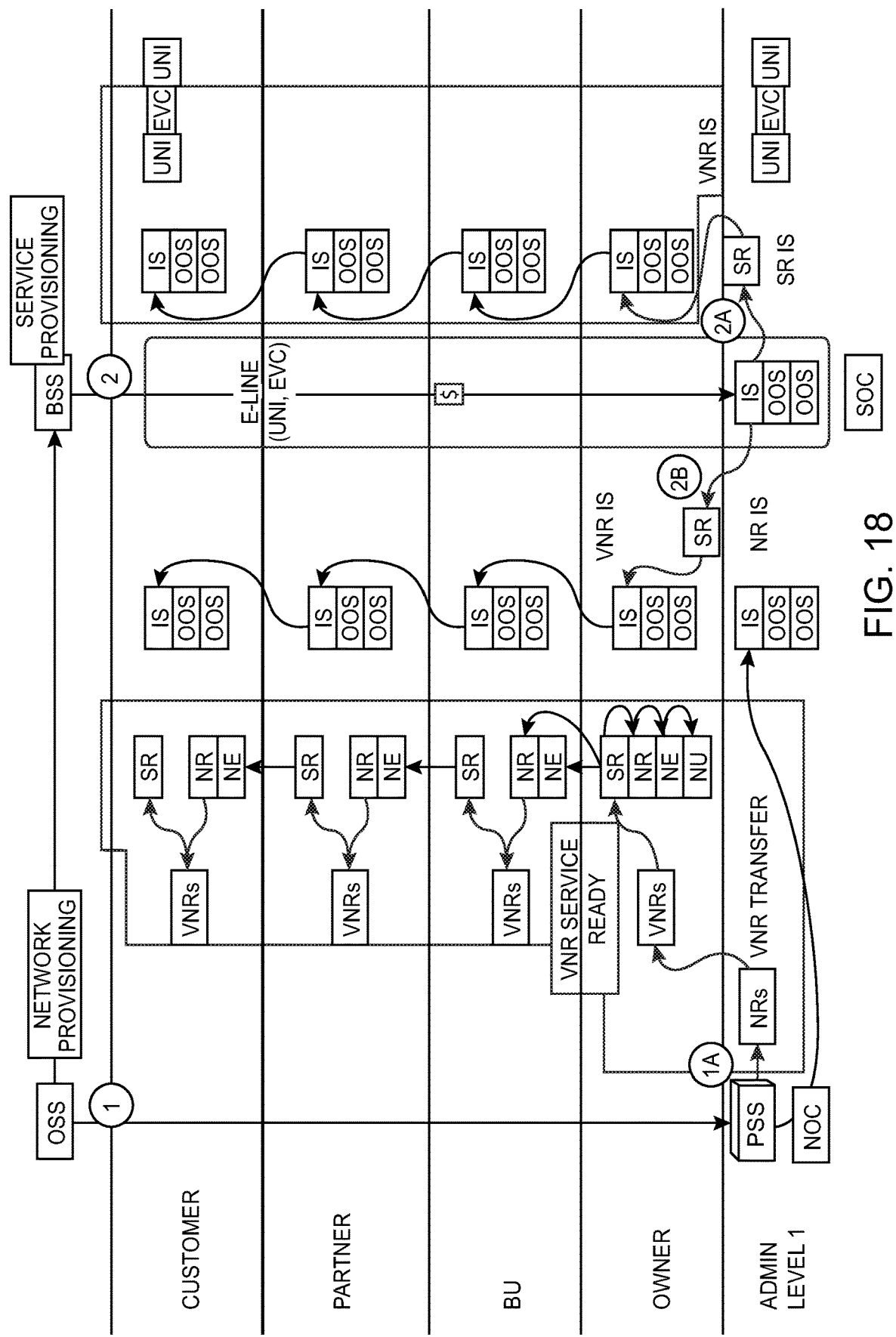
FIG. 18 depicts use of infrastructure resource states to support transfers of virtualized infrastructure resources where virtualized network resources remain in the Service Ready state before the virtualized service resources are put into the In Service state.

FIG. 18 depicts use of infrastructure resource states to support transfers of virtualized infrastructure resources where virtualized network resources remain in the Service Ready state before the virtualized service resources are put into the In Service state.

As depicted in FIG. 18, in order to support activation of a VSR for a customer, an OSS puts associated VNRs in the SR state (rather than the IS state) at each layer of the hierarchy before sending a message to the BSS that the BSS can put the VSR into the IS state at each layer of the hierarchy. The VNRs are put into the SR state at each layer of the virtualized infrastructure hierarchy, beginning with the owner layer and proceeding from the owner layer through any intermediate layers to the customer layer. The transfer of the VNRs, at each layer of the virtualized infrastructure hierarchy, may include transitioning of each of the VNRs through the set of VNR states supported for VNRs. The transitioning of the VNRs through the set of VNR states at a particular layer of the virtualized infrastructure hierarchy may include transitions from the NR state to the SR state (illustrated by the arrows between the set of VNR states). The VNRs, when allocated to the tenant at the next level of the virtualized infrastructure hierarchy, are in the NE state at that next level of virtualized infrastructure hierarchy and may then be transitioned through the set of VNR states supported for VNRs at that next level of the virtualized infrastructure hierarchy (again, from the NR state to the SR state). As illustrated in FIG. 18, the transitions of the VNR between the various VNR states supported for VNRs at the various hierarchical levels may be performed at the OSS (or other suitable support system) and at the NEs (illustratively, depicted as the PSS network element). The transitions of the VNR between the various VNR states supported for VNRs at the various hierarchical levels may be performed at the OSS responsive to messaging from a higher layer management system which is omitted for purposes of clarity (e.g., an NIVS, such as NIVS 130 of FIG. 1). The transitions of the VNR between the various VNR states supported for VNRs at the various hierarchical levels may be performed at the NEs (e.g., PSS) responsive to messaging from the OSS to the NEs (which may cause storage of VNR information for the VNR in the NEs, configuration of the NEs to support the VNR (e.g., modification of the states of the VNRs, configuration of the NEs to support allocation of the VNR to various entities, or the like), or the like, as well as various combinations thereof. The OSS, after the VNRs have been transitioned to the SR state at the various layers of the virtualized infrastructure hierarchy (again, including at the OSS as well as at the NEs in the communication network), may send one or more messages to the BSS in order to trigger the BSS to transition the VSR to the IS state at the various layers of the virtualized infrastructure hierarchy as discussed further below. This is indicated by steps 1 and 1A in FIG. 18.

As depicted in FIG. 18, in order to support transfer of a VSR, at each layer of the virtualized infrastructure hierarchy, the VSR may be transitioned through the set of VSR states supported for VSRs. The transitioning of the VSR through the set of VSR states at a particular level of the virtualized infrastructure hierarchy may include transitioning to the IS state. The VSR, after being transitioned to the IS state at a particular level of the hierarchy, is then available for allocation to a tenant at the next level of the virtualized infrastructure hierarchy (illustrated by the arrows between the hierarchical levels). The VSR, when allocated to the tenant at the next level of the virtualized infrastructure hierarchy, is in the NE state at that next level of virtualized infrastructure hierarchy and may then be transitioned through the set of VSR states supported for VSRs at that next level of the virtualized infrastructure hierarchy (again, to the IS state). As illustrated in FIG. 18, the transitions of the VSR between the various VSR states supported for VSRs at the various hierarchical levels may be performed at the BSS (or other suitable support system) and at the NEs (illustratively, depicted as the SRs, which will be understood to be SRs at the NEs in the communication network). The transitions of the VSR between the various VSR states supported for VSRs at the various hierarchical levels may be performed at the BSS responsive to messaging from the OSS. The transitions of the VSR between the various VSR states supported for VSRs at the various hierarchical levels may be performed at the NEs responsive to messaging from the BSS to the NEs (which may cause storage of VSR information for the VSR in the NEs, configuration of the NEs to support the VSR (e.g., modification of the states of the VSR, configuration of the NEs to support allocation of the VSR to various entities, or the like), or the like, as well as various combinations thereof. The BSS, after the VSRs have been transitioned to the IS state at the various layers of the virtualized infrastructure hierarchy (again, including at the BSS as well as at the NEs in the communication network), may send one or more messages to the OSS in order to trigger the OSS to transition the VNRs to the IS state at the various layers of the virtualized infrastructure hierarchy as discussed further below. This is indicated by steps 2 and 2A in FIG. 18.

As depicted in FIG. 18, in order to support activation of the VSR for the customer, the OSS puts the associated VNRs in the IS state at each layer of the hierarchy such that the VSR that was already put into the IS state by the BSS becomes available for use by various entities of the virtualized infrastructure hierarchy to which the VSR has been allocated. The VNRs are put into the IS state at each layer of the virtualized infrastructure hierarchy, beginning with the owner layer and proceeding from the owner layer through any intermediate layers to the customer layer. The transfer of the VNRs, at each layer of the virtualized infrastructure hierarchy, may include transitioning of each of the VNRs from the SR state to the IS state (illustrated by the arrows between the set of VNR states). As illustrated in FIG. 18, the transitions of the VNR from the SR state to the IS state at the various hierarchical levels may be performed at the OSS (or other suitable support system) and at the NEs (illustratively, depicted as the PSS network element). The transitions of the VNR from the SR state to the IS state at the various hierarchical levels may be performed at the OSS responsive to messaging from a higher layer management system which is omitted for purposes of clarity (e.g., an NIVS, such as NIVS 130 of FIG. 1). The transitions of the VNR from the SR state to the IS state at the various hierarchical levels may be performed at the NEs (e.g., PSS) responsive to messaging from the OSS to the NEs (which may cause storage of VNR information for the VNR in the NEs, configuration of the NEs to support the VNR (e.g., modification of the states of the VNRs, configuration of the NEs to support allocation of the VNR to various entities, or the like), or the like, as well as various combinations thereof. This is indicated by step 2B in FIG. 18.

It is noted that, since the VNRs are not put into the IS state before the VSRs are put into the IS state, the entities of the virtualized infrastructure hierarchy (e.g., BUs, partners, customers, or the like) do not become aware of the availability of VNRs until after the associated VSRs are actually in the IS state and ready for use by the customers. This prevents situations in which the various entities expect to be able to use the VSRs before the VSRs have been properly activated for use by those entities.

Figure 19:
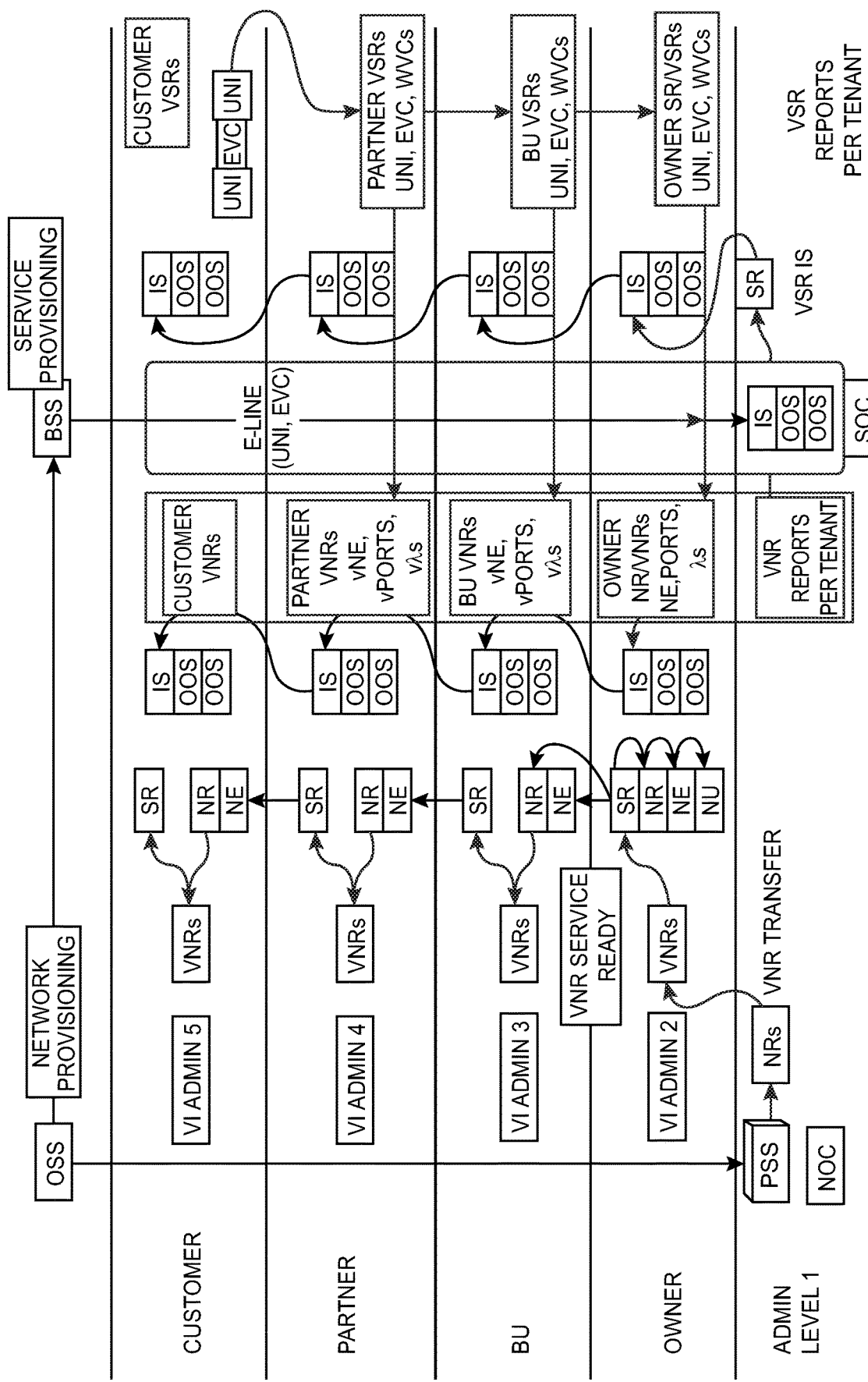
FIG. 19 depicts use of infrastructure resource states to support status reporting for virtualized infrastructure resources where virtualized network resources remain in the Service Ready state before the virtualized service resources are put into the In Service state.

FIG. 19 depicts use of infrastructure resource states to support status reporting for virtualized infrastructure resources where virtualized network resources remain in the Service Ready state before the virtualized service resources are put into the In Service state. As depicted in FIG. 19, the VNR and VSR resource state control is performed in a manner similar to that depicted in FIG. 18. As further depicted in FIG. 19, infrastructure resource states may be used to support VNR reports per tenant at the various layers of the virtualized infrastructure hierarchy and may be used to support VSR reports per tenant at the various layers of the virtualized infrastructure hierarchy.

Figure 20:
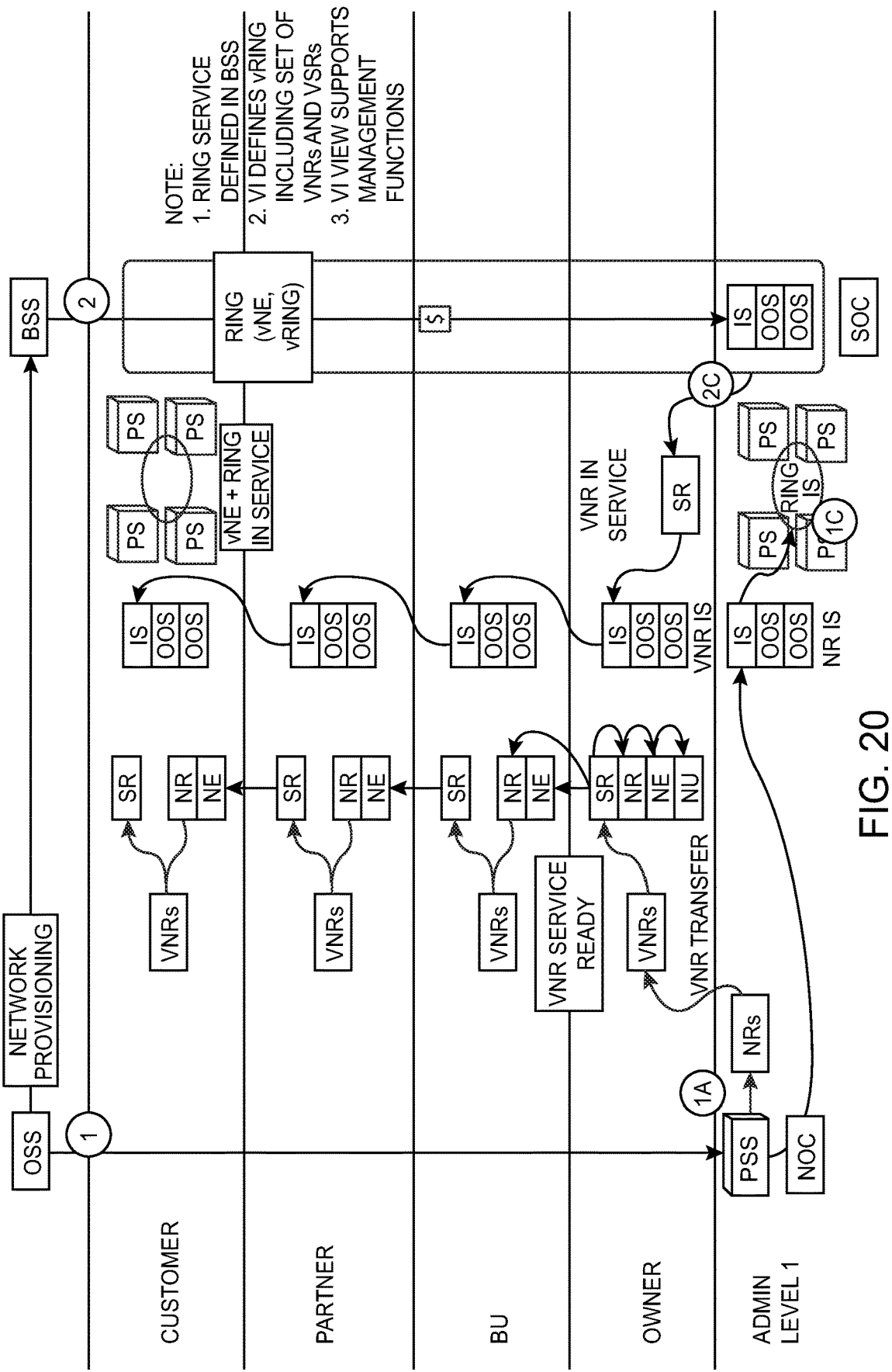
FIG. 20 depicts use of infrastructure resource states to support transfers of virtualized infrastructure resources for a ring service where virtualized network resources remain in the Service Ready state before the virtualized service resources are put into the In Service state.

FIG. 20 depicts use of infrastructure resource states to support transfers of virtualized infrastructure resources for a ring service where virtualized network resources remain in the Service Ready state before the virtualized service resources are put into the In Service state. As depicted in FIG. 20, the VNR and VSR resource state control is performed in a manner similar to that depicted in FIG. 18 (e.g., indicated by steps 1, 1A, 10, 2 and 2C in FIG. 20). As further depicted in FIG. 20, a ring service including a set of NRs and SRs is defined in the BSS, infrastructure virtualization is used to define a virtual ring including a set of VNRs and VSRs, and infrastructure virtualization (including infrastructure virtualization policies) may be defined to enable various management functions related to allocation and administration (e.g., provisioning, troubleshooting, or the like).

Figure 21:
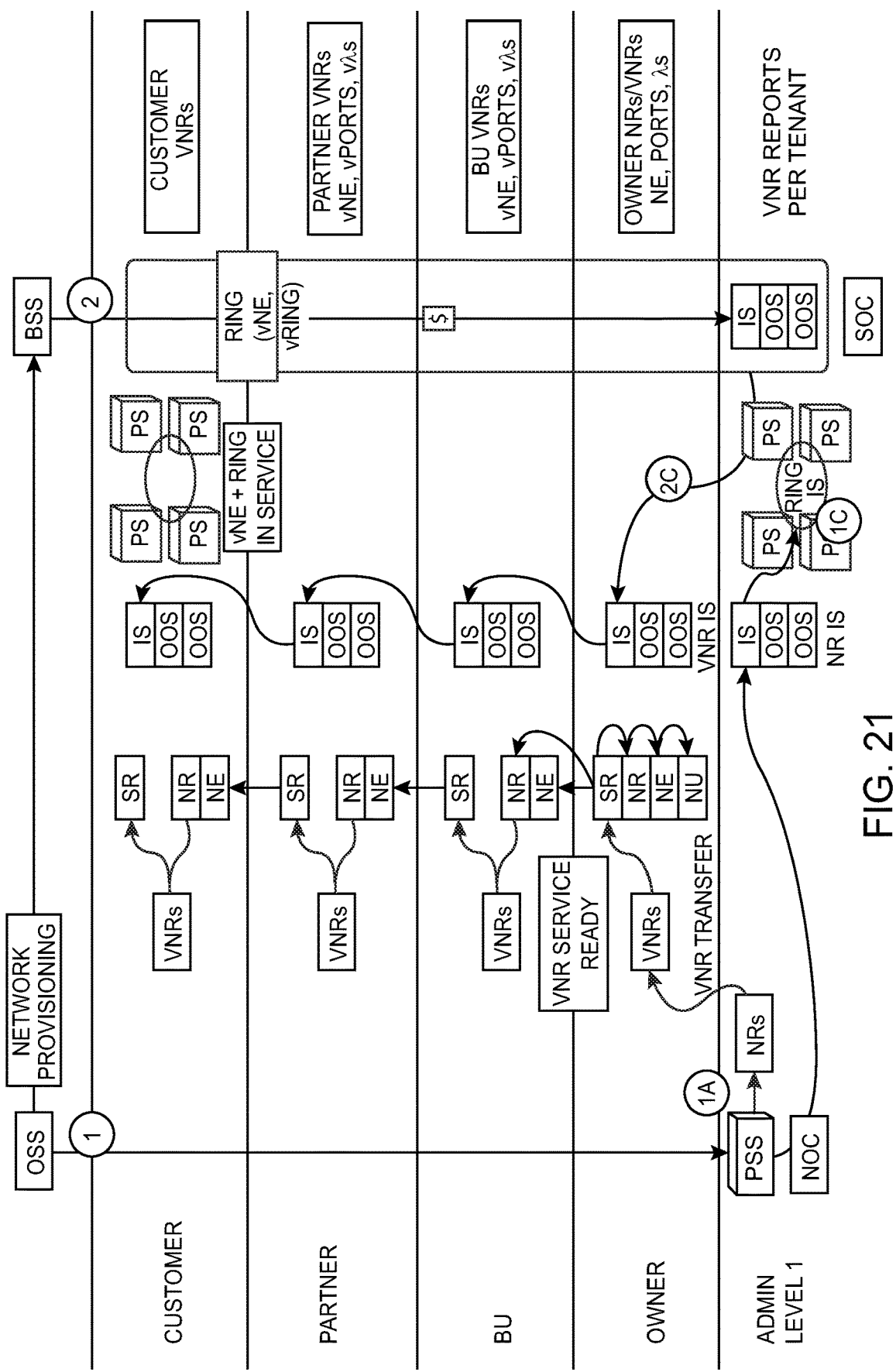
FIG. 21 depicts use of infrastructure resource states to support status reporting for virtualized infrastructure resources for a ring service where virtualized network resources remain in the Service Ready state before the virtualized service resources are put into the In Service state.

FIG. 21 depicts use of infrastructure resource states to support status reporting for virtualized infrastructure resources for a ring service where virtualized network resources remain in the Service Ready state before the virtualized service resources are put into the In Service state. As depicted in FIG. 21, the VNR and VSR resource state control is performed in a manner similar to that depicted in FIG. 18 and, further, in a manner similar to that of FIG. 20 (e.g., indicated by steps 1, 1A, 10, 2 and 2C in FIG. 20). As further depicted in FIG. 21, infrastructure resource states may be used to support VNR reports per tenant for the virtual ring service at the various layers of the virtualized infrastructure hierarchy and may be used to support VSR reports per tenant for the virtual ring service at the various layers of the virtualized infrastructure hierarchy.

Figure 22:
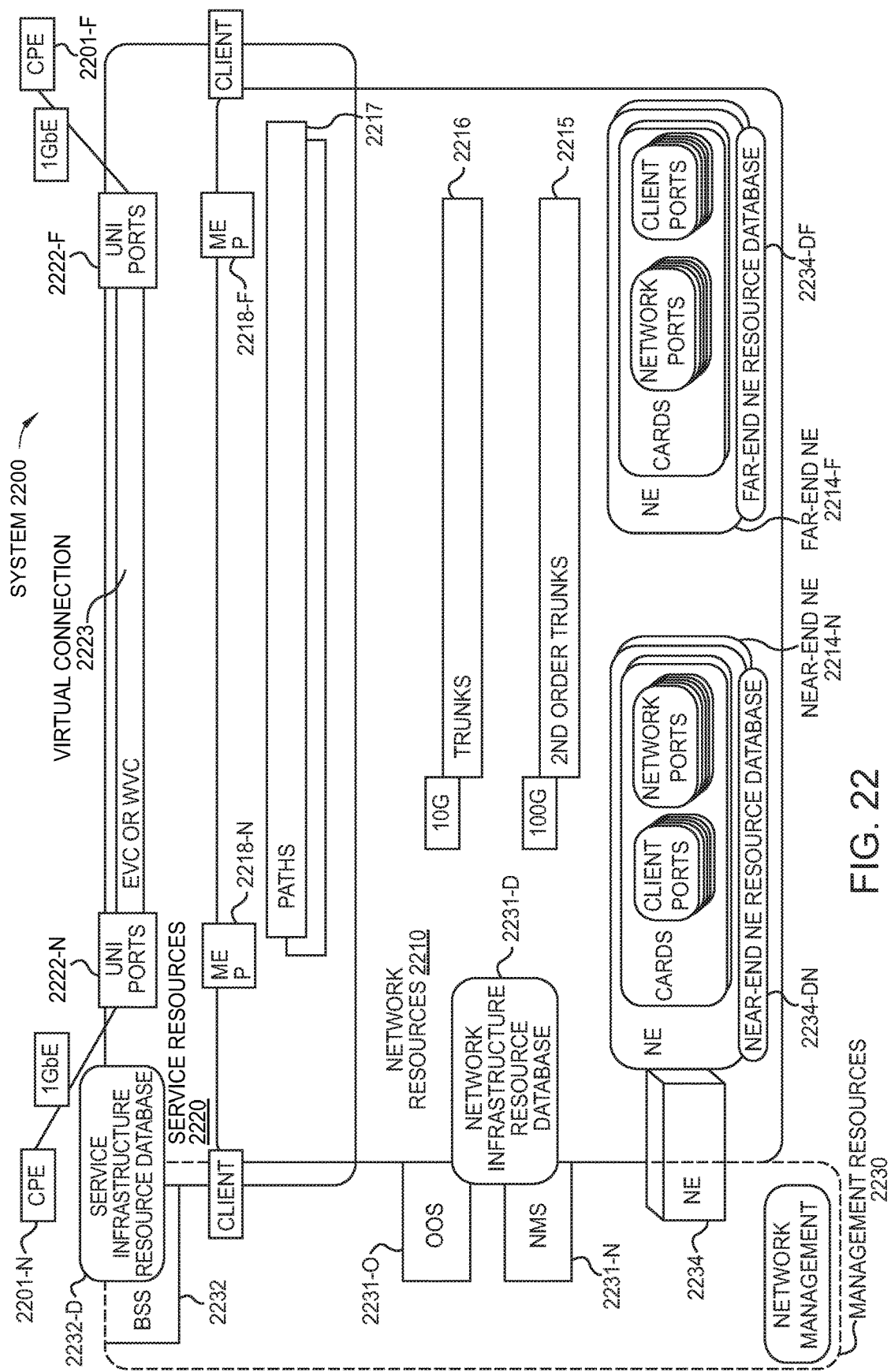
FIG. 22 depicts an exemplary system including network and service resource layers for a virtual connection service supporting Ethernet between customer premises equipment.

FIG. 22 depicts an exemplary system including network and service resource layers for a virtual connection service supporting Ethernet between customer premises equipment.

As depicted in FIG. 22, system 2200 includes, for an Ethernet connection between a pair of customer premises equipment (CPE) 2201-N and 2201-F (CPEs 2201), network resources 2210 and service resources 2220 supporting the Ethernet connection between the CPEs 2201 and management resources 2230 supporting management of the network resources 2210 and the service resources 2220 to provide the Ethernet connection between the CPEs 2201.

The network resources 2210 include a near-end NE 2214-N and a far-end NE 2214-F, each of which includes various cards, client ports, network ports, and so forth. The network resources 2210 include Second Order Trunks 2215 (illustratively, 100G trunks) between the near-end NE 2214-N and the far-end NE 2214-F. The network resources 2210 include Trunks 2216 (illustratively, 10G trunks) between the near-end NE 2214-N and the far-end NE 2214-F. The network resources 2210 include a set of paths 2217 between the near-end NE 2214-N and the far-end NE 2214-F, which are supported by the Second Order Trunks 2215 and the Trunks 2216 and which are terminated on the near-end NE 2214-N and the far-end NE 2214-F, respectively. The network resources 2210 include a pair of Maintenance Endpoints (MEPs) 2218-N and 2218-F on the near-end NE 2214-N and the far-end NE 2214-F, respectively, which may operate as MEPs for the paths 2217 between the near-end NE 2214-N and the far-end NE 2214-F.

The service resources 2220 include a pair of UNI ports 2222-N and 2222-F on the near-end NE 2214-N and the far-end NE 2214-F, respectively. The service resources 2220 include a virtual connection 2223 established between the UNI ports 2222-N and 2222-F on the near-end NE 2214-N and the far-end NE 2214-F, respectively. The virtual connection 2223 may be an EVC, a WVC, or the like. As illustrated in FIG. 22, the service resources 2220 also may be considered to include portions of the network resources 2210 (illustratively, the paths 2217 and the MEPs 2218-N and 2218-F on the near-end NE 2214-N and the far-end NE 2214-F, respectively.

The network resources 2210 and service resources 2220, as indicated above, support the Ethernet connection between the CPEs 2201. As illustrated in FIG. 22, the connection between the UNI port 2222-N on near-end NE 2214-N and the CPE 2201-N may be a 1 GbE connection and, similarly, the connection between the UNI port 2222-F on far-end NE 2214-F and the CPE 2201-F may be a 1 GbE connection.

The management resources 2230 include management resources for the network resources 2210 (represented by OSS 2231-O and NMS 2231-N which each or together may maintain a Network Infrastructure Network Resource Database 2231-D which may include NR information and VNR information), management resources for the service resources 2220 (represented by BSS 2232, which may maintain a Service Infrastructure Service Resource Database 2232-D which may include SR information and VSR information), and management resources on the NEs (represented by NE 2234 and including NE Resource Databases 2234-DN and 2234-DF) on the near-end NE 2214-N and the far-end NE 2214-F, respectively).

The use of infrastructure resource states within the context of system 2200 is depicted and described with respect to FIGS. 23-25 which are discussed further below.

Figure 23:
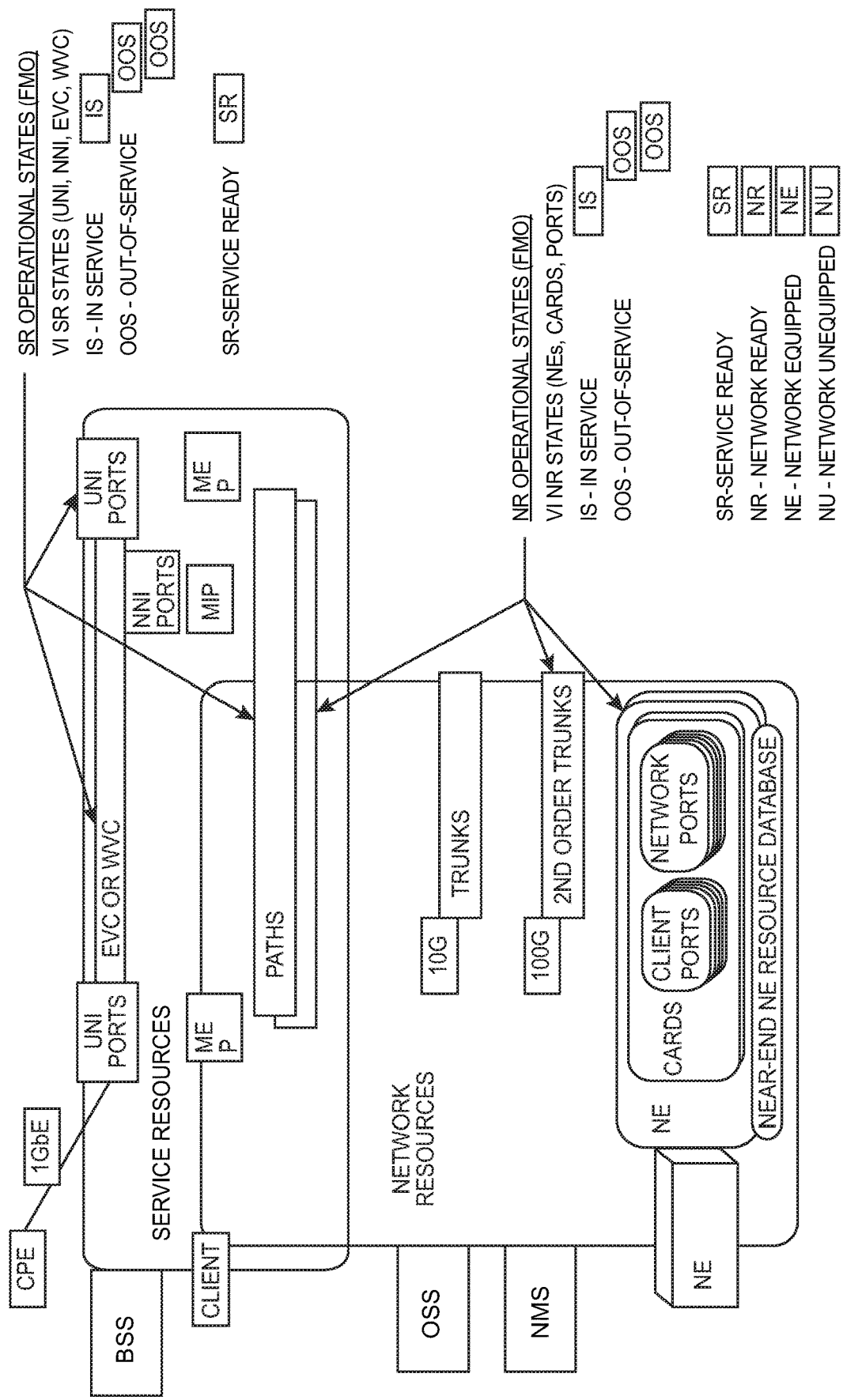
FIG. 23 depicts portions of the system of FIG. 22, illustrating network and service resource states for the network and service resources of the system of FIG. 22.

FIG. 23 depicts portions of the system of FIG. 22, illustrating network and service resource states for the network and service resources of the system of FIG. 22. As depicted in FIG. 23, various network resources 2210 (illustratively, NEs 2214, Second Order Trunks 2215, Trunks 2216, and paths 2217) may be managed using various VNR states including the IS state, the OOS state, the SR state, the NR state, the NE state, and the NU state. As further depicted in FIG. 23, various service resources 2220 (illustratively, UNI ports 2222, virtual connection 2223, and paths 2217) may be managed using various VSR states including the IS state, the OOS state, and the SR state.

Figure 24:
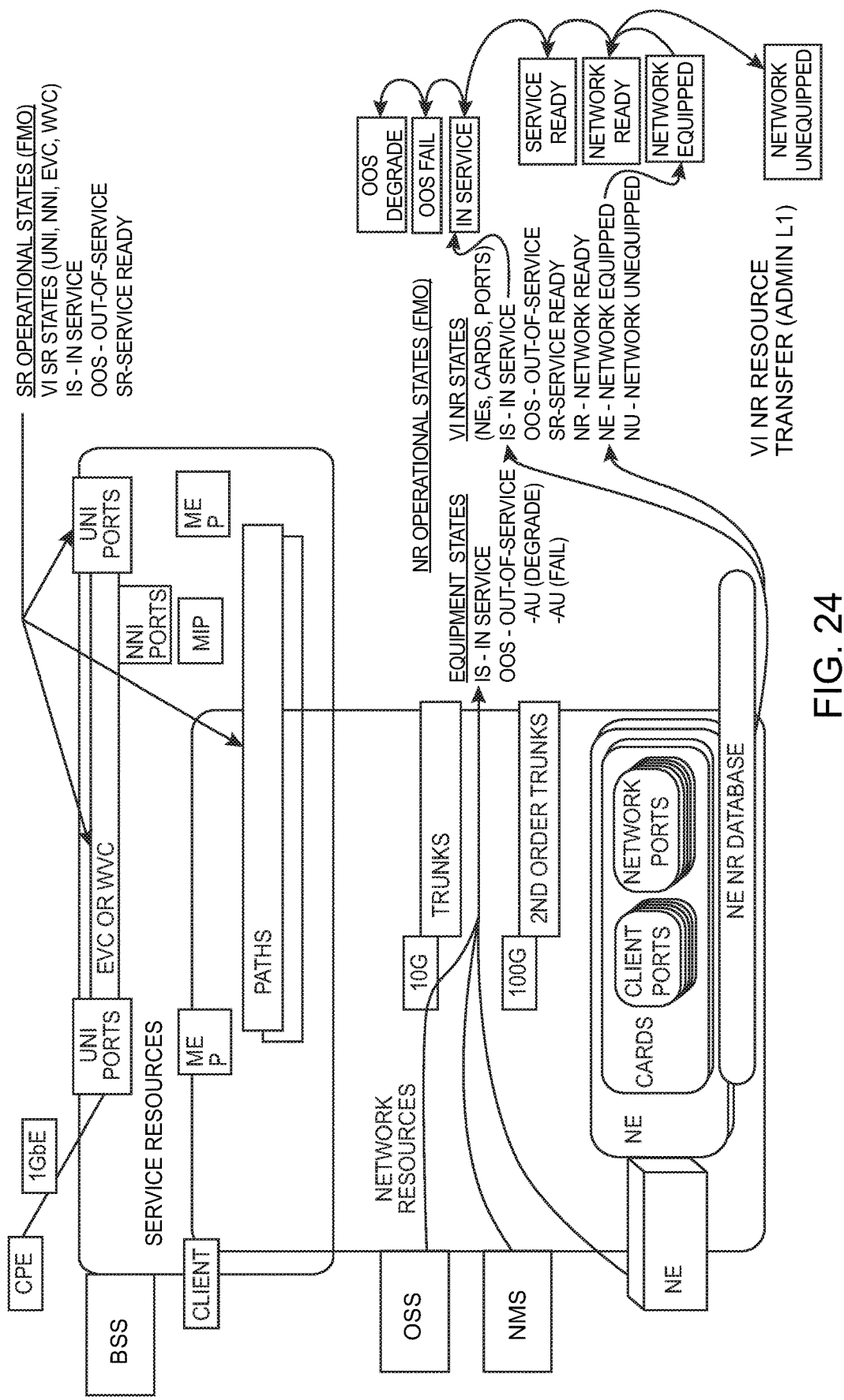
FIG. 24 depicts portions of the system of FIG. 22, illustrating network and service resource state transitions for the network and service resources of the system of FIG. 22.

FIG. 24 depicts portions of the system of FIG. 22, illustrating network and service resource state transitions for the network and service resources of the system of FIG. 22. As depicted in FIG. 24, NR states and transitions between VNR states (illustratively, including the IS state, the OOS state, the SR state, the NR state, the NE state, and the NU state) for various network resources 2210 (e.g., NEs 2214, Second Order Trunks 2215, Trunks 2216, and paths 2217, as discussed with respect to FIG. 23) may be managed by the management resources for the network resources 2210 (illustratively, OSS 2231-O and NMS 2231-N which each or together may maintain Network Infrastructure Network Resource Database 2231-D which may include NR information and VNR information) and management resources on the NEs (represented by NE 2234 and including NE Resource Databases 2234-DN and 2234-DF) on the near-end NE 2214-N and the far-end NE 2214-F, respectively). As further depicted in FIG. 24, SR states and transitions between VSR states (illustratively, including the IS state, the OOS state, and the SR state) for various service resources 2220 (e.g., UNI ports 2222, virtual connection 2223, and paths 2217, as discussed with respect to FIG. 23) may be managed by the management resources for the service resources 2220 (represented by BSS 2232, which may maintain a Service Infrastructure Service Resource Database 2232-D which may include SR information and VSR information) and management resources on the NEs (represented by NE 2234 and including NE Resource Databases 2234-DN and 2234-DF) on the near-end NE 2214-N and the far-end NE 2214-F, respectively).

Figure 25:
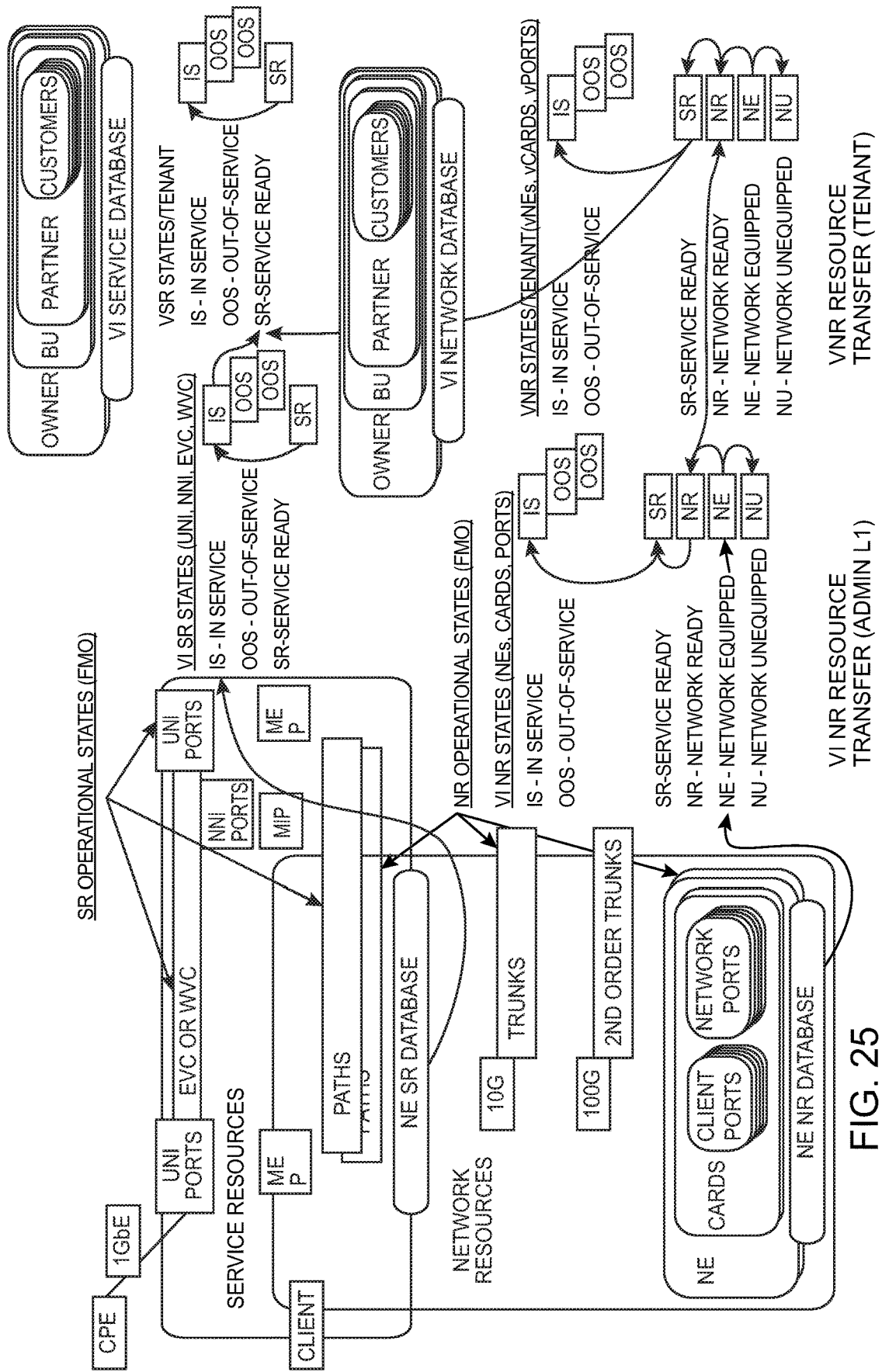
FIG. 25 depicts portions of the system of FIG. 22, illustrating network and service resource state transitions and virtualized network and service resource state transitions for the network and service resources of the system of FIG. 22.

FIG. 25 depicts portions of the system of FIG. 22, illustrating network and service resource state transitions and virtualized network and service resource state transitions for the network and service resources of the system of FIG. 22. As depicted in FIG. 25, transitions between NR states and transitions between VNR states (illustratively, including the IS state, the OOS state, the SR state, the NR state, the NE state, and the NU state) for various network resources 2210 (e.g., NEs 2214, Second Order Trunks 2215, Trunks 2216, and paths 2217, as discussed with respect to FIG. 23) may be managed by various management resources for the network resources 2210, which may include one or more higher level management systems (e.g., an NIVS such as NIVS 130 which may maintain infrastructure resource state information) and management resources for the network resources 2210 as depicted in FIG. 22 (which are omitted from FIG. 25 for purpose of clarity, but which may include management resources for the network resources 2210 (illustratively, OSS 2231-O and NMS 2231-N which each or together may maintain Network Infrastructure Network Resource Database 2231-D which may include NR information and VNR information) and management resources on the NEs (represented by NE 2234 and including NE Resource Databases 2234-DN and 2234-DF) on the near-end NE 2214-N and the far-end NE 2214-F, respectively)). As depicted in FIG. 25, transitions between SR states and transitions between VSR states (illustratively, including the IS state, the OOS state, and the SR state) for various service resources 2220 (e.g., UNI ports 2222, virtual connection 2223, and paths 2217, as discussed with respect to FIG. 23) may be managed by various management resources for the service resources 2220, which may include one or more higher level management systems (e.g., an NIVS such as NIVS 130) and management resources for the service resources 2220 as depicted in FIG. 22 (which are omitted from FIG. 25 for purpose of clarity, but which may include management resources for the resources for the service resources 2220 (represented by BSS 2232, which may maintain a Service Infrastructure Service Resource Database 2232-D which may include SR information and VSR information) and management resources on the NEs (represented by NE 2234 and including NE Resource Databases 2234-DN and 2234-DF) on the near-end NE 2214-N and the far-end NE 2214-F, respectively)).

Figure 26:
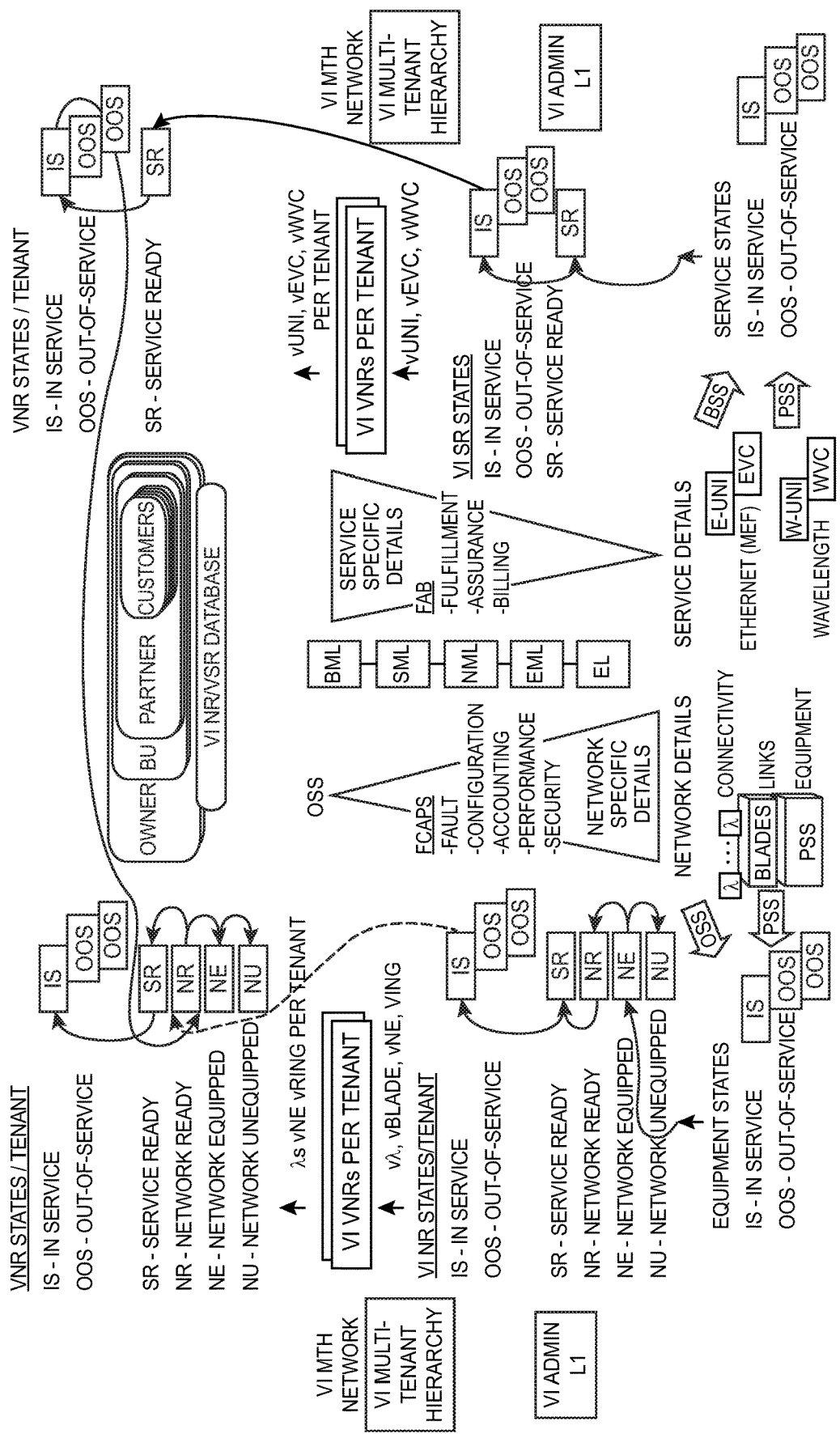
FIG. 26 depicts the exemplary infrastructure virtualization architecture of FIG. 12, illustrating virtualized network and service resource transitions based on infrastructure resource states.

FIG. 26 depicts the exemplary infrastructure virtualization architecture of FIG. 12, illustrating virtualized network and service resource transitions based on infrastructure resource states. As depicted in FIG. 26, in order to support transfers of VNRs between tenants, the associated NRs may transition through NR states and the associated VNRs may transition through VNR states, where such transitions may be supported at various hierarchical layers, based on local processing at various layers of the management hierarchy (e.g., on the NEs, on the OSS, or the like), based on various types of messaging between elements at various layers of the management hierarchy, or the like, as well as various combinations thereof. As further depicted in FIG. 26, in order to support transfers of VSRs between tenants, the associated SRs may transition through SR states and the associated VSRs may transition through VSR states, where such transitions may be supported at various hierarchical layers, based on local processing at various layers of the management hierarchy (e.g., on the NEs, on the BSS, or the like), based on various types of messaging between elements at various layers of the management hierarchy, or the like, as well as various combinations thereof.

Figure 27:
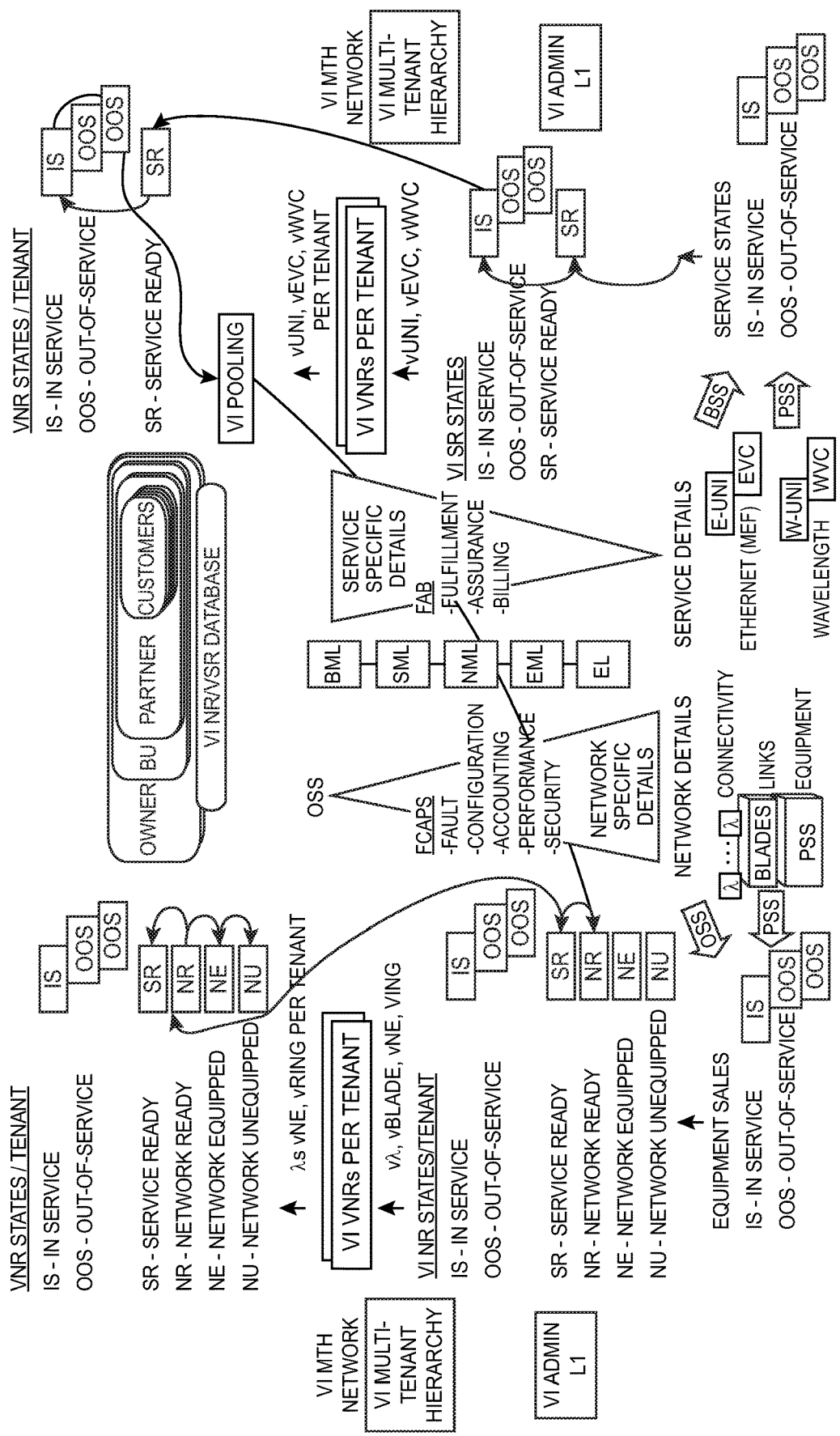
FIG. 27 depicts the exemplary infrastructure virtualization architecture of FIG. 12 and illustrates resource pooling based on infrastructure resource states.

FIG. 27 depicts the exemplary infrastructure virtualization architecture of FIG. 12 and illustrates resource pooling based on infrastructure resource states. As depicted in FIG. 27, VSRs that were allocated to tenants also may be returned to the pool of available VSRs such that those VSRs are available for further allocation to other tenants. This may include transitioning the VSRs from the IS state to the OOS state or the SR state. This also may include transitioning the associated VNRs to the NR state. It is noted that such transitions may be supported at various hierarchical layers, based on local processing at various layers of the management hierarchy (e.g., on the NEs, on the BSS, or the like), based on various types of messaging between elements at various layers of the management hierarchy, or the like, as well as various combinations thereof.

FIG. 28 depicts an exemplary report illustrating use of infrastructure resource states for tracking network resources and virtualized network resources for an optical device.

As depicted in FIG. 28, table 2800 illustrates configuration of an optical device (edge node) including eight blades, illustrating NRs of the optical device and VNRs created from the NRs of the optical device for allocation to tenants. The table 2800, as discussed further below, also illustrates use of infrastructure resource states (e.g., the NE state, the NU state, the NR state, the SR state, and the IS state, each of which has its own column, respectively) for tracking network resources and virtualized network resources for an optical device.

The first row of table 2800 illustrates the configuration of each of the eight blades included in the optical device (illustratively, each blade is able to support 800G of traffic). These will be understood to be the NRs of each blade included in the optical device.

The second row of table 2800 illustrates the configuration of the optical device, including the amount of resources of the optical device currently in each of the infrastructure resource states. For example, since each blade of the optical device is able to support 800G of traffic, the NE state column of table 2800 indicates that the optical device has 6.4T equipped, the full set of eight blades of the optical device has 6.4T equipped, and each blade line/client is 800G equipped, but only half of the XFPs (400G) are equipped. These will be understood to be the NRs of the optical device, which may be virtualized and allocated to tenants as illustrated in subsequent rows of table 2800. For example, the NU state column of table 2800 indicates that the optical device has 3.2T unequipped. For example, the NR state column of table 2800 indicates that, of the 6.4T equipped in the optical device, only 1.6T is network ready. For example, the SR state and IS state columns of the table 2800 indicate that, of the 1.6T that is in the NR state, 1.2T is in service while another 400G is not in service but is service ready and may be put into service if needed.

The third row of table 2800 illustrates that the NRs of the optical device (depicted in the second row of table 2800) may be virtualized to provide the VNRs for the owner. Accordingly, it will be appreciated that the amount of VNRs in each of the various infrastructure resource states is the same as the amount of NRs in each of the various infrastructure resource states (as depicted in the second row of table 2800). Namely, the NE state column of table 2800 indicates that the optical device has 6.4T equipped, the NU state column of table 2800 indicates that the optical device has 3.2T unequipped, NR state column of table 2800 indicates that 1.6T is network ready, and the SR and IS state columns of the table 2800 indicate that, of the 1.6T that is in the NR state, 1.2T is in service while another 400G is not in service but is service ready and may be put into service if needed.

The fourth and fifth rows of table 2800 illustrate allocation of the VNRs of the owner (as illustrated in the third row) to a retail BU and a wholesale BU, respectively. For example, the fourth and fifth rows of table 2800 illustrate that, of the 1.6T of the owner that is in the NR state for the owner, 800G is allocated to the retail BU and 1.2T is allocated to the wholesale BU. For the fourth row of table 2800 that is associated with the retail BU, the SR and IS state columns of the table 2800 indicate that, of the 800G of VNRs allocated to the retail BU that are in the NR state, 400G is in service while another 400G is not in service but is service ready and may be put into service if needed. For the fifth row of table 2800 that is associated with the wholesale BU, the SR and IS state columns of the table 2800 indicate that, of the 1.2T of VNRs allocated to the wholesale BU that are in the NR state, 800G is in service and 1.2T VSRs are in the SR state.

The sixth row of table 2800 illustrates allocation of the VNRs of the wholesale BU (as illustrated in the fourth row) to a partner (illustratively, a bank). For example, the sixth row of table 2800 illustrates that the 1.6T of VNRs allocated to the wholesale BU by the owner have been allocated by the wholesale BU to the bank. For the sixth row of table 2800 that is associated with the bank, the SR and IS state columns of the table 2800 indicate that, of the 1.6T of VNRs allocated to the bank that are in the NR state, 400G is in service while another 400G is not in service but is service ready and may be put into service if needed.

The seventh row of table 2800 illustrates allocation of the VNRs of the wholesale BU (as illustrated in the fifth row) to a partner (illustratively, a cloud provider). For example, the seventh row of table 2800 illustrates that the 3.2T of VNRs allocated to the wholesale BU by the owner have been allocated by the wholesale BU to the cloud provider. For the seventh row of table 2800 that is associated with the cloud provider, the SR and IS state columns of the table 2800 indicate that, of the 800G of VNRs allocated to the cloud provider that are in the NR state, 400G is in service while another 400G is not in service but is service ready and may be put into service if needed.

The eighth row of table 2800 illustrates allocation of the VNRs of the cloud provider (as illustrated in the seventh row) to a customer (illustratively, an enterprise). For example, the eighth row of table 2800 illustrates that the 800G of VNRs allocated to the cloud provider by the wholesale BU have been allocated by the cloud provider to the enterprise. For the eighth row of table 2800 that is associated with the enterprise, the SR and IS state columns of the table 2800 indicate that, of the 200G of VNRs allocated to the enterprise that are in the NR state, 200G is in service while another 200G is not in service but is service ready and may be put into service by the enterprise if needed.

It will be appreciated that the various aspects of table 2800 are merely exemplary (e.g., the network element type, the network element configuration, the allocation of VNRs, and so forth) for purposes of illustrating the use of infrastructure resource states for tracking network resources and virtualized network resources.

FIG. 29 depicts an exemplary state table illustrating use of infrastructure resource states for controlling transfers of virtualized network and service resources for an optical device. The state table 2900 depicts VNR and VSR resource states and VNR and VSR state transitions for transfers of VNRs and VSRs between entities in a VI multi-tenant hierarchical network. The left side of state table 2900 shows VNR and VSR resource allocation steps. The top left portion of state table 2900 shows the VI multi-tenant hierarchy. The top right portion of state table 2900 (i.e., as indicated by the rightmost columns) introduces the infrastructure resource states (the VNR NE state, the VNR NU state, the VNR NR state, the VNR SR state, the VSR IS state, the VSR OOS state) and bandwidth allocation steps. The bottom left portion of state table 2900 shows the resource states (the VNR NE state, the VNR NU state, the VNR NR state, the VNR SR state, the VNR IS state, the VSR IS state, the VSR OOS state) and the bandwidth assigned per VI multi-tenant hierarchy. As depicted in FIG. 29, a WDWM NE is configured as a WAVE Provider Edge (PE) ROADM, with 2 degrees, CDC, and 1 of 10 drop shelves installed. Row 1 of state table 2900 illustrates that the Owner (Admin Level 1) installs the NE and provisions line and client interfaces (resource states include the VNR NE state, the VNR NU state, the VNR NR state, the VNR SR state). Row 4 of state table 2900 illustrates that the NE is virtualized and transferred as VNRs to the Wholesale group in the NR state and, once accepted by the Wholesale group, enter the SR state. Row 5 of state table 2900 illustrates that the Wholesale group, once the VNRs are in the SR state, can transfer the VNRs to the Partner as VNRs that are in the NR state which, once accepted by the Partner, enter the SR state. Rows 6-7 of state table 2900 illustrate that the VNRs are now service ready can be allocated at the BSS to assigned billable services (namely, the VNRs can now be assigned as VSRs). Rows 8-9 of state table 2900 illustrated that, once the BSS puts the SRs in-service (i.e., in the IS state) all VSRs per tenant transition to the IS state. Rows 10-14 of state transition table 2900 depict the NR and VNR resource bandwidth assigned per VI multi-tenant hierarchy (NE state, NU state, NR state, SR state). Rows 15-16 of state transition table 2900 depict the SR and VSR resource bandwidth assigned per VI multi-tenant hierarchy (IS state, OOS state).

Figure 30:
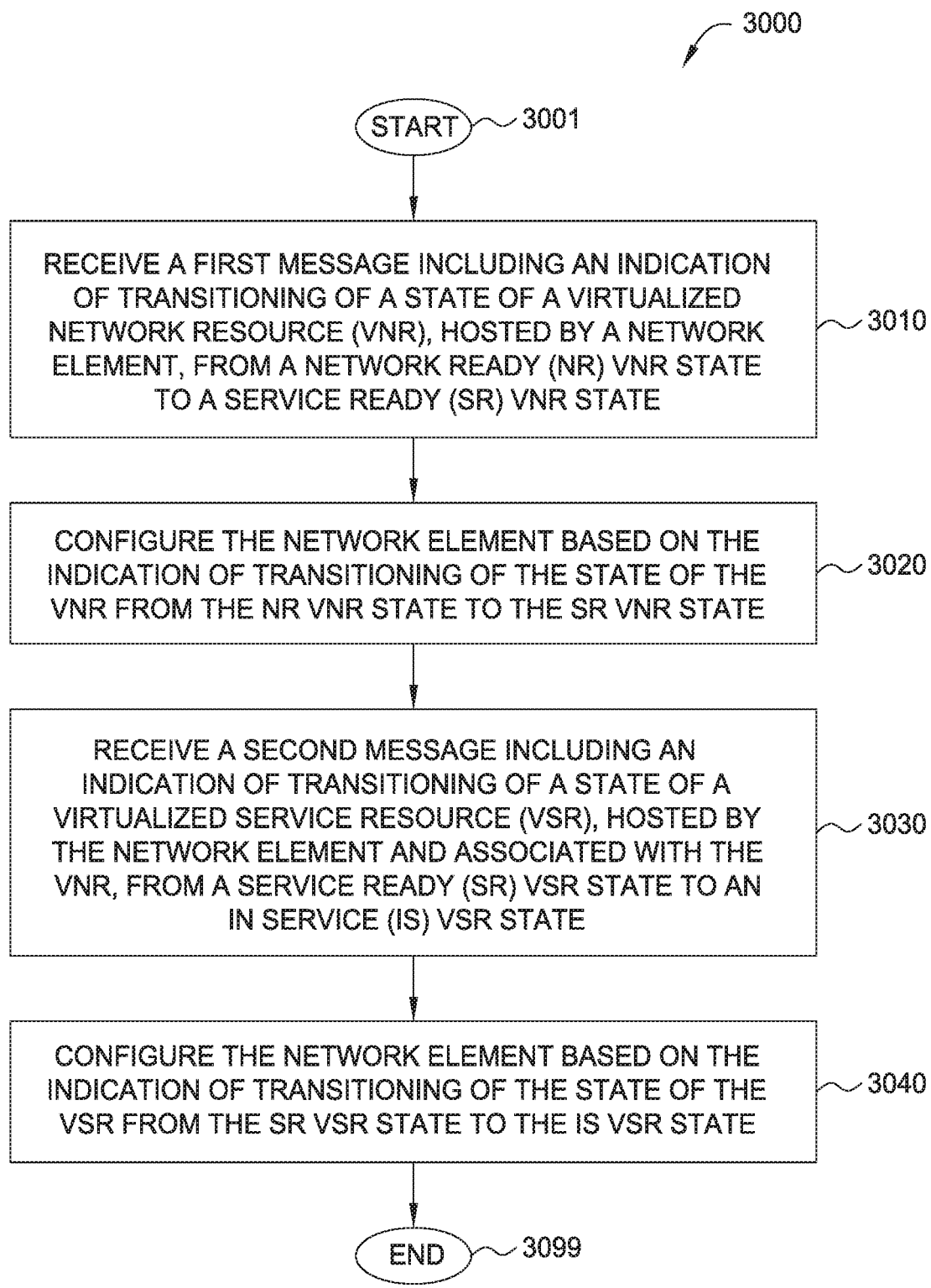
FIG. 30 depicts one embodiment of a method for using infrastructure resource states at a network element.

FIG. 30 depicts one embodiment of a method for using infrastructure resource states at a network element. It will be appreciated that, although presented as being performed serially, at least a portion of the blocks of method 3000 may be performed contemporaneously or in a different order than as presented in FIG. 30. At block 3001, method 3000 begins. At block 3010, a first message is received. The first message includes an indication of transitioning of a state of a virtualized network resource (VNR), hosted by the network element, from a Network Ready (NR) VNR state to a Service Ready (SR) VNR state. At block 3020, the network element is configured based on the indication of transitioning of the state of the VNR from the NR VNR state to the SR VNR state. At block 3030, a second message is received. The second message includes an indication of transitioning of a state of a virtualized service resource (VSR), hosted by the network element and associated with the VNR, from a Service Ready (SR) VSR state to an In Service (IS) VSR state. At block 3040, the network element is configured based on the indication of transitioning of the state of the VSR from the SR VSR state to the IS VSR state. At block 3099, method 3000 ends.

Figure 31:
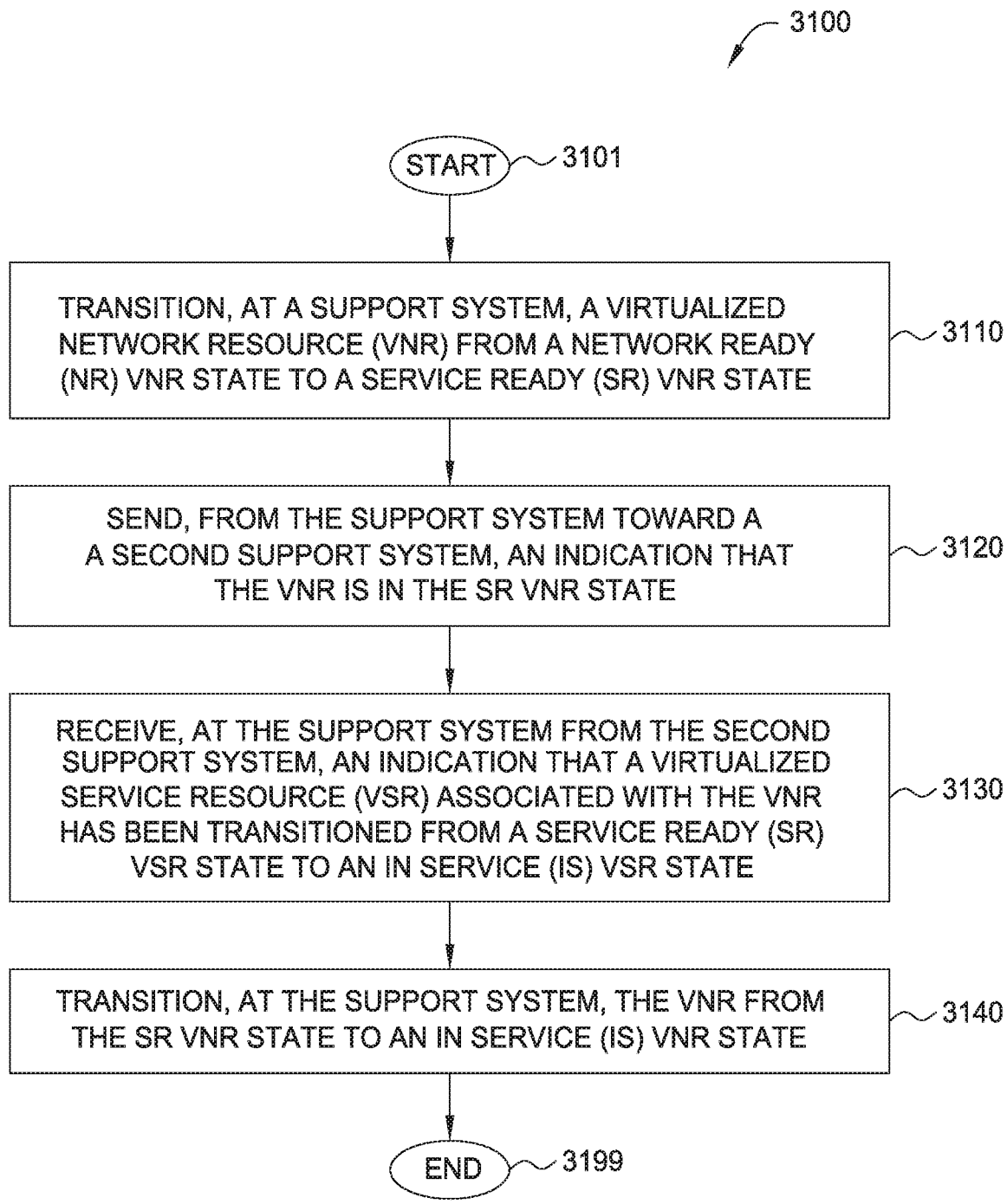
FIG. 31 depicts one embodiment of a method for using infrastructure resource states at a support system.

FIG. 31 depicts one embodiment of a method for using infrastructure resource states at a support system. It will be appreciated that, although presented as being performed serially, at least a portion of the blocks of method 3000 may be performed contemporaneously or in a different order than as presented in FIG. 31. At block 3101, method 3100 begins. At block 3110, a virtualized network resource (VNR) is transitioned from a Network Ready (NR) VNR state to a Service Ready (SR) VNR state. At block 3120, an indication that the VNR is in the SR VNR state is send toward a second support system. At block 3130, an indication that a virtualized service resource (VSR) associated with the VNR has been transitioned from a Service Ready (SR) VSR state to an In Service (IS) VSR state is received from the second support system. At block 3140, the VNR is transitioned from the SR VNR state to an In Service (IS) VNR state. At block 3199, method 3100 ends.

Figure 32:
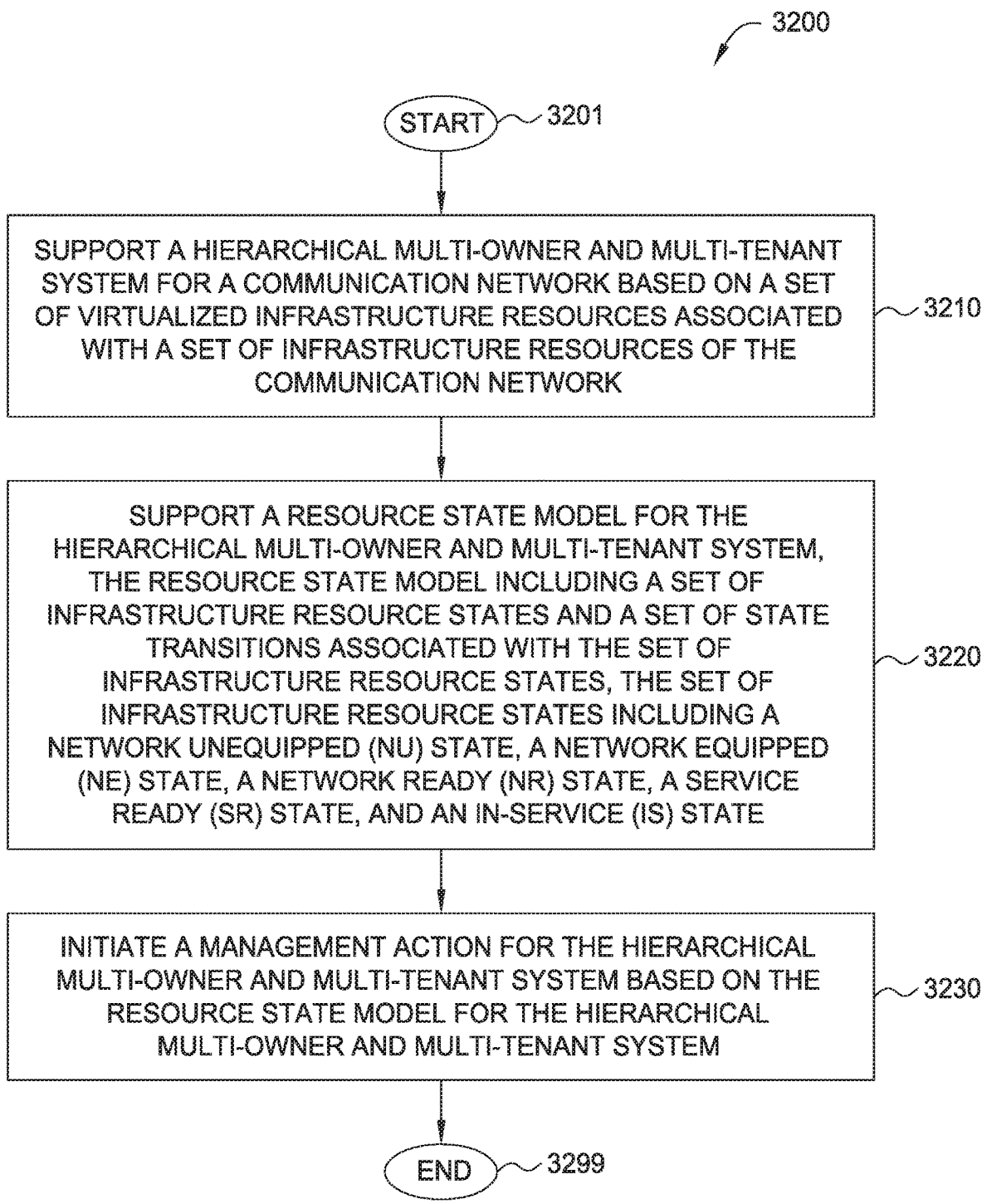
FIG. 32 depicts one embodiment of a method for using infrastructure resource states.

FIG. 32 depicts one embodiment of a method for using infrastructure resource states. It will be appreciated that, although presented as being performed serially, at least a portion of the blocks of method 3000 may be performed contemporaneously or in a different order than as presented in FIG. 32. At block 3201, method 3200 begins. At block 3210, a hierarchical multi-owner and multi-tenant system for a communication network is supported based on a set of virtualized infrastructure resources associated with a set of infrastructure resources of the communication network. At block 3220, a resource state model is supported for the hierarchical multi-owner and multi-tenant system where the resource state model includes a set of infrastructure resource states and a set of state transitions associated with the set of infrastructure resource states, wherein the set of infrastructure resource states includes a Network Unequipped (NU) state, a Network Equipped (NE) state, a Network Ready (NR) state, a Service Ready (SR) state, and an In-Service (IS) state. At block 3230, a management action is initiated for the hierarchical multi-owner and multi-tenant system based on the resource state model for the hierarchical multi-owner and multi-tenant system. At block 3299, method 3200 ends.

It will be appreciated that, although primarily presented herein with respect to embodiments in which the infrastructure resource states are used within the context of infrastructure virtualization provided for a particular type of communication network (e.g., for virtualization of infrastructure of an optical communication network to provide virtualized infrastructure for the optical communication network, for management of the virtualized infrastructure, for use of the virtualized infrastructure, or the like), the infrastructure resource states may be used within various other types of contexts, for various other types of communication networks, or the like, as well as various combinations thereof. For example, the infrastructure resource states may be utilized within various contexts in which infrastructure resources are managed or otherwise controller.

Figure 33:
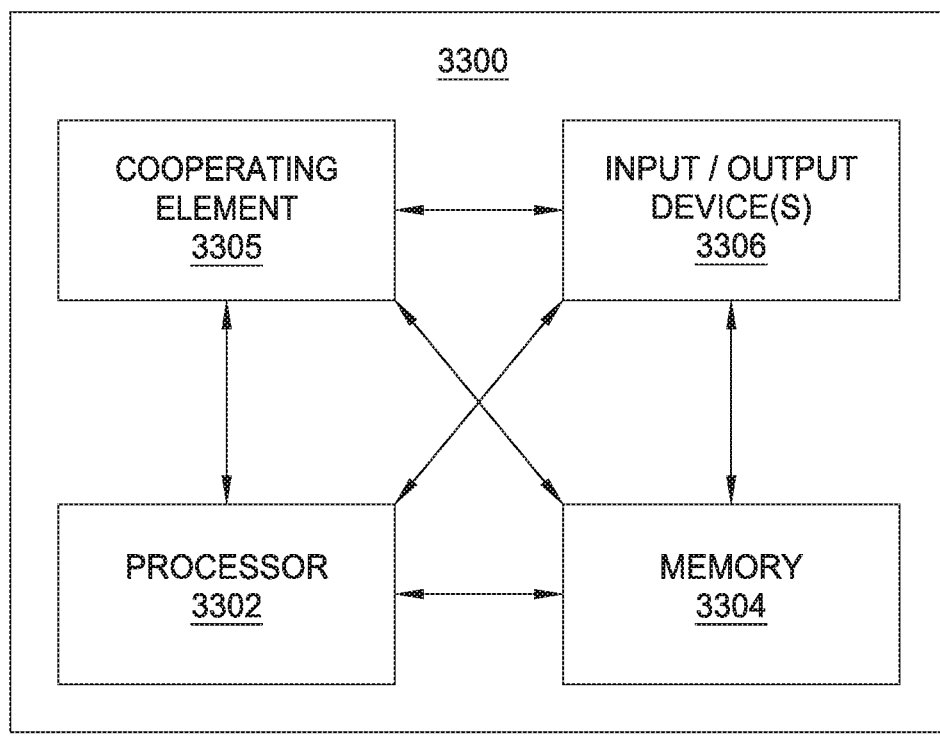
FIG. 33 depicts a high-level block diagram of a computer suitable for use in performing various functions described herein.

FIG. 33 depicts a high-level block diagram of a computer suitable for use in performing various functions described herein.

The computer 3300 includes a processor 3302 (e.g., a central processing unit (CPU), a processor having a set of processor cores, a processor core of a processor, or the like) and a memory 3304 (e.g., a random access memory (RAM), a read only memory (ROM), or the like). The processor 3302 and the memory 3304 are communicatively connected.

The computer 3300 also may include a cooperating element 3305. The cooperating element 3305 may be a hardware device. The cooperating element 3305 may be a process that can be loaded into the memory 3304 and executed by the processor 3302 to implement functions as discussed herein (in which case, for example, the cooperating element 3305 (including associated data structures) can be stored on a computer-readable storage medium, such as a storage device or other storage element (e.g., a magnetic drive, an optical drive, or the like)).

The computer 3300 also may include one or more input/output devices 3306. The input/output devices 3306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3300 of FIG. 33 may represent a general architecture and functionality suitable for implementing functional elements described herein, portions of functional elements described herein, or the like, as well as various combinations thereof. For example, computer 3300 may provide a general architecture and functionality that is suitable for implementing one or more of an element of CN 110, an IR 111 of CN 110, an SS 120, NIVS 130, an element of CN 1310, a network element 1319, an SS 1320, NIVS 1330, a support system (e.g., OSS, BSS, or the like), a network element (e.g., a PSS, an NE 2414, or the like), or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus at least to:
   receive, at a network element from a first support system based on a transitioning of a state of a virtualized network resource (VNR) hosted by the network element from a first VNR state to a second VNR state at the first support system, a first message comprising an indication of the transitioning of the state of the VNR from the first VNR state to the second VNR state at the first support system;
   configure, based on the indication of the transitioning of the state of the VNR from the first VNR state to the second VNR state at the first support system, the network element to support the VNR;
   receive, at the network element from a second support system based on a transitioning of a state of a virtualized service resource (VSR) hosted by the network element from a first VSR state to a second VSR state at the second support system, a second message comprising an indication of the transitioning of the state of the VSR from the first VSR state to the second VSR state at the second support system; and
   configure, based on the indication of the transitioning of the state of the VSR from the first VSR state to the second VSR state at the second support system, the network element to support the VSR.

2. The apparatus of claim 1, wherein the first support system is an operations support system (OSS).

3. The apparatus of claim 1, wherein the at least one memory and the computer program code are configured to, with the at least one processor, cause the apparatus at least to:
   send, from the network element toward the first support system, an indication that the network element has been configured based on the transitioning of the state of the VNR from the first VNR state to the second VNR state.

4. The apparatus of claim 1, wherein the second support system is a business support system (BSS).

5. The apparatus of claim 1, wherein the at least one memory and the computer program code are configured to, with the at least one processor, cause the apparatus at least to:
   send, from the network element toward the second support system, an indication that the network element has been configured based on the transitioning of the state of the VSR from the first VSR state to the second VSR state.

6. The apparatus of claim 1, wherein the indication of the transitioning of the state of the VNR from the first VNR state to the second VNR state comprises an indication that the state of the VNR has transitioned from the first VNR state to the second VNR state for an owner of the VNR, wherein the indication of the transitioning of the state of the VSR from the first VSR state to the second VSR state comprises an indication that the state of the VSR has transitioned from the first VSR state to the second VSR state for the owner of the VNR.

7. The apparatus of claim 6, wherein the indication of the transitioning of the state of the VNR from the first VNR state to the second VNR state comprises an indication that the state of the VNR has transitioned from the first VNR state to the second VNR state for a tenant to which the VNR is allocated by the owner of the VNR, wherein the indication of the transitioning of the state of the VSR from the first VSR state to the second VSR state comprises an indication that the state of the VSR has transitioned from the first VSR state to the second VSR state for the tenant to which the VNR is allocated by the owner of the VNR.

8. The apparatus of claim 1, wherein the indication of the transitioning of the state of the VNR from the first VNR state to the second VNR state comprises an indication that the state of the VNR has transitioned from the first VNR state to the second VNR state for each tenant in a hierarchical multi-tenant system, wherein the indication of the transitioning of the state of the VSR from the first VSR state to the second VSR state comprises an indication that the state of the VSR has transitioned from the first VSR state to the second VSR state for each tenant in the hierarchical multi-tenant system.

9. The apparatus of claim 1, wherein the first message further comprises an indication of a transitioning of the state of the VNR from the second VNR state to a third VNR state, wherein the at least one memory and the computer program code are configured to, with the at least one processor, cause the apparatus at least to:
   configure the network element based on the indication of the transitioning of the state of the VNR from the second VNR state to the third VNR state.

10. The apparatus of claim 1, wherein the at least one memory and the computer program code are configured to, with the at least one processor, cause the apparatus at least to:
  receive, at the network element, a third message comprising an indication of a transitioning of the state of the VNR from the second VNR state to a third VNR state; and
  configure the network element based on the indication of the transitioning of the state of the VNR from the second VNR state to the third VNR state.

11. The apparatus of claim 1, wherein the at least one memory and the computer program code are configured to, with the at least one processor, cause the apparatus at least to:
  support a state transition model for a set of infrastructure resource states comprising a Network Unequipped (NU) state, a Network Equipped (NE) state, a Network Ready (NR) state, a Service Ready (SR) state, and an In-Service (IS) state; and
  determine, using the set of infrastructure resource states, real-time resource analysis data comprising at least one of virtualized infrastructure resource consumption information, virtualized infrastructure resource churn information, an indication of virtualized infrastructure resource change per entity, an indication of virtualized infrastructure resource change per location, or an indication of virtualized infrastructure resource change per time period.

12. The apparatus of claim 1, wherein the first VNR state comprises a Network Ready (NR) VNR state and the second VNR state comprise a Service Ready (SR) VNR state, wherein the first VSR state comprises a Service Ready (SR) VSR state and the second VSR state comprise an In Service (IS) VSR state.

13. An apparatus, comprising:
  at least one processor; and
  at least one memory including computer program code;
  wherein the at least one memory and the computer program code are configured to, with the at least one processor, cause the apparatus at least to:
    maintain, at a first support system, state information for a virtualized network resource (VNR) hosted by a network element;
    perform, at the first support system, a first transition of the VNR from a first VNR state to a second VNR state;
    send, from the first support system toward the network element, a message configured to cause configuration of the network element based on the first transition of the VNR;
    send, from the first support system toward a second support system, a message indicative of the first transition of the VNR;
    receive, at the first support system from the second support system, an indication of a transition of a virtualized service resource (VSR) hosted by the network element and associated with the VNR from a first VSR state to a second VSR state at the second support system;
    perform, at the first support system based on the indication of the transition of the VSR, a second transition of the VNR from the second VNR state to a third VNR state; and
    send, from the first support system toward the network element, a message configured to cause configuration of the network element based on the second transition of the VNR.

14. The apparatus of claim 13, wherein the first support system comprises an operations support system (OSS) and the second support system comprises a business support system (BSS).

15. The apparatus of claim 13, wherein the at least one memory and the computer program code are configured to, with the at least one processor, cause the apparatus to perform the first transition of the VNR from the first VNR state to the second VNR state for an owner and to perform the second transition of the VNR from the second VNR state to the third VNR state for the owner.

16. The apparatus of claim 13, wherein the at least one memory and the computer program code are configured to, with the at least one processor, cause the apparatus to perform the first transition of the VNR from the first VNR state to the second VNR state for a tenant to which the VNR is allocated by an owner and to perform the second transition of the VNR from the second VNR state to the third VNR state for the tenant to which the VNR is allocated by the owner.

17. The apparatus of claim 13, wherein, to perform the first transition of the VNR from the first VNR state to the second VNR state, the at least one memory and the computer program code are configured to, with the at least one processor, cause the apparatus at least to:
  update VNR state information of a VNR data structure associated with the VNR to indicate that the VNR is in the second VNR state.

18. The apparatus of claim 17, wherein, to perform the second transition of the VNR from the second VNR state to the third VNR state, the at least one memory and the computer program code are configured to, with the at least one processor, cause the apparatus at least to:
  update the VNR state information of the VNR data structure associated with the VNR to indicate that the VNR is in the third VNR state.

19. The apparatus of claim 13, wherein the message configured to cause configuration of the network element based on the first transition of the VNR is configured to cause configuration of the network element to support allocation of the VNR to one or more entities.

20. The apparatus of claim 13, wherein the message configured to cause configuration of the network element based on the second transition of the VNR is configured to cause configuration of the network element to support allocation of the VNR to one or more entities.

21. The apparatus of claim 13, wherein the first VNR state comprises a Network Ready (NR) VNR state and the second VNR state comprise a Service Ready (SR) VNR state, wherein the first VSR state comprises a Service Ready (SR) VSR state and the second VSR state comprise an In Service (IS) VSR state.

22. An apparatus, comprising:
  at least one processor; and
  at least one memory including computer program code;
  wherein the at least one memory and the computer program code are configured to, with the at least one processor, cause the apparatus at least to:
    maintain, at a first support system, state information for a virtualized service resource (VSR) hosted by a network element, wherein the VSR is associated with a virtualized network resource (VNR) hosted by the network element;

receive, at the first support system from a second support system, an indication that the VNR has been transitioned from a first VNR state to a second VNR state at the second support system;

perform, at the first support system based on the indication that the VNR has been transitioned from the first VNR state to the second VNR state at the second support system, a transition of the VSR from a first VSR state to a second VSR state;

send, from the first support system toward the second support system, an indication of the transition of the VSR from the first VSR state to the second VSR state; and send, from the first support system toward the network element based on the transition of the VSR from the first VSR state to the second VSR state, a message configured to cause configuration of the network element to support the VSR.

23. The apparatus of claim 22, wherein the first VNR state comprises a Network Ready (NR) VNR state and the second VNR state comprise a Service Ready (SR) VNR state, wherein the first VSR state comprises a Service Ready (SR) VSR state and the second VSR state comprise an In Service (IS) VSR state.

* * * * *